US011613025B2

(12) United States Patent
Knuepfel et al.

(10) Patent No.: US 11,613,025 B2
(45) Date of Patent: Mar. 28, 2023

(54) ISOLATING ROBOTIC ACTUATORS FROM FOOD AND BEVERAGE PREPARATION

(71) Applicant: Truebird, Inc., Brooklyn, NY (US)

(72) Inventors: Michael Hazen Knuepfel, Brooklyn, NY (US); Andrew William Lynch, Brooklyn, NY (US); Darian Montague Ahler, Brooklyn, NY (US); Jordan Ross Adelson, Brooklyn, NY (US)

(73) Assignee: Truebird Technologies, Inc., Brooklyn, NY (US)

( * ) Notice: Subject to any disclaimer, the term of this patent is extended or adjusted under 35 U.S.C. 154(b) by 688 days.

(21) Appl. No.: 16/600,463

(22) Filed: Oct. 12, 2019

(65) Prior Publication Data
US 2020/0113372 A1 Apr. 16, 2020

Related U.S. Application Data

(60) Provisional application No. 62/745,117, filed on Oct. 12, 2018.

(51) Int. Cl.
*B25J 15/04* (2006.01)
*B25J 15/06* (2006.01)
(Continued)

(52) U.S. Cl.
CPC ............ *B25J 15/0441* (2013.01); *A23F 5/08* (2013.01); *A23F 5/26* (2013.01); *A47J 31/42* (2013.01);
(Continued)

(58) Field of Classification Search
CPC ........ A47J 31/521; A47J 36/321; A47J 31/42; A47J 31/4496; A47J 31/52; A47J 43/06;
(Continued)

(56) References Cited

U.S. PATENT DOCUMENTS 5,581,975 A 12/1996 Trebbi
6,102,246 A 8/2000 Goulet et al.
(Continued)

FOREIGN PATENT DOCUMENTS

DE 19938114 A1 2/2001
EP 2050545 A1 4/2009
(Continued)

OTHER PUBLICATIONS

Notice of Allowance in related U.S. Appl. No. 16/600,467 dated Apr. 9, 2020 (9 pages).
(Continued)

*Primary Examiner* — Phuong T Nguyen
(74) *Attorney, Agent, or Firm* — Pillsbury Winthrop Shaw Pittman LLP

(57) ABSTRACT

Provided is a device, comprising: a barrier configured to impeded or prevent particles shed by a robot in a first volume of space from entering a second volume of space in which the robot manipulates a workpiece; and a robot having three or more degrees of freedom, the robot comprising: a first portion disposed on a first side of the barrier in the first volume, the first portion comprising an actuator of the robot, the actuator being configured to drive movement of the robot to manipulate the workpiece; and a second portion disposed on a second side of the barrier in the second volume, the second portion comprising an end-effector of the robot by which the robot makes contact with the workpiece.

19 Claims, 29 Drawing Sheets

(51) Int. Cl.
| | |
|---|---|
| *B25J 9/16* | (2006.01) |
| *B25J 9/00* | (2006.01) |
| *B25J 9/02* | (2006.01) |
| *B25J 11/00* | (2006.01) |
| *A47J 31/52* | (2006.01) |
| *A47J 36/32* | (2006.01) |
| *A47J 44/00* | (2006.01) |
| *G07F 17/00* | (2006.01) |
| *A47J 31/44* | (2006.01) |
| *A23F 5/08* | (2006.01) |
| *A23F 5/26* | (2006.01) |
| *A47J 31/42* | (2006.01) |
| *A47J 43/06* | (2006.01) |
| *A47J 43/046* | (2006.01) |
| *A47J 43/27* | (2006.01) |
| *A47J 31/00* | (2006.01) |

(52) U.S. Cl.
CPC .......... *A47J 31/4496* (2013.01); *A47J 31/52* (2013.01); *A47J 31/521* (2018.08); *A47J 36/321* (2018.08); *A47J 43/06* (2013.01); *A47J 44/00* (2013.01); *B25J 9/0009* (2013.01); *B25J 9/023* (2013.01); *B25J 9/1612* (2013.01); *B25J 11/0045* (2013.01); *B25J 15/0608* (2013.01); *G07F 17/0071* (2013.01); *G07F 17/0078* (2013.01); *A47J 31/007* (2013.01); *A47J 43/0465* (2013.01); *A47J 43/27* (2013.01); *G05B 2219/39065* (2013.01)

(58) Field of Classification Search
CPC ...... A47J 44/00; A47J 31/007; A47J 43/0465; A47J 43/27
USPC .......... 426/231, 416, 433; 99/282, 283, 325, 99/357, 348, 407, 448, 451, 484
See application file for complete search history.

(56) References Cited

U.S. PATENT DOCUMENTS

| | | | | |
|---|---|---|---|---|
| 9,157,573 | B1* | 10/2015 | Zach | B60N 3/102 |
| 10,154,762 | B2 | 12/2018 | Farid et al. | |
| 2005/0193901 | A1 | 9/2005 | Buehler | |
| 2009/0013645 | A1 | 1/2009 | Mastio | |
| 2013/0087050 | A1 | 4/2013 | Studor et al. | |
| 2013/0101714 | A1* | 4/2013 | Buehler | A23L 5/10 99/341 |
| 2014/0041748 | A1* | 2/2014 | Angus | B67D 1/0041 141/1 |
| 2014/0319167 | A1* | 10/2014 | Dorney | G06Q 20/342 222/1 |
| 2015/0013277 | A1 | 1/2015 | Brandhorst | |
| 2015/0114236 | A1 | 4/2015 | Roy | |
| 2015/0359374 | A1 | 12/2015 | Anthony et al. | |
| 2016/0052770 | A1 | 2/2016 | Ratti | |
| 2016/0073644 | A1 | 3/2016 | Dickey | |
| 2016/0249766 | A1 | 9/2016 | Studor et al. | |
| 2016/0351001 | A1 | 12/2016 | Hirshbain | |
| 2017/0011442 | A1 | 1/2017 | Hu et al. | |
| 2017/0014785 | A1 | 1/2017 | Childers et al. | |
| 2017/0066544 | A1 | 3/2017 | Van der Laan | |
| 2017/0096324 | A1 | 4/2017 | Dresser et al. | |
| 2017/0172351 | A1 | 6/2017 | Kathirasen et al. | |
| 2017/0215631 | A1 | 8/2017 | Studor et al. | |
| 2017/0221296 | A1 | 8/2017 | Jain et al. | |
| 2017/0270739 | A1 | 9/2017 | Appelhans | |
| 2017/0290345 | A1 | 10/2017 | Garden et al. | |
| 2017/0334062 | A1 | 11/2017 | Allen et al. | |
| 2018/0042258 | A1 | 2/2018 | Roberts et al. | |
| 2019/0217471 | A1 | 7/2019 | Romano et al. | |
| 2019/0381660 | A1 | 12/2019 | Roy | |

FOREIGN PATENT DOCUMENTS

| | | |
|---|---|---|
| JP | 2013-025813 A | 2/2013 |
| JP | 2013025813 A | 2/2013 |
| TW | M567607 U | 10/2018 |
| WO | 2007077211 A1 | 7/2007 |
| WO | 2016087208 A1 | 6/2016 |
| WO | 2018015704 A1 | 1/2018 |

OTHER PUBLICATIONS

Web Archive of www.briggo.com, Sep. 4, 2018, 11 pages, https://web.archive.org/web/20180904160129/https://briggo.com/.
Web Archive of www.cafexapp.com, Oct. 5, 2018, 4 pages, https//web.archive.org/web/20181005095651/https://cafexapp.com/.
Web Archive of www.spyce.com, Nov. 10, 2018, 6 pages, https://web.archive.org/web/20181110194841/https://www.spyce.com/.
Web Archive of https://costaexpressbusiness.co.uk, Sep. 5, 2018, 5 pages, https://web.archive.org/web/20180905015730/https://costaexpressbusiness.co.uk/.
Web Archive of https://zume.com, Sep. 18, 2018, 11 pages, https://web.archive.org/web/20180918122446/https://zume.com/.
Web Archive of https://juicebot.com, Aug. 31, 2019, 7 pages, https://web.archive.org/web/20180831161313/https://juicebot.com/.
Web Archive of https://sisyphus-industries.com, Aug. 29, 2018, 9 pages, https://web.archive.org/web/20180829034339/https://sisyphus-industries.com/.
Supplementary Partial European Search Report Application No. EP 19 87 1037 dated Jul. 20, 2022, pp. 1-12.
International Preliminary Report on Patentability in related international application No. PCT/US2019/056009 (7 pages).
International Search Report and Written Opinion in related International Application No. PCT/US2019/056009 dated Feb. 5, 2020 (10 pages).
Internet archive of "Magnetic kaiten sushi conveyor," Sushi Robot, captured on Oct. 9, 2016, https://web.archive.org/web/20161009070710/http://sushirobot.org/en/article/magnetic-kaiten (7 pages).
Non-Final Office Action in related U.S. Appl. No. 16/600,468, dated Nov. 1, 2022, pp. 1-13.
Notice of Allowance in related U.S. Appl. No. 16/600,465, dated Dec. 7, 2022, pp. 1-11.

* cited by examiner

ISOLATING ROBOTIC ACTUATORS FROM FOOD AND BEVERAGE PREPARATION

CROSS-REFERENCE TO RELATED APPLICATIONS

This patent claims the benefit of U.S. Provisional Patent Application 62/745,117, filed 12 Oct. 2018, titled ROBOTIC SYSTEM TO CONVEY OPEN-TOP VESSELS. The entire content of each afore-listed earlier-filed application is hereby incorporated by reference for all purposes.

BACKGROUND

1. Field

The present disclosure relates generally to robotics and, more specifically, to robots for food and beverage preparation.

2. Description of the Related Art

Robots are frequently used to perform routine or dangerous tasks. Examples include use of robots in disaster zones, like in irradiated areas after the Fukushima disaster, and use of robots in assembly lines for manufacturing automobiles or semiconductor devices. Generally, in these use cases, designers of robots have relatively loose constraints in terms of cost and space occupied by the robots. Often, such robots cost hundreds of thousands or millions of dollars, and in many cases, the robots consume relatively large amounts of area when operating.

There are, however, many potential use cases for robots that have much tighter cost and space constraints. Many consumer-facing use cases cannot support the cost or space allocation for some traditional robots. Examples include geographically distributed food and beverage preparation robots, for instance, robots deployed to brick-and-mortar locations in which consumers frequent and robots on vehicles delivering and dispensing food and beverage products to consumers. Often, these use cases involve a relatively large number of geographically-distributed instances of the robot used to service a market, like the United States, and in many cases, those robots consume valuable space that could be put to other uses, like floor space in a retail store or office building.

Particular challenges arise in the context of robots handling open-top vessel, like cups, test tubes, tubs, barrels, and the like, which are used to carry liquids in a variety of scenarios, including during preparation of liquid-state drugs and beverages. Automated transport of these vessels, however, often presents challenges. Examples include spilling liquids, bottlenecks in manufacturing processes, and constraints on vessel dimensions that place the liquid surface near the top of the vessel. As a result, transportation and handling of these vessels is done manually in many scenarios. Similar issues arise in the context of conveying loose solids, like grains, salads, cereal, and the like in open-top vessels.

SUMMARY

The following is a non-exhaustive listing of some aspects of the present techniques. These and other aspects are described in the following disclosure.

Some aspects include a device, comprising: a controller; a first actuator configured to be controlled by the controller; a first primary member, located on the first actuator; a first secondary member; and a sheet having a first side and a second side, wherein: the first primary member is located on the first side of sheet and the first secondary member is located on the second side of sheet, the first primary member is coupled to the first secondary member across the sheet via a coupling force, and the first secondary member is configured to slide on the second side of the sheet, following the first primary member, actuated by the first actuator based on instructions from the controller.

Some aspects include a device, comprising: a barrier configured to impeded or prevent particles shed by a robot in a first volume of space from entering a second volume of space in which the robot manipulates a workpiece; and a robot having three or more degrees of freedom, the robot comprising: a first portion disposed on a first side of the barrier in the first volume, the first portion comprising an actuator of the robot, the actuator being configured to drive movement of the robot to manipulate the workpiece; and a second portion disposed on a second side of the barrier in the second volume, the second portion comprising an end-effector of the robot by which the robot makes contact with the workpiece.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
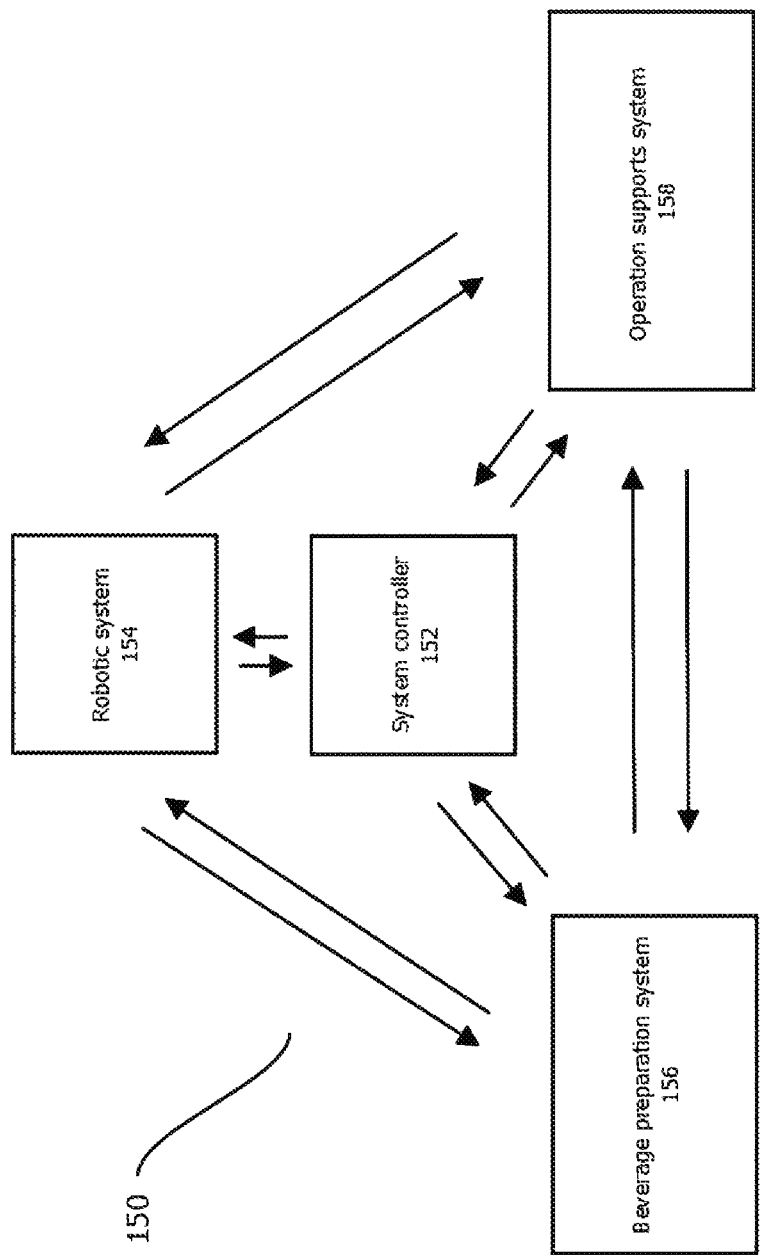
FIG. 1 is a block diagram depicting an example of an alimentary-product preparing robot consistent with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A variety of problems relating to alimentary-product assembling and dispensing robots are addressed by various versions of techniques described below. These different techniques can be used together, synergistically in some cases, so their descriptions are grouped into a single description that will be filed in multiple patent applications with different claim sets targeting the different techniques and combinations thereof. In view of this approach, it should be emphasized that the techniques are also independently useful and may be deployed in isolation from one another or in any permutation combining the different subsets of techniques, none of which to suggest that any other description herein is limiting.

Some of the present techniques are described with reference to an automated beverage preparation system 150 shown in FIG. 1. It should be emphasized, though, that the present techniques are applicable to the assembly and vending of all wide variety of different alimentary products and other products (which is not to suggest that any other description is limiting). Examples include various types of beverages, like coffee, tea, cocktails, smoothies, and the like. Other examples include various types of food products built from assembled solids, like salads, bowls of quinoa, hot-dogs, pizzas, yogurt, and the like.

In some embodiments, the system 150 minimizes or reduces contact by robotic parts with the alimentary products via a barrier. Spilled liquids and loose solids, in some cases, can interfere with the operation of moving parts of robots, and some embodiments reduce the amount, frequency, and intensity of such interactions with a barrier that shields at least some moving parts in some embodiments. In some embodiments, the barrier prevents or reduces an amount of particles shed by actuators and other moving parts of robots that accumulate in assembled food and beverage products. In some embodiments, the barrier prevents or reduces contamination of the robotic parts through possible leakage or spill of the alimentary products. That said, embodiments are not limited to systems that afford all of these benefits, which is not to suggest that any other feature described is limiting.

In some embodiments, the automated beverage preparation system 150 comprises a coffee preparation system controller 152 that interfaces with and controls operation of a robotic system 154 and a beverage preparation system 156, as well as operation supports system 158. The various components may communicate via machine-readable instructions, like various digital or analog signals sent on a control bus of the system 150 connecting the various components. The automated beverage preparation system 150 may function as an autonomous beverage preparation system that is run by the system controller 152.

In some embodiments, system 150 comprises a surveillance system configured to monitor the automated beverage preparation system 150 via a plurality of contact sensors, motion sensors, and cameras. In some embodiments, the surveillance system can be turned off for maintenance purposes by the authorized personnel. In some embodiments, the surveillance system is connected to the system controller 152 via a system bus.

In some embodiments the system controller 152 comprises a central processing unit, such as a microprocessor, and a number of other processors (like downstream motor controllers) interconnected via a system bus. The system controller 152 may further include random access memory (RAM), read only memory (ROM), an input/output adapter for connecting to the system bus and peripheral devices. Some embodiments may include a solid-state drive, a keyboard, a mouse, a speaker, a microphone, or other user interface devices, such as a touch screen display and a digital camera. The system controller 152 may have resident thereon an operating system and an application that implements the functionality described herein, e.g., executing on a computing device like that described below with reference to FIG. 26.

In some embodiments, the system controller 152 is configured to maintain and service a queue of orders. The system controller 152 may place a received order into the queue according to a delivery time assigned by the user placing the order. In some embodiments, the system controller 152 may assign a priority to each order or some may apply a "first in, first out" policy. In some embodiments, system controller 152 may assign a priority to each order based on the delivery time, time an order was received, preparation time, wait time for workstations needed to complete the order, and various other parameters. In some embodiments, the system controller 152 may apply bin-packing optimization algorithm to effectuate a greedy or global optimization of throughput, minimization of maximum wait time for a user, or weighted combination thereof. Or various other scheduling algorithms are discussed below.

In some embodiments, the system controller 152 may apply machine-learning techniques to learn from previous operations to optimize or otherwise improve operations and maintenance of the automated beverage preparation system 150. Some embodiments identify patterns across multiple (e.g., 2 or more, 3 or more, 5 or more, 10 or more, or 40 or more) variables to optimize operation of the automated beverage preparation system 150. Some embodiments may adjust the timing between workstations and the sequences among those workstations to increase throughput. For examples, if a dairy addition station has a long wait time (e.g. more than 5 minutes) and it has been determined that a coffee would taste better if the milk is added to the cup immediately after pouring the coffee to keep the diffusion rate as high as possible (higher temperature causes higher diffusion rates), the system controller 152 may adjust the time of coffee addition to be immediately before the milk addition station becomes available.

In some embodiments, the system controller 152 is configured to receive instructions from customers and related data regarding their order. In some embodiments, the customer instructions are received via a wireless network, a wired network, or a combination thereof. In some embodiments, the customer instructions are received via an internet connection, e.g., orders entered via a native application or web application on a user's mobile computing device. Some embodiments receive orders via a touchscreen display. Some embodiments receive orders via a text-to-speech chatbot interface, e.g., implemented with Dialogflow™. The customer instruction may be transformed into device-specific instructions distributed by the system controller 152 to other sections of the automated beverage preparation system 150 such as the robotic system 154.

Figure 2:
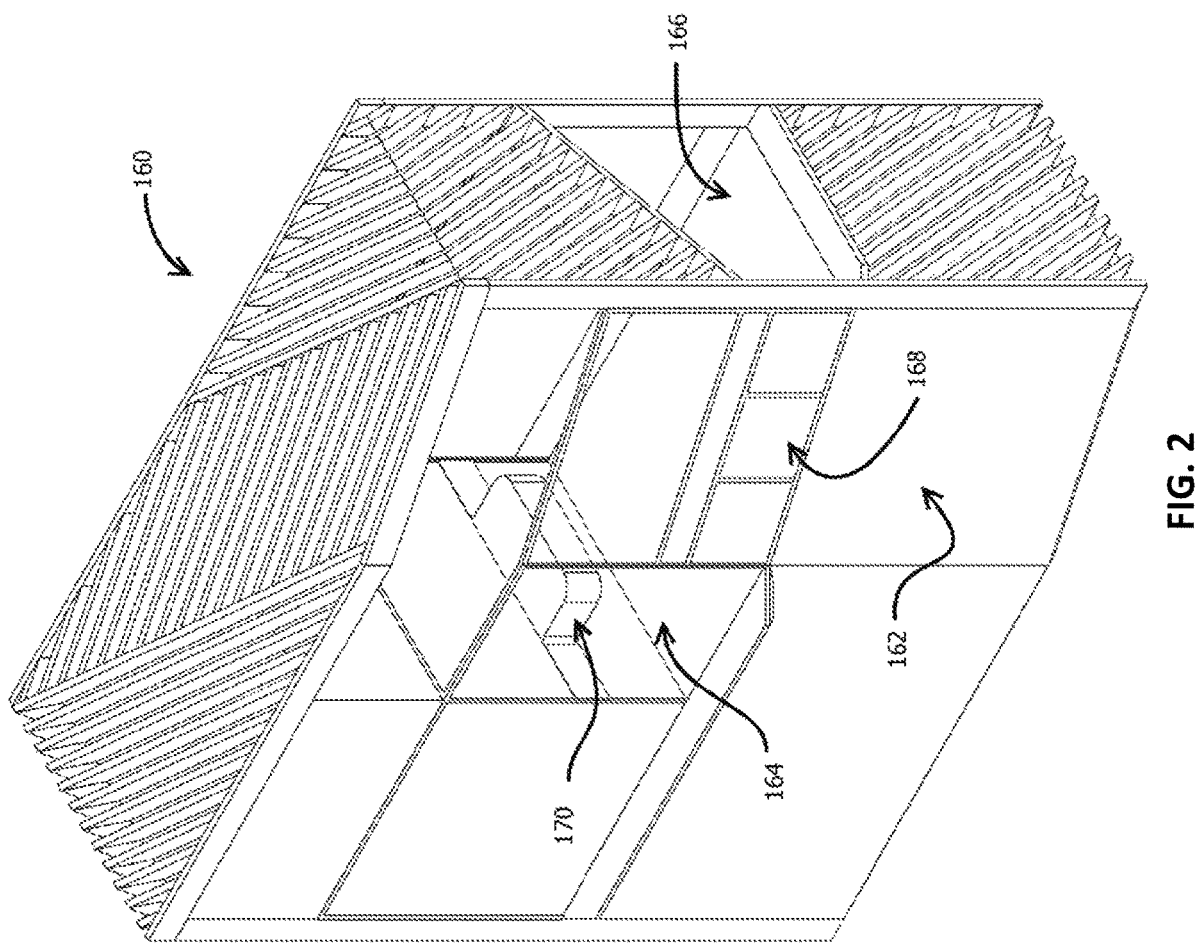
FIG. 2 is a perspective view of an example of a kiosk in which the robots described herein may be housed consistent with some embodiments of the present techniques.

In some embodiments, the beverage preparation system 150 is housed by housing 160 of FIG. 2, such as a kiosk. In some embodiments, the system housing 160 is designed to prevent or impede unauthorized access into the internal spaces of the system housing, e.g., into a working area of a robot, like in spaces within a range of movement of an end effector or various actuators coupled thereto. In some embodiments, robotic system 154, the beverage preparation apparatus 156, and the operation support system 158 are also disposed inside the system housing 160. In some embodiments, system 150 in housing 160 may be located within a publicly accessible area, such as a lobby of an office building or in an airport lounge. In some embodiments, system 150 may be a vehicle-mounted robot, like a food truck, or delivery van, in which food products are assembled while parked or while on the way to deliver the food products.

In some embodiments, the kiosk 160 is a freestanding structure configured to be carried on the back of a truck and conveyed into a brick-and-mortar establishment, for instance, via a loading dock, for example, with retractable, height-adjustable wheels mounted underneath the kiosk 160. In some embodiments, the kiosk 160 may include interfaces for connecting to a building's electrical system, water supply, and wastewater system. In some embodiments, the kiosk 160 may include a shielded lower volume 162 inside the kiosk in which the robotic actuators described below are disposed. That region may be isolated from an upper working volume 164 in which food or beverage products are prepared. In some embodiments, isolation is achieved via a barrier 166 disposed between the lower volume 162 and the working volume 164. In some cases, end effectors disposed above the barrier may magnetically couple to an end-effector coupling below the barrier 166 as described below.

In some embodiments, the barrier 166 is a rigid, magnetically transparent, sheet of generally uniform thickness, for instance, varying less than 40% in thickness. In some embodiments, the sheet is less than a centimeter thick, such as less than 5 mm thick. In some embodiments, the sheet forming the barrier 166 is generally planar and horizontal, for example, having a maximum deviation from a plane normal to a vector of gravity of less than 4 cm, for instance, less than 2 cm, over an area larger than one half square meter, for instance, larger than one square meter. In some embodiments, workpieces, like cups or bowls, may be delivered to a window 168, which in some cases may include a barrier that automatically retracts when a customer is permitted to retract a finished work piece, or some embodiments may have a sequence of barriers that act like an airlock. In some embodiments, workpieces may be moved within the working volume 164 by end effectors like those described below, for instance, to various dispensing stations. In some embodiments, the working volume 164 may be substantially or entirely shielded by windows and other barriers to prevent customers from reaching into the working area.

In some embodiments, other types of barriers may be applied to reduce or eliminate robot-shed particles within the working volume 164. In some embodiments, the system 150 may include a fan or blower, and working volume 164 may be maintained at a positive air pressure relative to the underlying area 162 to drive such particulates out of the working volume 164. In some embodiments, a cup or bowl is moved by sliding it along the top surface of the barrier 166 consistent with the techniques described below, or in some cases, the workpiece is held static, and dispensing stations are moved, for instance, opposite a barrier disposed above a workpiece with an aperture through which substances are dispensed into the work piece. In some cases, the barrier is wood, transparent glass, translucent (e.g., frosted) glass or plexiglass, or opaque glass or plexiglass. In some cases, end effectors, like a coaster-shaped puck or a collection of magnetic fingers described below, translate (e.g., slide or roll) along a top surface of the barrier 166 within the working volume 164 to access and move workpieces, like cups or bowls.

In some embodiments, the automated beverage preparation system 150 moves open-top vessels (a term which includes vessels to which a top is later added as part of an assembly process, e.g., after adding coffee) among various workstations for order assembly. As noted, transport of open-top vessels presents challenges. One approach is to move open-top vessels between work stations, such as steps in a manufacturing process, by a conveyor belt, e.g., along an assembly-line in which the conveyer belt transports the open-top containers between work stations and stops at each work stations. One shortcoming of many conveyer belts is that they advance vessels in a linear manner, serially through the workstations, in synch. In many cases, conveyor systems cannot be programmed to resequence stops at some of the work stations, independently of movement to or from other workstations, instead of going through all of them in synch and in series. This may be inefficient if the products are relatively heavily customized, and the open-top vessels undergo relatively diverse sets of processes for relatively diverse amounts of time. As a result, many relatively variable processes involving open-top vessels are performed manually, which is typically not an economical practice at scale for many applications. Another approach to moving vessels is to use a six-axis robot or a robot with even more degrees of freedom. Such robots, however, are often relatively expensive due the actuators, drives, and controls associated with higher degrees of freedom, and such robots often consume a relatively large volume of area to operate, as their arms may swing vertically through relatively large volumes of space. None of which is to suggest that these or any other techniques are disclaimed, as the various inventive approaches described herein may be used independently of one another.

Some embodiments mitigate some of these challenges with a programmable conveying system that can perform in a dynamic non-linear manner. Some embodiments transport open-top vessels with an actuator having two degrees of freedom of movement to move the vessels about a plane that facilitates bypassing other vessels and increasing the throughput of the automated beverage preparation system 150. In some cases, workpieces are supported and can remain static on a work surface while other workpieces are transported, e.g., one cup may be moved by a given actuator while another is filled, before the other cup is then moved by the same actuator. Some embodiments transport open-top vessels with an actuator having more than two degrees of freedom of movement relative to a set of workstations such as movement in x-y directions (e.g., along two axes orthogonal to one another and gravity) and rotation around the z axis (e.g., an axis parallel to gravity) or movement in x-y-z directions, e.g., a robot with three and only three degrees of freedom. Some embodiments asynchronously transport the vessels along routes that are non-linear and are feasible for actuators having two or more than two degrees of freedom of movement (e.g., two and exactly two, or three and exactly three, or four and exactly four degrees of freedom). Some embodiments are expected to expedite the process of manufacturing liquid products (such as various beverages) or various dry-goods products in open-top vessels by asynchronously transporting the open-top vessels along dynamically determined or pre-determined routes, while doing so with relatively cost and space efficient robots. In some embodiments, instructions regarding customized routing and non-linear movement of open-top vessels across the workstations are sent from the system controller 152 to the robotic system 154. The techniques herein are described with reference to liquids, but the use cases with loose solids are also contemplated.

Figure 3:
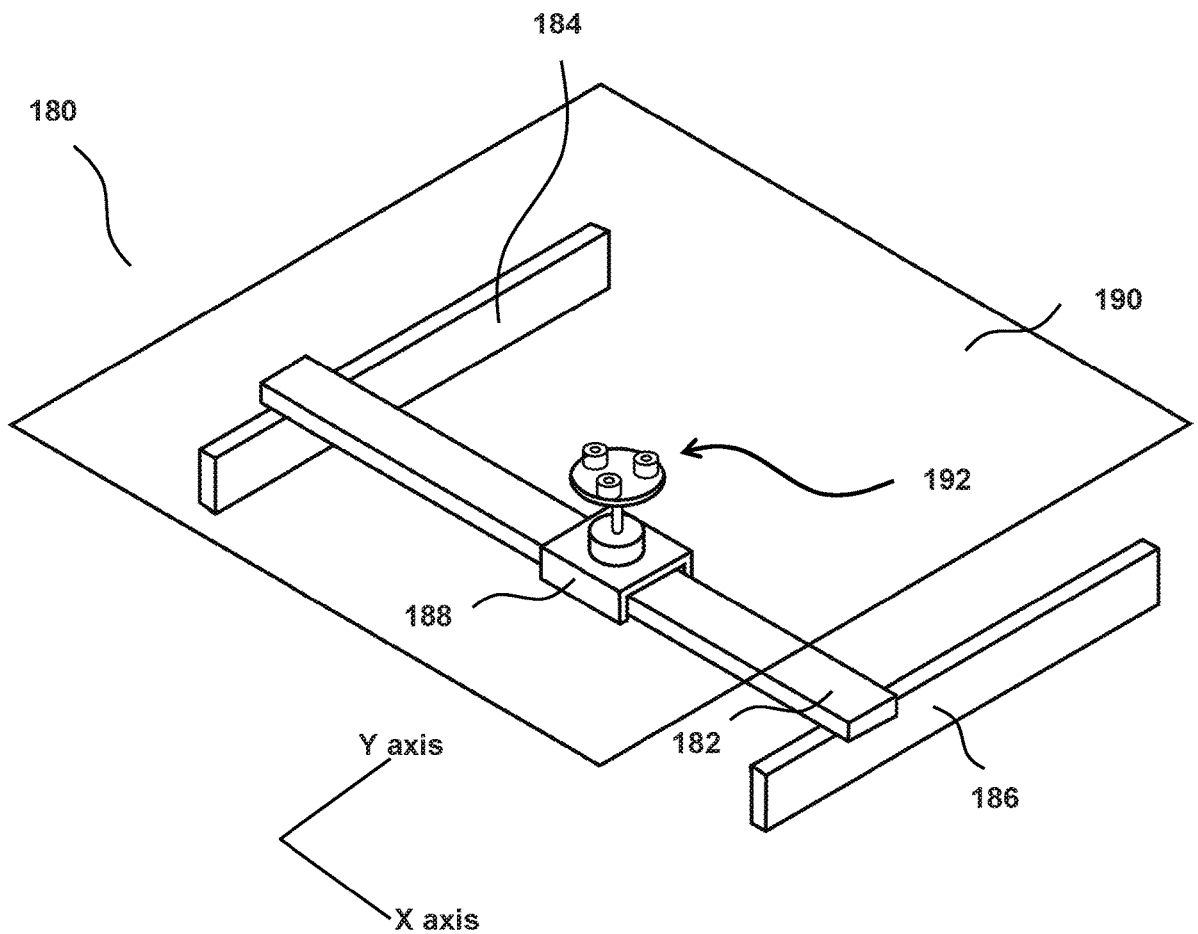
FIG. 3 is a perspective view of a robot for moving a workpiece consistent with some embodiments of the present techniques.

FIG. 3 is a perspective view of an example of an x-y motion system 180 having three degrees of freedom (two for the motion system and one for an end effector) in accordance with some embodiments of the present techniques. The x-y motion system 180 may include a gantry 182 having a first end and a second end. Gantry 182 may be a beam that extends (e.g., in a longest dimension) orthogonal to rails 184 and 186. Ends of the gantry 182 may be arranged to move along rails or mounts 184 and 186, respectively, each having a first end and a second end. In some embodiments, the rails 184 and 186 are parallel. In some embodiments, a plurality of gantries are arranged to move along rails. In some embodiments, the gantries cannot pass over each other because they are position in a plane parallel to a plane passing through the rails. In some other embodiments, the gantries may pass over each other. It should be noted terms parallel and perpendicular may include up to ±5 degrees deviation. For example, two lines are still considered perpendicular if the lines form an angle between 85° to 95°.

The gantry 182 is placed perpendicular to the rails 184 and 186 and at the same height from the rails 184 and 186. The gantry 182 may be driven in they axis by an actuator (e.g., a motor, like a stepper motor) coupled to the rail 184 or the rail 186. The motor may operate under the control of the system controller 152, which may receive position feedback from sensors (or flags, where the sensor is mobile) placed on the rail 184 or the rail 186. Similarly, x-axis actuator (e.g., a motor, like a stepper motor) may be coupled to the gantry and the operation of the x-axis motor is controlled by the control of the system controller 152, which may receive position feedback from sensors (or flags, where the sensor is mobile) placed on the gantry 182. In some embodiments, the sensors are position sensors. In some embodiments, the position sensors are non-contact sensor, such as a capacitive, ultrasonic, Hall effect, inductive, or optical sensors. In some embodiments, an actuator may include a stepper motor, induction motor, piezo-electric motor, pneumatic motor, a pneumatic piston, a hydraulic motor, a hydraulic piston, or the like. In some embodiments, an actuator is coupled to a drive, like a transmission, a gear reducer, a pinion and a rack, a screw drive, or the like. A drive may be used to convert the high-speed rotation of the shaft of a motor to the slower but more powerful rotation of the output of the gear reducers, or in some cases, to convert rotational movement to linear translation. The output shaft of each of the gear reducers (not shown) may be connected to respective pinions in some embodiments. The pinions may engage racks (not shown), which may be mounted on the walls of the gantry 182, and rails 184 and 186.

In some embodiments, the x-y motion system 180 may have two rails and a gantry, as shown in FIG. 3, having a H-shape configuration. In some embodiments, the x-y motion system 180 has one rail and a gantry (not shown) having a T-shape configuration. Or in some embodiments, the gantry extends from opposing sides of a circular rail, and the gantry rotates about a central vertical axis, like a circle with a line that bisects the circle.

A carrier 188 may be coupled to gantry 182. The system controller 152 may be able to detect x and y axes positions of the carrier 188 based upon signals from sensors and may be able to move the carrier 188 along the x and y axes. The carrier 188 may reach various point along the x axis between the first end and the second end of gantry 182 and any point along the y axis between the first end and the second end of rail 184 or 186. The area or volume reachable by a robot is referred to as a working area or working volume.

In some embodiments, the carrier is configured to receive an open-top vessel to be moved by the x-y motion system 180. In some embodiments, the open-top vessel is a cup carrying, or configured to carry, coffee or similar beverages.

In some embodiments, the system controller 152 may compute the acceleration and speed of the carrier, by the x-y motion system 180, to prevent, or reduce the likelihood of, spills from the open-top vessel. The controller system 152 may use a different acceleration and speed profiles (e.g., ramp rates) based on how full the open-top vessel is. For example, the controller system 152 may apply a higher acceleration for an empty open-top vessel compared to a half full open-top vessel, and the controller may apply a higher acceleration to a half-full vessel than an empty vessel to avoid tipping over an empty vessel with a relatively high center of gravity. In some embodiments, the system controller 152 may compute the acceleration and speed of the carrier based on the geometry of the open-top vessel. For example, if a vessel has a narrow opening a higher speed may be employed compare to a vessel with a very wide opening. In some embodiments, the speed and acceleration profiles are adjusted based on the characteristics of the liquid (e.g. viscosity) inside the open-top vessels.

In some embodiments, the actuators of gantry and rails can operate concurrently to reduce the time to move the carrier from a first location to a second location in an x-y plane. In some embodiments, to move the carrier from a first location to a second location in the x-y plane, first the actuator of the rail is activated to move along the y axis and then the actuator of the gantry is activated to move along the x axis. In some embodiments, the system controller may instruct the actuators to operate in a specific order, or some may operate concurrently (e.g., to move diagonally or in a Bezier curve path (which may be computed by the controller based on a start and end position) that is relatively aesthetically pleasing to users viewing through a window of the kiosk). Such instructions may be based on various reasons such as preventing collision of vessels, planned stops at various stations along the way, etc.

In some embodiments, sensors are placed on only one of the rails 184 or 186. In some embodiments, sensors are placed on both rails 184 and 186. Or in some cases, sensors are mobile and flags (e.g., optical flags or magnetic flags) are static and sensed by the mobile sensor. In some embodiments, to increase the accuracy of the position of the carrier, the system controller 152 calculates the position of the carrier along the y axis using a weighted combination of signals, e.g., by interpolating the positions received from the sensor on rail 184 and the sensor on rail 186. In some embodiments, a motor or other actuator is coupled to only one of the rails 184 or 186. In some embodiments, an actuator or a motor is coupled to both rails 184 and 186. In some embodiments, machine-readable position-encoded scales in line with gantry 182, and rails 184, and 186 are used instead of sensor to locate the position of the carrier 188. The machine-readable position-encoded scales may be printed on a substrate having a zero coefficient of thermal expansion in the operational temperature of the automated beverage preparation system 150 (e.g. 10-40° C.).

In some embodiments, a grid 190 (or randomized pattern in which different locations have unique sets of features in a field of view of a camera) may be placed directly below the x-y motion system 180. The grid may be parallel to the barrier, under or above the gantry 182, and rails 184, and 186. A visual odometry sensor may be placed on the carrier 188 with a field of view oriented to read the instantaneous x and y positions of the gantry based on features in the field of view of the camera. In some embodiments, no calibration is needed other than an optional one-off mapping against an absolute standard to further enhance accuracy.

In some embodiments, a specific location along the gantry 182 and the rails 184 and 196 is determined to be used for re-calibration of the x-y-motion system, e.g., a magnetic flag sensed with a Hall-effect sensor or an optical flag sensed with an optical sensor. For example, the specific location can be the first end of the gantry system and the first end of the rail 184. It should be noted the length of the rails 184 and 186 are not necessarily the same.

In some embodiments, a plurality of gantries are positioned on the rails 184 and 186 (or another gantry may run on another set of rails above, below, between, wider than, or interdigitated with those shown). The plurality of gantries may operate at the same height or they may pass over each other in some embodiments.

Using a x-y motion system or other two-degree-of-freedom robots may reduce space and parts costs of a robot relative to six axis or higher degree of freedom robotic arms. An x-y motion system can be placed under a tabletop surface with less space needed compared to other types of robotics, such as six-axis robotic arms. An x-y motion system or other two-degree-of-freedom robots may be also cheaper than other robotics to be used in an automated beverage preparation system to move open-top vessels on a planar surface, as the cost of additional actuators and accompanying controller and maintenance complexity may be avoided or mitigated. In addition, an x-y motion system with two degrees of freedom may afford relatively high throughput compared to systems in which the robot holds the workpiece during the entire manufacturing process, as the robotic system 154 may dynamically bypass temporarily congested workstations and accumulate inventory of work-in-process (e.g., lining up partially prepared beverages to the side of a congested workstation) to keep bottleneck workstations running closer to full capacity during periods with fluctuating demand. That said, embodiments are not limited to systems that afford these advantages, which is not to suggest that any other described feature is limiting.

Various types of actuators may be used. In some embodiments, the actuator is a linear motor. In some embodiments, the actuator is a stepper motor. In some embodiments, the actuator is an induction motor. In some embodiments, the actuator is a pneumatic motor or hydraulic motor. The motors may have motor driver circuits coupled to a power bus of the system 150 and a control bus of the system 150. The control bus may be operative to convey commands, such as changes in target set points (e.g., in terms of location, velocity, or acceleration) from the controller to the motor drive circuits, which may selectively apply power from the power bus to the corresponding actuator to effectuate the operations specified by the commands (e.g., applying a P, PI, or PID feedback control algorithm to the actuator to achieve the target setpoint). Or in some cases, control may be via point-to-point communications, like in a hub-and-spoke topology, rather than on a shared bus. In some cases, control is implemented via supervisory control and data acquisition (SCADA), Modbus, Controller Area Network (CAN bus), or various other process automation protocols.

Various types of drive mechanisms may also be used. In some embodiments, the rails 184 may be implemented as threaded shafts, and the gantry 182 may couple to the threaded shafts with a threaded nut at each end of the gantry 182, e.g., as a linear screw drive. In some embodiments, the threaded shafts are coupled with a belt, chain, or gearing that causes the threaded shaft to have zero degrees of relative freedom of rotational movement, such that when one shaft rotates, the other shaft rotates, thereby keeping the gantry 182 aligned. In some embodiments, the rails 184 and 186 include a rack, and the gantry 182 may include a set of pinions at either end of the gantry 182. In some embodiments, the pair of opinions may be similarly mechanically linked, such as with a belt, chain, or shaft, such that the pair of pinions rotate with zero degrees of relative freedom, keeping the gantry 182 aligned orthogonal to the rails 184 and 186. In some embodiments, rails 184 and 186 may be implemented as chains or belts to which the gantry 182 is coupled, such that rotation of the chains or belts about pulleys or gears at either end causes the gantry 182 to translate.

Actuators may be disposed in various frames of reference. In some embodiments, a first motor or other actuator is static with respect to a working environment of the robot, such as the kiosk described above or a building in which the system is disposed, and the first motor causes the gantry 182 to translate along the rails 184 and 186. Or in some embodiments, this first actuator is coupled to the gantry 182 and moves with the gantry as it translates, for instance, in a rack and pinion drive. In some embodiments, a second motor or other actuator is coupled to the gantry 182 and moves with the gantry 182, the second motor causing movement of a carrier 188 along a length of the gantry 182. Or in some embodiments, the second motor is mounted to the carrier 188. The same types of motors or other actuators and drive mechanisms as described above may be used to move the carrier 188 along the length of the gantry 182.

Figure 4:
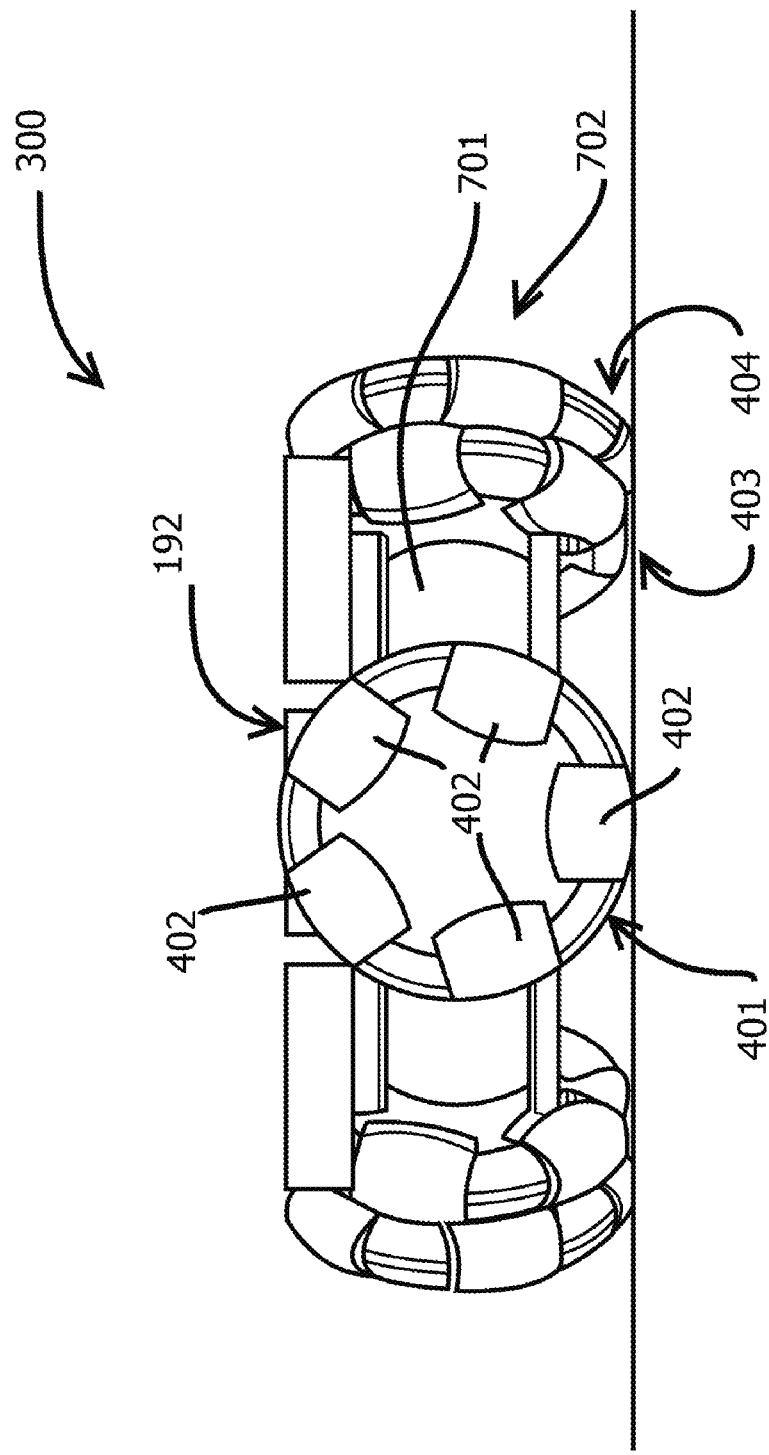
FIG. 4 is an elevation view of another robot for moving a workpiece consistent with some embodiments of the present techniques.

In some embodiments, the robotic system 154 comprises a plurality of autonomous mobile robots 300 capable of moving in various directions, e.g., with concurrent movements in overlapping (e.g., coterminous) working areas. FIG. 4 shows a front elevation view of representation of an autonomous mobile robot 300. In some embodiments, an autonomous mobile robot comprises omnidirectional wheels 702 driven by on-board electric motors. The wheels and the electric motors may be installed in a circular-shaped main body (e.g., a chassis) 701. In some embodiments, each of the wheels are powered via respective on-board motors or other actuators. Motors extending from each of the wheels may be located internal to the main body. In some embodiments, the motors are actuated by power supply situated in the chassis, e.g., a battery that is charged by driving the robot 300 to where it can make electrical contact with a charging station. Or in some cases, power is conveyed through a wired connection, via sliding resilient electrical contact biased against conductive plates above and below the robot (each plate having a different electrical charge), or via inductively conveyed power from coils in the robot and adjacent the robot. In some embodiments, the power supply can be batteries, re-chargeable batteries, solar cells, etc.

In some embodiments, an open-top vessel may be placed on an autonomous mobile robot to be moved across workstations. In some embodiments, the autonomous mobile robot may be placed below the barrier and is configured to actuate an open-top vessel via an end-effector with a primary and secondary members. Or in some embodiments, the autonomous mobile robot operates above the barrier. For example, a plurality of such robots may navigate through a shared work area by routing paths between various workstations, in some cases, coordinating in route selection to avoid collisions during concurrent movements.

In some embodiments, the three wheels are each of similar size and type, and the three wheels may be configured to make continual contact with surfaces that are curved and uneven. In some embodiments, the wheels have a primary wheel 401 driven by a corresponding actuator of the robot 300 and a plurality of secondary wheels 402 that are rotationally symmetrically arrayed around the perimeter of the primary wheel. In some cases, each axle has an inner wheel 403 and an outer wheel 404. In some embodiments, the motors are oriented perpendicular to the wheel direction of travel. In some cases, the secondary wheels 402 are not independently actuated and may be free to spin of their own accord relative to the primary wheel 401. In some cases, the wheels are Mecanum wheels or omni-wheels. In some embodiments, the robot 300 may be made to rotate about a vertical axis or translate along two orthogonal axes by applying corresponding patterns of actuation to the respective wheels (e.g., with three degrees of freedom of movement in a planet, like front/back, side-to-side, and rotation about a vertical axis). In some embodiments, the autonomous mobile robot has three omnidirectional wheels forming an equilateral triangle configuration with an angle 60° between each wheel. In some embodiments, the autonomous mobile machine has three or more wheels that are not omnidirectional.

In some embodiments, the autonomous mobile robot 300 may further comprise a localization system. The localization system may comprise a variety of position sensors. In addition, the autonomous mobile machine is provided with a control system in charge of the planning and movement based on the instructions received from the system controller 152 and the data received from the localization system. The ultrasonic sensors oriented facing outward in the plane of movement provide feedback for the control system to avoid obstacles. Visual odometry or other techniques like those described above may be used to determine location and orientation of the robot 300. The autonomous mobile robot 300 may be designed to move a variety of open-top vessels. In some embodiments, movements may be computed to conform to wave-cancelling motion profiles.

In some embodiments, a plurality of autonomous mobile robots may be disposed in a shared working environment of a system 150, like below and adjacent barrier 166 in kiosk 160. The autonomous mobile robots may be arranged in cells, wherein several machines each perform the same process. For example, several robots 300 may be configured to move a vessel through all the preparation processing, from receiving the vessel from a cup dispenser to leaving the cup at a delivery gate. Alternately, several robots 300 may be utilized on an assembly line, wherein each machine performs unique steps of a production sequence. For example, one machine may be in charge of moving the vessels from a cup dispenser to a brewing station. In some embodiments, a plurality of autonomous mobile robots may be assigned by the system controller 152 to be in charge of cups and vessels provided by customers. Such autonomous mobile robots may be equipped with respective sets of end effectors that can grip a variety of different type of vessels, like those described in relation to the gantry system. In some embodiments, the mobile robot 300 includes a top-mounted end-effector mount 192 like those described below. Or in some cases, the robot 300 operates above the barrier 166.

Figure 5A:
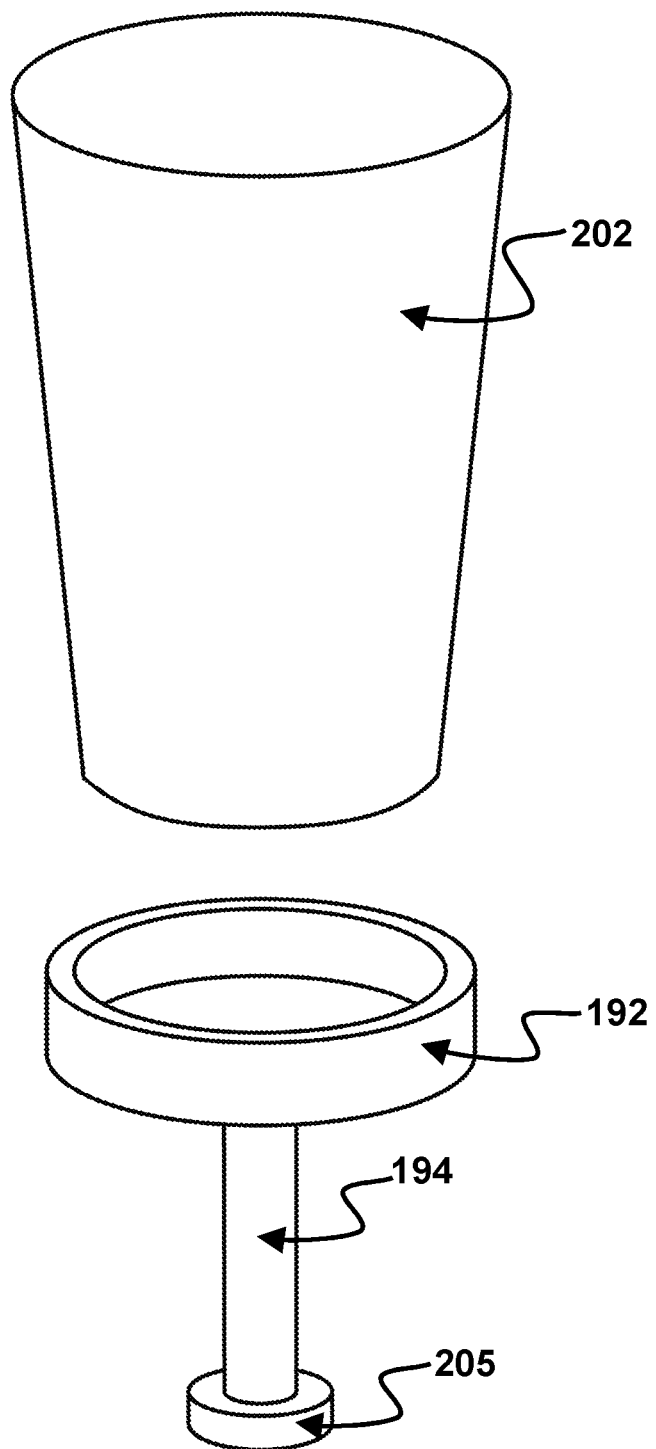
FIG. 5A is a perspective view of an end-effector coupling and end effector for moving a workpiece consistent with some embodiments of the present techniques.

FIG. 5A is a perspective view of an example end-effector mount 192 that may be placed on the carrier 188 or on the chassis of an autonomous mobile machine 300 to move along the x and y axes, in accordance to some of the embodiments of the present techniques. The end-effector mount 192 may be configured to couple to a set of end-effectors that receive an open-top vessel 202 and hold the vessel while the open-top vessel is being moved by forces applied by the carrier 188 or an autonomous mobile machine 300. In some embodiments, the end-effector mount 192 includes an actuator, like the examples above, operative to adjust positions of a set of three couplings thereon consistent with the approaches below.

Figure 5B:
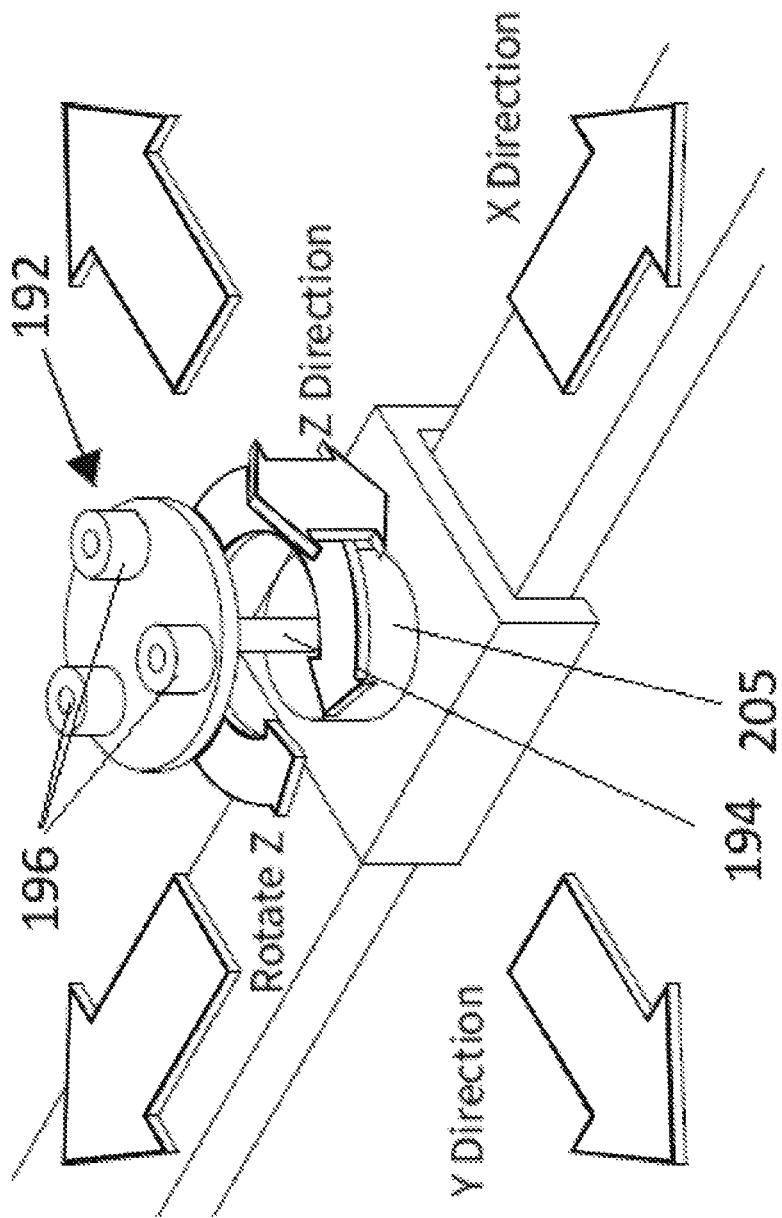
FIG. 5B is a perspective view illustrating various degrees of freedom of an example robot for moving a workpiece consistent with some embodiments of the present techniques.

As shown in FIG. 5B, in some embodiment, the end-effector mount 192 is configured to rotate about a center axis through shaft 194. The shaft 194 may be rotated by electric motor 205 (or another actuator) attached on the carrier 188. In some embodiments, the center axis 194 is operative to translate up and down along the center axis, which may be a z-axis that is orthogonal to the illustrated x and y axes. Arrows show a possible direction of movement. In some embodiments, a similar end-effector mount 192 is coupled to one of the above autonomous mobile robots. In some embodiments, the actuator 192 has two or fewer degrees of freedom, e.g., rotation from shaft 194 about an axis of rotation and movement of couplings 196 relative to one another, for instance radially outward from the axis of rotation corresponding to shaft 194. In some embodiments, the end-effector mount 192 has one and only one degree of freedom and is configured to selectively engage and disengage, via magnetically coupled end effectors like those described below, with two different workpieces concurrently, e.g., starting to move a first cup, then starting to move a second cup while moving the first cup, then ceasing to move one or the other while continuing to move at least one.

In some embodiments, a plurality of end-effector couplings (e.g. members) 196 are placed on surface of the end-effector mount 192 to guide movement of magnetically coupled end effectors contacting a vessel (not shown, but above barrier 166 placed above couplings 196). In some embodiments, the couplings have a frusto-conical or right-circular cylindrical shape. In some embodiments, three couplings are positioned in an equilateral triangle configuration or other rotationally symmetric configuration. In some embodiments, the couplings 196 each include a magnet with a pole oriented upward, along the z-axis to form a magnetic coupling with an end effector having a complementary magnet orientation on another side of a barrier, like barrier 166 described above. In some embodiments, three end-effectors 196, forming an equilateral triangle, are configured to be engaged with different size of vessels.

Figure 6:
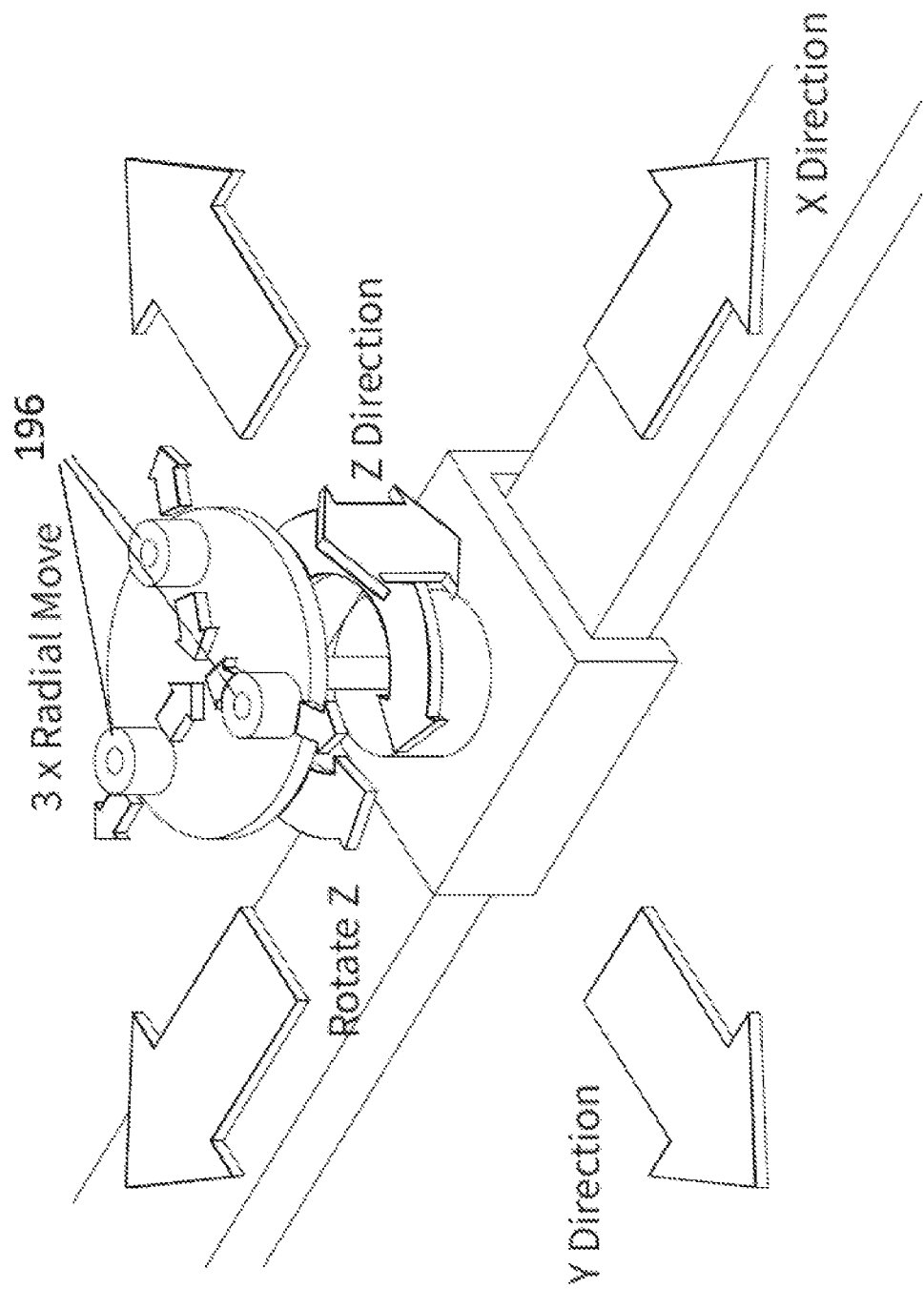
FIG. 6 is another perspective view illustrating various degrees of freedom of a robot for moving a workpiece consistent with some embodiments of the present techniques.

FIG. 6 shows three couplings 196 configured to move end-effectors radially inward and outward, keeping an equilateral triangle formation, to receive and manipulate vessels with different diameters. Radial movement of end-effectors may grip and hold a vessel, or other embodiments may push vessels without gripping vessels. Radially adjustable end-effectors may be mechanically lined to an actuator and a drive, like a screw drive operative to move the end-effectors outward, or a spiral slot in a plate rotated by shaft 194 and in which pins slide while also sliding in slots extending radially outward in a top plate. A gear reducer may be used to convert the higher speed rotation of the shaft of a motor to the slower but more powerful rotation.

In some embodiments, the working volume of the robot (i.e., the volume reachable by its end effectors) may be a generally rectangular prism. The working volume may be characterized as a working area in virtue of the height being generally uniform, constant, and relatively small compared to other dimensions, in some embodiments. In some embodiments, the working area is larger than 100 square centimeters, for instance larger than 5 cm by 10 cm, larger than 20 cm by 60 cm, and in some cases, larger than 50 cm by 80 cm. In some cases, the working area is provided with a relatively small volume of space reserved for movement of the robot under the barrier. For instance, a depth of less than 1 cm (e.g., in the case of the array of electromagnets described below), less than 5 cm, less than 10 cm, less than 20 cm, or less than 50 cm may be reserved below the barrier for movement of the carrier and gantry or other end-effector couplings and supporting robotic assemblies. In some embodiments, the ratio of working area to volume reserved for actuation of the end effectors, e.g., by of the robot, may be less than 1 cubic cm per square cm of working area, less than 5 cubic cm per square cm of working area, less than 10 cubic cm per square cm of working area, less than 20 cubic cm per square cm of working area, or less than 50 cubic cm per square cm of working area.

Some embodiments mitigate additional automation-related challenges. In some existing robots, robot actuators shed particles, like grease and worn machine parts, and it is desirable shield open-top vessels from these particles.

Figure 7A:
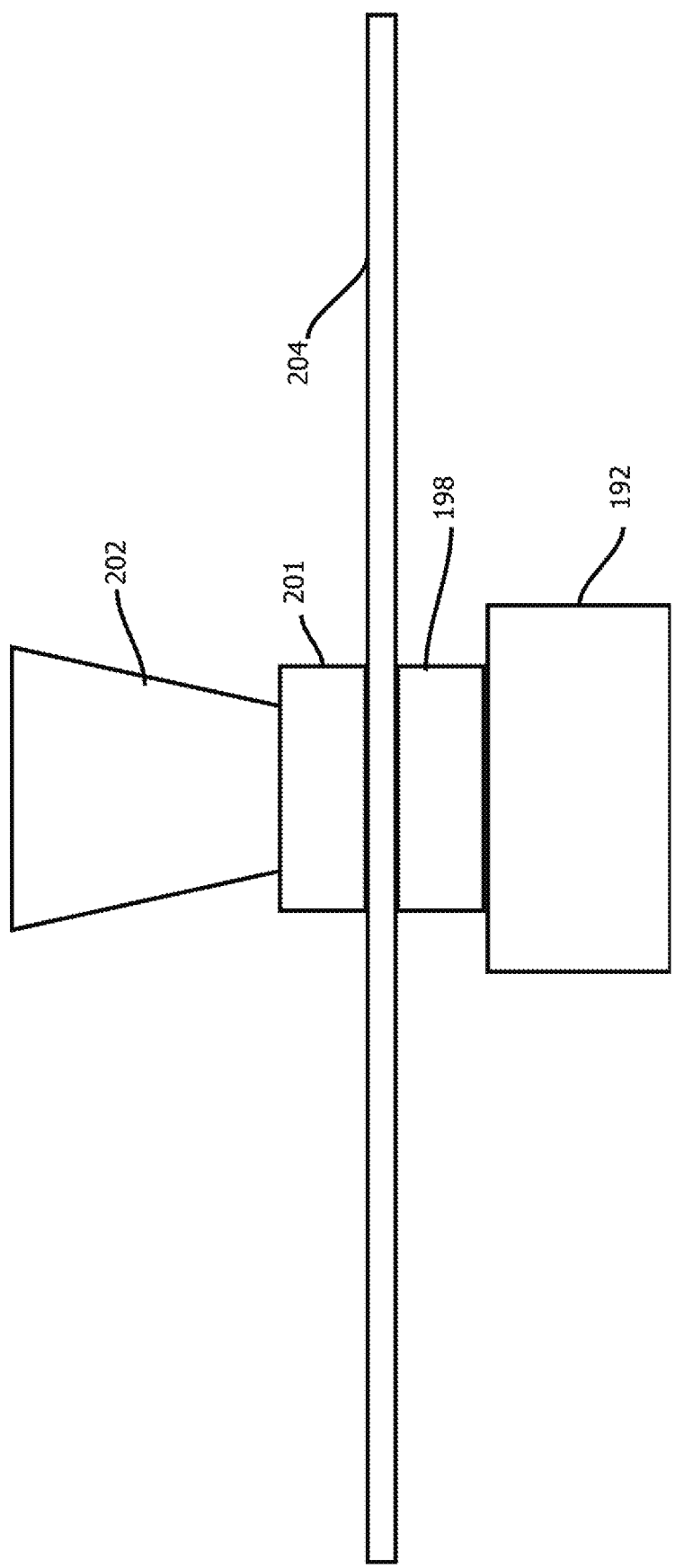
FIG. 7A is a cross-sectional elevation view of an end-effector coupling and end effector of an example robot consistent with some embodiments of the present techniques.

FIG. 7A is a cross-section elevation view of an end effector (i.e., the component that makes contact with the workpiece to move the workpiece) and end effector coupling of a robot in accordance with some embodiments of the present application. A barrier 204 may separate the coupling 198 from the open-top vessel 202.

In some embodiments, the barrier 204 is a thin, rigid, non-ferrous, non-magnetic surface such as glass, wood, or plastic. In some embodiments, the end-effectors may comprise a primary member 198, positioned on the bottom side of the barrier 204, and the end effector coupling may comprise secondary members 201, positioned on the top side of the barrier 204.

In some embodiments, a secondary member 201 may be placed inside the open-top vessel or physically attached to it (e.g., with an adhesive). In some embodiments, an open-top vessel, or a portion of it, may have a magnetically responsive material, and the open-top vessel itself may be employed as the secondary member 201. In some embodiments, the open-top vessel is the secondary member. For example, some embodiments may have cups or bows with a ferrous metal base or with magnets coupled to their base. Or some embodiments may have cups or bowls that are made of a ferrous metal. In some cases, the cups or bowls are reusable.

For instance, in some embodiments, users may provide a deposit to be returned upon return of such a workpiece. Or in some cases, a user may be charged upon determining that the workpiece has not been returned to the kiosk in a threshold duration of time, like after two hours or a day. In some embodiments, the kiosk further includes a robotic dish washer operative to receive returned cups or bowls, wash and sterilize them, and then return them to an inventory of a cup or bowl dispenser workstation. In some embodiments, cups or bowls may have an optical code thereon (like a QR code or bar code sticker or engraving) or a radio frequency identifier chip (like an NFC chip), such as a passive RFID chip, and a reader on the robot may read the identifier before dispensing the cup or bowl, associate the identifier with a user's profile, and effectuate deposits returns or follow-on charges with the appropriate user's account upon determining that the same identifier was not read or was read by another reader in a return station of the kiosk.

In some embodiments, the sheet is an air permeable barrier and a primary member is coupled to a secondary member via a suction force (e.g., through airflow drawn by the primary member). The suction force may be induced by a vacuum pump in fluid communication with couplings 198.

Figure 7B:
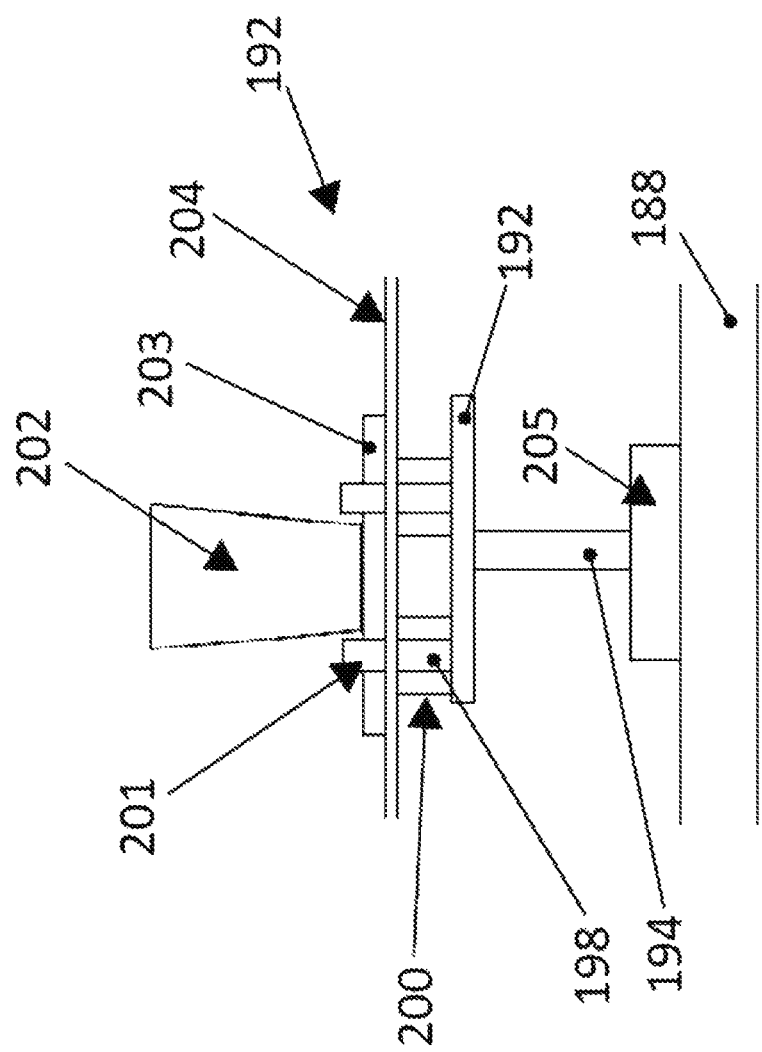
FIG. 7B is another cross-sectional elevation view of an end-effector coupling and end effector of a robot consistent with some embodiments of the present techniques.
Figure 8A:
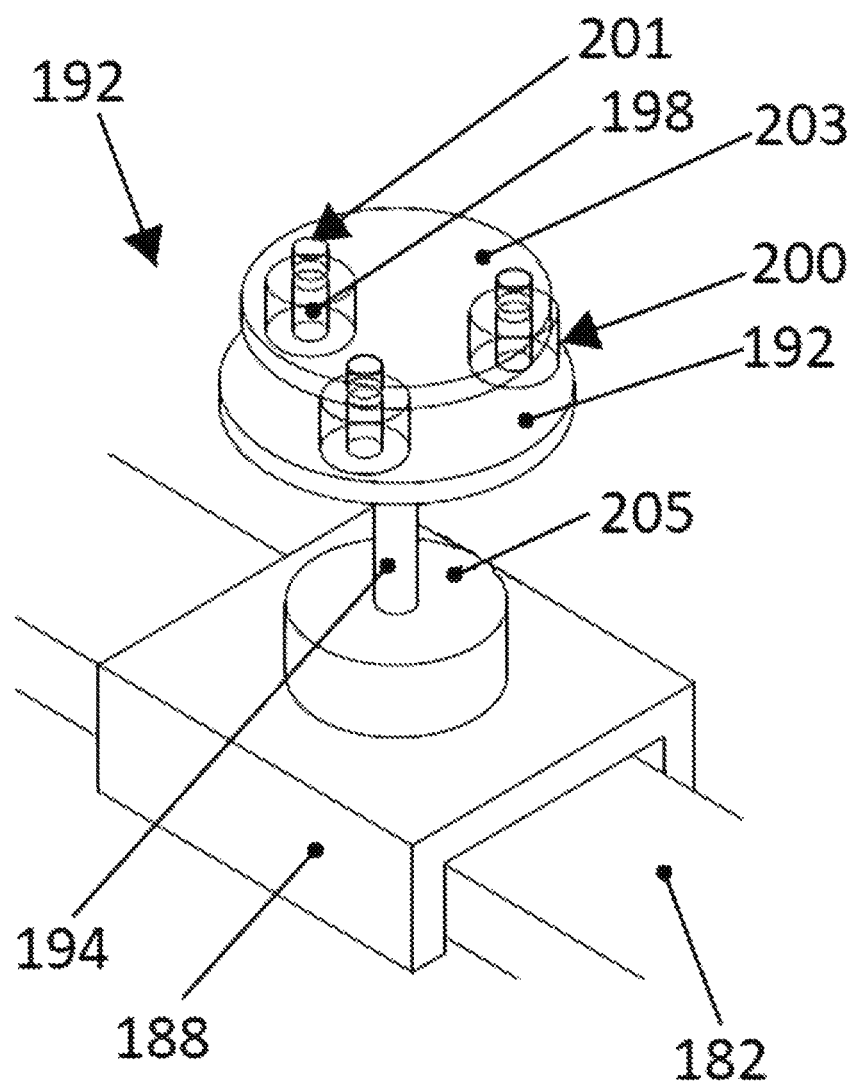
FIG. 8A is a perspective, partially occluded line drawing, partially wire framed line drawing of an end-effector coupling of a robot consistent with some embodiments of the present techniques.

FIG. 7B is an elevation cross-section view of an end-effector mount 192 coupled to a set of end effectors carrying a vessel, and FIG. 8 is a perspective view of the end-effector mount 192. A barrier 204 may separate the illustrated robotic system 154 from the vessel 202. In some embodiments, the barrier 204 is a thin, rigid, non-ferrous, non-magnetic surface such as glass, wood, or plastic. In some embodiments, the barrier 204 is a transparent material (e.g., permitting more than 20% of light to pass). In some embodiments, the barrier 204 is an opaque material.

In some embodiments, the robot comprises of a plurality of coupling/end-effector pairs having primary members 198, positioned on bottom side of the barrier 204, and secondary members 201, positioned on the top side of the barrier 204, e.g., end effectors. In some embodiments, in each coupling on the end-effector mount 192, a housing 200 surrounds the primary member 198. In some embodiments, another housing 203 surrounds each secondary member 201. In some embodiments, the housing 203 contacts vessels. Each primary member 198 may be magnetically coupled with a secondary member 201 positioned aligned on the top of the primary member 198 above the barrier 204. The primary member 198 and secondary member 201 each may have at least magnet, wherein the at least magnet of the primary member magnetically attracts at least magnet in the secondary member. In some embodiments, each coupling may include a pattern of magnets arranged, for instance, with alternating north and south poles oriented upward, and end effectors may have a complementary pattern, e.g., in embodiments in which a particular orientation of the end effector is selected by the magnetic coupling. Or in some cases, a single magnetic pole may be oriented upward, and the end effector may not have a rotational alignment specified by the magnetic coupling. In some embodiments, some or all of the magnets in the secondary member or primary are, instead, a magnetically attractable material such as a magnetic metal.

In some embodiments, the magnets are permanent magnets, such as rare earth magnets. Rare earth magnets are strong, permanent magnets made from alloys of rare earth elements. Elements include neodymium iron boron (Neo) and samarium cobalt magnets. In some cases, the magnets are identical, or in some cases the magnets vary size or variety. Magnets in the primary and secondary members may be of opposing polarity such that they attract one another. In some embodiments, samarium cobalt SmCo is used to take advantage of its high resistance to demagnetization and corrosion resistance. Rare earth magnets may be formed in a variety of shapes and sizes that may be configured and adapted to a housing 200 and 203. For example, these shapes may include discs, rods, cubes, plates/blocks, tubes, rings, horseshoes, spheres, dimpled rods, and cubes with holes. In some aspects, an array of rare earth magnets is used as a substitute for one larger magnet. In some embodiments, a ferromagnetic material is disposed between the rare earth magnets to increase the magnetic force exerted by the rare earth magnets. This may allow for thinner or smaller rare earth magnets to be used without diluting the magnetic force exerted. In some embodiments, the magnetic components (opposing polarity rare earth magnets) of the secondary member may compare in size, location and strength to their mating magnetic component in the primary member and will be of opposing polarity to affect the magnetic attraction between the master and secondary members. Some embodiments may include a magnetic lens to concentrate magnetic flux.

A variety of types of magnetic couplings are contemplated. In some embodiments, the primary members have permanent magnets and the secondary members have magnetically responsive, e.g., ferrous, materials. In some embodiments, the secondary members have permanent magnets and the primary members have magnetically responsive materials. In some embodiments, the primary members have electromagnets and the secondary members have permanent magnets. In some embodiments, the secondary members have electromagnets and the primary members have permanent magnets. In some embodiments, the primary members have electromagnets and the secondary members have magnetically responsive materials. In some embodiments, the secondary members have electromagnets and the primary members have magnetically responsive materials. In some embodiments, the members comprise an electromagnet, having an electronic actuator that delivers current to the electromagnet. In some embodiments, the electromagnet can comprise a metal core, such as an iron alloy. A wire coil can be wrapped around the metal core and a current from a power source can be directed to the wire coil. The power source may be any type, such as a battery source or a power source contained in the automated beverage preparation system 150.

In some scenarios, the secondary member may become uncoupled from the primary member, e.g., if the primary member is accelerated aggressively, if a vessel has a large amount of inertia, or if friction increases on the top of the barrier due to a spilled, sticky material. Once the magnetic couple between the master and secondary members is lost, the loss may be detected, and retrieval and repositioning of the secondary member may be performed. In some embodiments, the primary member comprises a Hall-effect sensor operative to output a signal to the controller indicative of whether a magnet from the secondary member is present, indicating whether the primary member is coupled to the secondary member. In some embodiments, a capacitive sensor on the primary member my output a signal indicative of a change in capacitance across the barrier caused by loss of the secondary member. In some embodiments, a coil with a time-varying current in the primary member may induce a time-varying current in a complementary coil in the secondary member, and changes in inductance (e.g., as indicated by a natural frequency of the coil in the primary member) may signal a loss of the secondary member.

In response to detecting loss of the secondary member, embodiments may recover the secondary member with a variety of techniques, including executing coverage path planning algorithms. In some cases, the primary member may be driven in a rastering scan pattern across a working area of the robot to re-capture the secondary member. In some cases, a camera with a field of view of the working area above the barrier may be accessed, and computer-vision object detection and localization routines may be used to detect a location of the lost secondary member based on images of the working area from the camera. End effectors may have a distinct color relative to other portions of the interior or the system to facilitate detection. The computer vision algorithm may indicate a location in the working area of the lost secondary member, and embodiments may drive the primary member to that location to recapture the end effector.

In some embodiments, the robot is operative to self-right a lost secondary member that is positioned on its side. For instance, an intensity and polarity of magnetic flux from the primary member may cause a secondary member on its side to jump to the proper orientation when proximate the primary member. Or in some cases, the secondary may member may include an array of magnets around its top side with a matching polarity to the top of the primary member, to create a repulsive force that pushes the top of the secondary member upward while pulling the bottom of the secondary member downward to rotate the secondary member back into the upright position. In some embodiments, the system comprises a spare set of end effectors that maybe pulled from when one is lost, e.g., by driving the primary member to a designated location in the working area. In some cases, different end effectors with different shapes may be held in reserve and swapped out to perform different tasks, e.g., a squeegee end effector may be swapped out with those shown to clean a surface of the barrier 166 in response to detecting a spill, for instance, by pushing spilled liquid or cleaning solution toward a drain (which could be a hole, break, cut-away, or actuated opening in barrier 166). Some embodiments integrate a drain or other openings to allow dispensed liquid to pass thru the barrier 166, for example, some embodiments dispense liquids from faucets directly over the barrier 166 into a break or actuated hole opening in the surface. Some embodiments include a workstation to dispense a cleaning fluid onto the barrier 166 before it is applied by a squeegee end effector executing a coverage path routine.

In some embodiments, the magnets are polarized in a direction perpendicular to the plane of the barrier. The magnets of the master and the secondary members are also arranged so that in operating position the pole faces on the primary member are aligned with pole faces of unlike polarity on the secondary member. The first set of forces may operate perpendicular to the plane of the barrier and aligned with that plane's normal vector, and these forces may urge the respective primary and secondary members toward each other and against the barrier surfaces. Further, when the primary and secondary members are mis-aligned vertically, e.g., immediately upon acceleration of one, the other may experience a shear force, as the magnets attempt to regain alignment, and this shear force may cause the secondary member to follow the primary member across the barrier as the primary member translates horizontally. The second set of forces operates parallel to the plane of the barrier, and these forces are the forces which act upon the secondary member to cause it to track the primary member as the latter is moved below the surface of the barrier. In some embodiments, the magnetic elements in each of the units are disposed so that transverse displacement of the primary member in any direction relative to the secondary member tends to align a pole on the primary member with a pole of opposing polarity of the secondary member.

The illustrated end effectors have a generally frusto-conical shape with bearing and magnets adjacent a bottom face. In some embodiments, end effectors may have other shapes. In some embodiments, the end effectors are spheres of magnetic material (e.g., between 0.5 cm and 2 cm in diameter) configured to roll on the surface. In some embodiments, the end effectors comprise a sphere of magnetic material (or a permanent magnet) inside a shell of plastic, and the magnetic material may remain in a static orientation while the shell rotates around the interior as the end effector translates. In some embodiments, the end effectors have an arch-shape (when viewed from above), and an inner diameter of the arch may be complementary to an outer diameter of a beverage, bowl, or other work piece. In some cases, distal ends of the arcs may have respective magnets to impede free rotation, and in some embodiments, one workpiece per end effector may be concurrently transported, e.g., in a set of three arch-shaped end effectors.

In some cases, various techniques may be applied to reduce static or dynamic friction between the end-effectors and couplings (e.g. primary members or secondary members) and the vessels with the surface of the barrier. Examples include circulating air through the surface of the barrier over which vessels slide through an array of holes, like in an air hockey table, or circulating air through the end effectors or couplings, like as is done in a hovercraft. Other examples include vibrating the barrier, the couplings, or the end effectors, e.g., with a piezoelectric actuator, a voice coil, or with an eccentric mass attached to a motor. Some embodiments may include ball bearings that contact the surface over which the vessel slides or on the bottom of the vessel or a carrier of the vessel. In some embodiments, a plurality of bearings (e.g. ball bearings or cylinder bearings) may be placed on the surface of end-effectors or couplings (e.g. primary members or secondary members) adjacent the barrier to ease the movement of the end-effectors on the surface of the barrier. In some embodiments, the diameter of bearings may be less than 20% of the diameter of the end-effectors. In some embodiments, the diameter of bearings may be less than 10% of the diameter of the end-effectors. In some embodiments, the diameter of bearings may be less than 5% of the diameter of the end-effectors. In some embodiments, the barrier has a smooth surface with minimal adhesion that facilitates movement of end-effectors and the vessels on its surface.

Some embodiments slide open-top liquid vessels over a planar surface with permanent magnets, temporary magnets, electromagnets or a combination thereof. In some cases, the attractive force of an electromagnet is adjusted over time responsive to a shear load applied to the end effectors, e.g., a larger current may be driven through an electromagnet responsive to determining that a vessel is full or is undergoing an acceleration above a threshold.

Figure 8B:
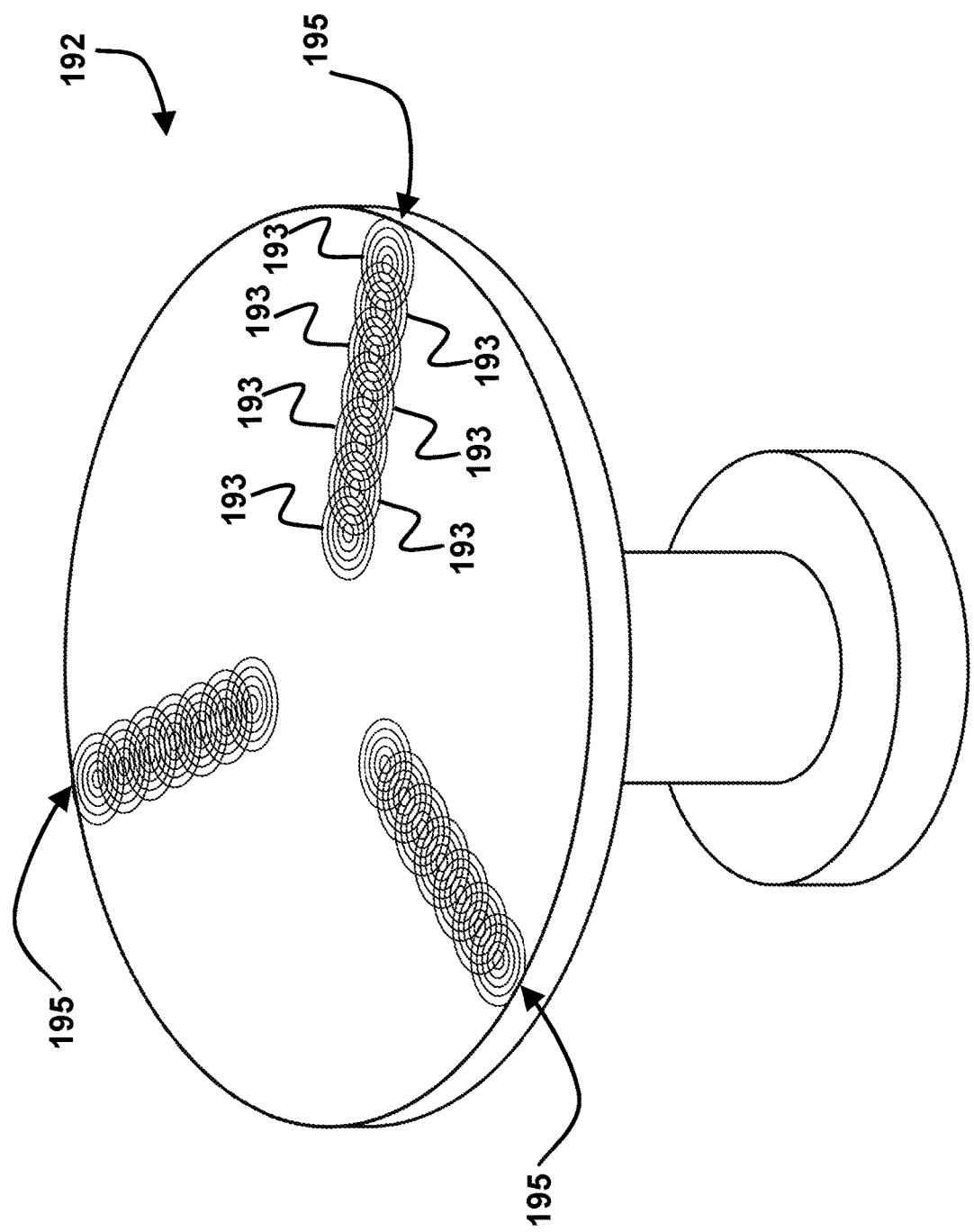
FIG. 8B is a perspective view of another an end-effector coupling of a robot consistent with some embodiments of the present techniques.

In some embodiments, as shown in FIG. 8B, the end-effector mount 192 comprises electromagnets 193 arranged in spatial arrays 195, each being 120 degrees apart in a radially symmetric arrangement. In some cases, different electromagnets 193 in the array are selectively activated in sequence to move an end effector. For instance, each electromagnet 193 from the inner radius to the outer radius may be actuated sequentially to pull an end effector with a magnet or magnetically responsive material radially outward, and the operations may be reversed to move it radially inward. In some cases, the end effectors have permanent magnets and the direction of current flow of the illustrated electromagnets 193 is selected to both push and pull the permanent magnet, e.g., an electromagnet forward in a direction of travel may have a direction of current flow that pulls the end effector toward it, while one behind the end effector in the direction of travel may have an opposite direction of current flow to push the end effector via its permanent magnet.

Arrays of electromagnets may be applied even more expansively in some embodiments. In some cases, a grid (e.g., hexagonal or rectangular) of electromagnets may be arranged on the end-effector coupling to move end effectors to arbitrary positions thereon, provided that fields of adjacent end effectors do not interfere with one another. In another example, such a grid may be applied over an entire working area of the barrier 166 to move end effectors thereon, without the underlying gantry system discussed above, which is not to suggest that any other feature may not be omitted in some embodiments. In some embodiments, rows and columns of linear motors (e.g., synchronous, induction, or homopolar linear motors) may form a grid under the barrier and drive a permanent magnet of an end effector above the barrier 166.

Some embodiments slide open-top liquid vessels over a planar surface with actuators below the planar surface coupled with magnets over the planar surface, surrounding the vessels. Thickness of the planar surface is configured to be thin enough to allow sliding the magnets over the surface by moving the magnets below the surface.

In some embodiments, a single end effector is used. In some cases, a coaster-shaped end effector holds beverages and is magnetically coupled to the end-effector mount 192. In some cases, the single end effector is selectively engaged and disengaged by retracting the primary member away from the barrier, moving them downward in the z-direction, or by changing (e.g., stopping) current flow in an electromagnet in the primary member. In some cases, different sets of end effectors may accompany vessels through an assembly process, and the end-effector mount 192 may selectively engage and disengage different end effectors at different times.

As noted above, many belt conveyers are inefficient because vessels move linearly, and in synch, between work stations, and the preparation process is limited by the slowest step (which is not to suggest that such approaches are disclaimed in all embodiments). In some embodiments, the system 150 may expedite product preparation by handling multiple vessels concurrently, in some cases, asynchronously. For examples, while one vessel is placed under an addition unit (or other workstation configured to dispense an alimentary product) to be filled, another vessel may be moved concurrently to another addition unit or a final product drop off location.

Figure 9A:
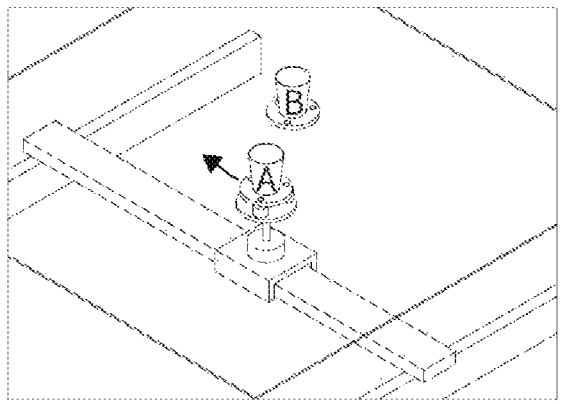
FIGS. 9A through 9F illustrate various stages in movement of a robot consistent with some embodiments of the present techniques.

In some embodiments, an x-y motion system 180 (or other two-or-more degree of freedom robot) may maneuver a plurality of open-top vessel on a planar surface to various workstations. FIGS. 9A-F illustrate an example of how an x-y motion system 180 may be actuated to engage, move, and release, multiple vessels on the top of a planar surface (not shown). In FIG. 9A, vessel A may be engaged with the carrier via a magnetic coupling, like those described above, and moved in the direction of the arrow along the carrier 188. In FIG. 9A, vessel B may be disengaged from the carrier and sit at another location on top of the planar surface.

Figure 9B:
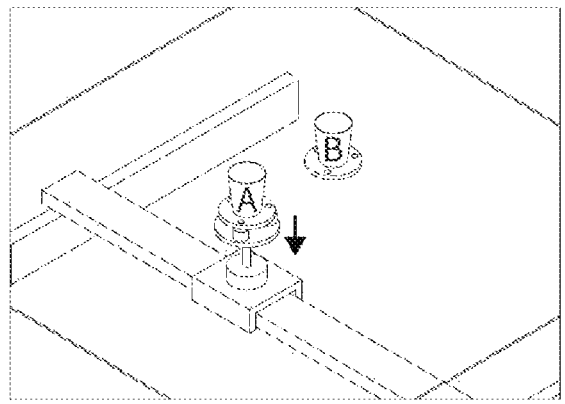

As shown in FIG. 9B, the primary member 198 may be lowered from the bottom of the planar surface by the center axis 194. As the primary member is moved away, the magnetic bond between the primary member and secondary member may be disengaged with the primary member and the carrier.

Figure 9C:
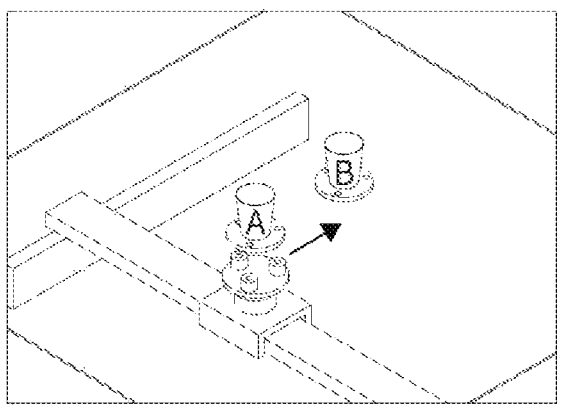
Figure 9D:
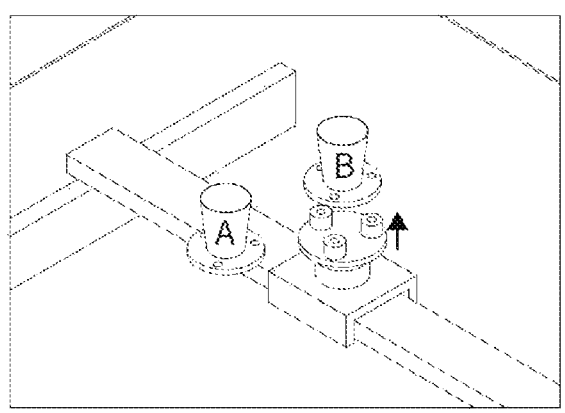

As shown in FIG. 9C, the disengaged carrier may be moved into position directly under vessel B. Vessel B may be already loaded on another secondary member 201. In FIG. 9D, the carrier is aligned directly below vessel B and the primary member is lifted by the center axis and as it approaches the planar surface, it starts to be engaged with the secondary member of vessel B.

Figure 9E:
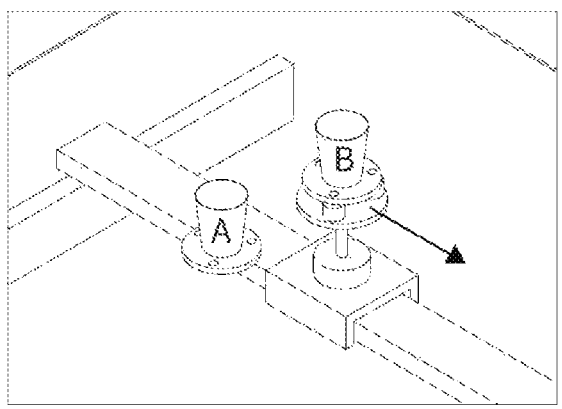
Figure 9F:
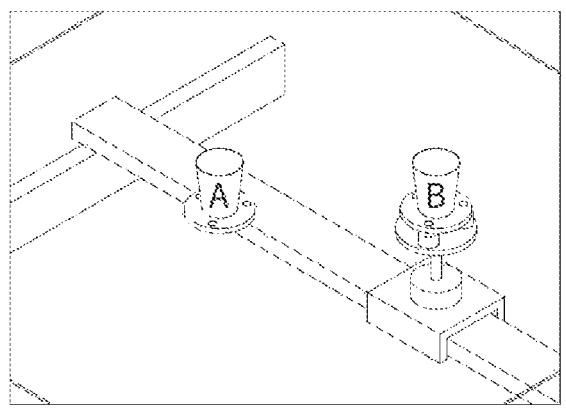

As shown in FIG. 9E, the carrier may be actuated by the motion system along the direction of arrow, and vessel B may be also moved with the carrier, in the direction of the arrow. As shown in FIG. 9F, vessel B may be engaged with the carrier and can be moved with the motion system, while vessel A is disengaged from the carrier and sits at another location on top of the planar surface.

In some embodiments, a plurality of vessel, such as vessels in FIGS. 9A-F, can be moved with an autonomous mobile machine instead of an x-y motion system.

In some embodiments, workpieces may be transported asynchronously along a single axis. For instance, a set of vessels may be moved along a linear sequence of workstations, with different vessels being moved at different times. Or in some embodiments, workpieces may be transported asynchronously along a two or more axes, e.g., two and only two axes, like in a horizontal plane. Such movements may facilitate operations in which the order in which ingredients are added to a vessel is varied based on predicted usage of various workstations. Various scheduling algorithms may be applied, taking into account which recipes are selected by users in a queue, how long various workstations take to complete their tasks, and queues for those workstations and the movement system. Examples include first in, first out; priority scheduling; shortest job first; first priority preemptive scheduling, round-robin schedule, multilevel queue scheduling, and work-conserving scheduling.

A workpiece is said to be among "work-in progress" (WIP) if that workpiece, e.g., an open top vessel, has started undergoing an assembly process. A unit of WIP may co-exist with other units of WIP concurrently within the illustrated systems. In some cases, the sequence with which steps of a recipe to complete WIP are applied may be dynamically re-sequenced responsive to the scheduling algorithms above and newly arriving WIP. In some embodiments, a given workstation may be operative to selectively provide different outputs, e.g., coffee, hot water, or dairy, and in some cases, multiple workstations may have the same capabilities.

In some cases, two workpieces may be moved concurrently by the illustrated robots. For instance, in a set of three end effectors, a left-outer and middle end effector may push one vessel, and the middle and a right-outer end effector may push another across the above-described barrier 166 at the same time (e.g., where the spacing between adjacent end effectors is less than a diameter of a bottom of a cup). In some cases, the right-outer end effector may rotate backward (relative to the direction of travel) to disengage from a vessel to the right while continuing to be engaged with a vessel to the left in the preceding arrangement, or vice versa. Thus, in some cases, with a single-degree of freedom mapped to the end effectors, two workpieces may be concurrently moved, while being engaged and disengaged at different locations in the working area. In some cases, a force may be applied to a vessel by end effectors in only one net direction, while a counteracting force may be applied by friction from the vessel sliding against the barrier, and the latter may be used to stop the vessel from moving after the former pushes the vessel along a path. In some cases, a more aggressive deceleration profile may be selected when a third end effector is used to help stop the vessel than when friction is used to stop the vessel.

In some cases, two workpieces may be moved concurrently (e.g., simultaneously) in movement by which one workpiece at a workstation is swapped with another (as described in additional detail below with reference to FIGS. 13C-E). For instance, in a set of three end-effectors, a forward end effector may be disposed adjacent (e.g., in contact with) a far-side of a vessel at a workstation, and a middle end effector may be disposed adjacent a near-side of the vessel at the workstation, with the vessel being generally to the right of the forward and middle end effectors. At the same time, another vessel waiting for the workstation may be disposed adjacent the middle and a rear end effector, generally to the left of the rear and middle end effectors. In some embodiments, the two vessels may be swapped by rotating the set of three end effectors about an axis through the middle end effector, e.g., clockwise 180 degrees. Or the left/right positions and direction of rotation may be reversed. In some cases, after completing this swapping movement, a now forward end effector may rotate backward, about the middle end effector, to form an equilateral triangle with the other two end effectors around the vessel withdrawn from the workstation, before (or while) the withdrawn vessel is moved to another workstation.

Some embodiments use a system of three-paired primary members 198 to transmit movement from a carrier 188, across a thin, planar surface, into a system of three secondary members 201 (e.g., end effectors). In some embodiments, this configuration allows vessels to be grabbed and released, as well as swapped with other vessels. This configuration also allows multiple vessels to be placed directly on to the planar surface without the use of transportation platforms.

The number of, pattern, and placement of secondary members may vary depending on design and task of a x-y motion system. When configured with one or two engaged secondary members, the actuated assembly is able to push and direct vessels across the planar surface. When configured with three or more engaged secondary members, a x-y motion system is able to grab, rotate and release a plurality of vessels as well.

Figure 10:
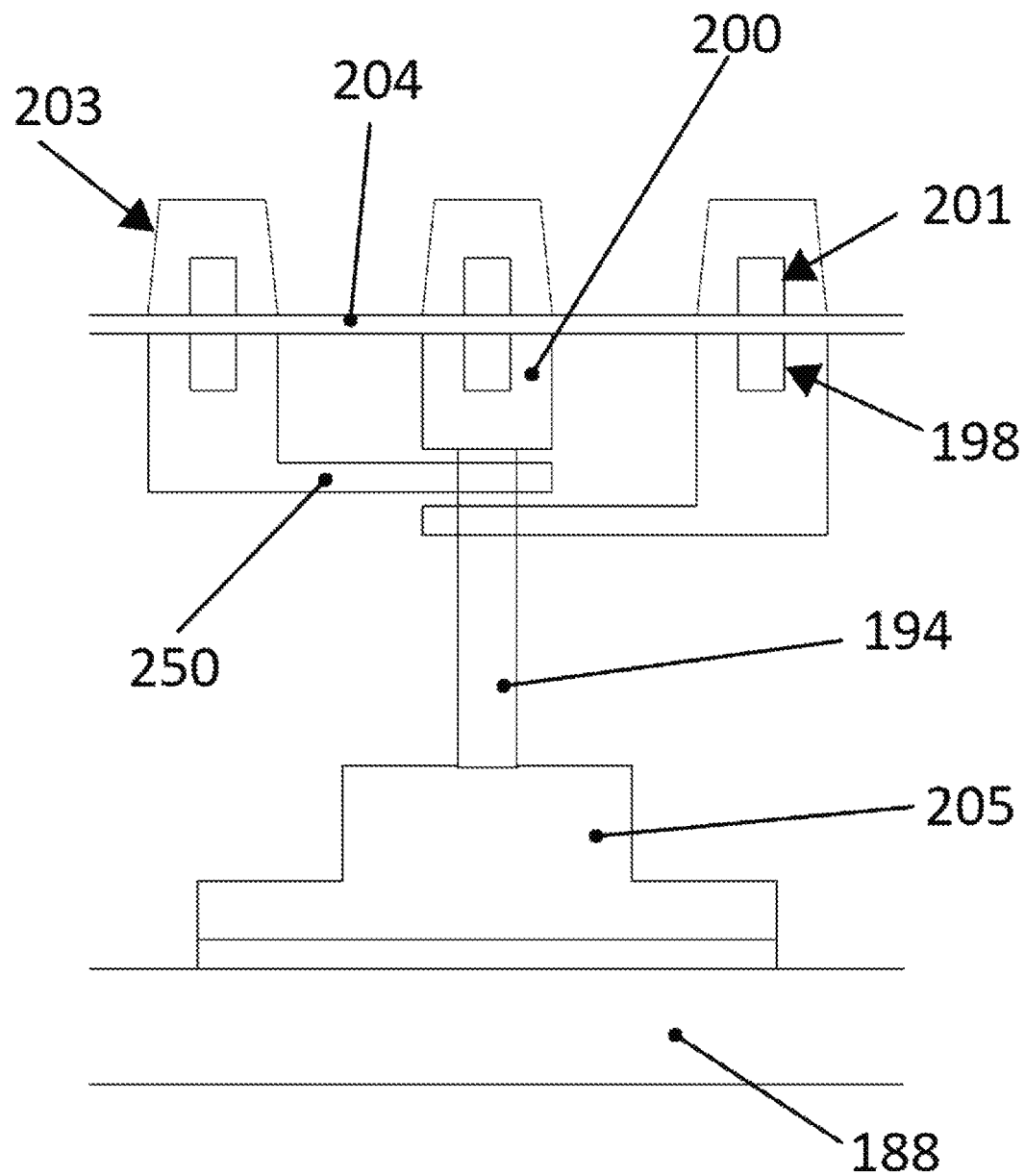
FIG. 10 is a wire frame elevation view of an end-effector coupling and end effector of a robot consistent with some embodiments of the present techniques.
Figure 11:
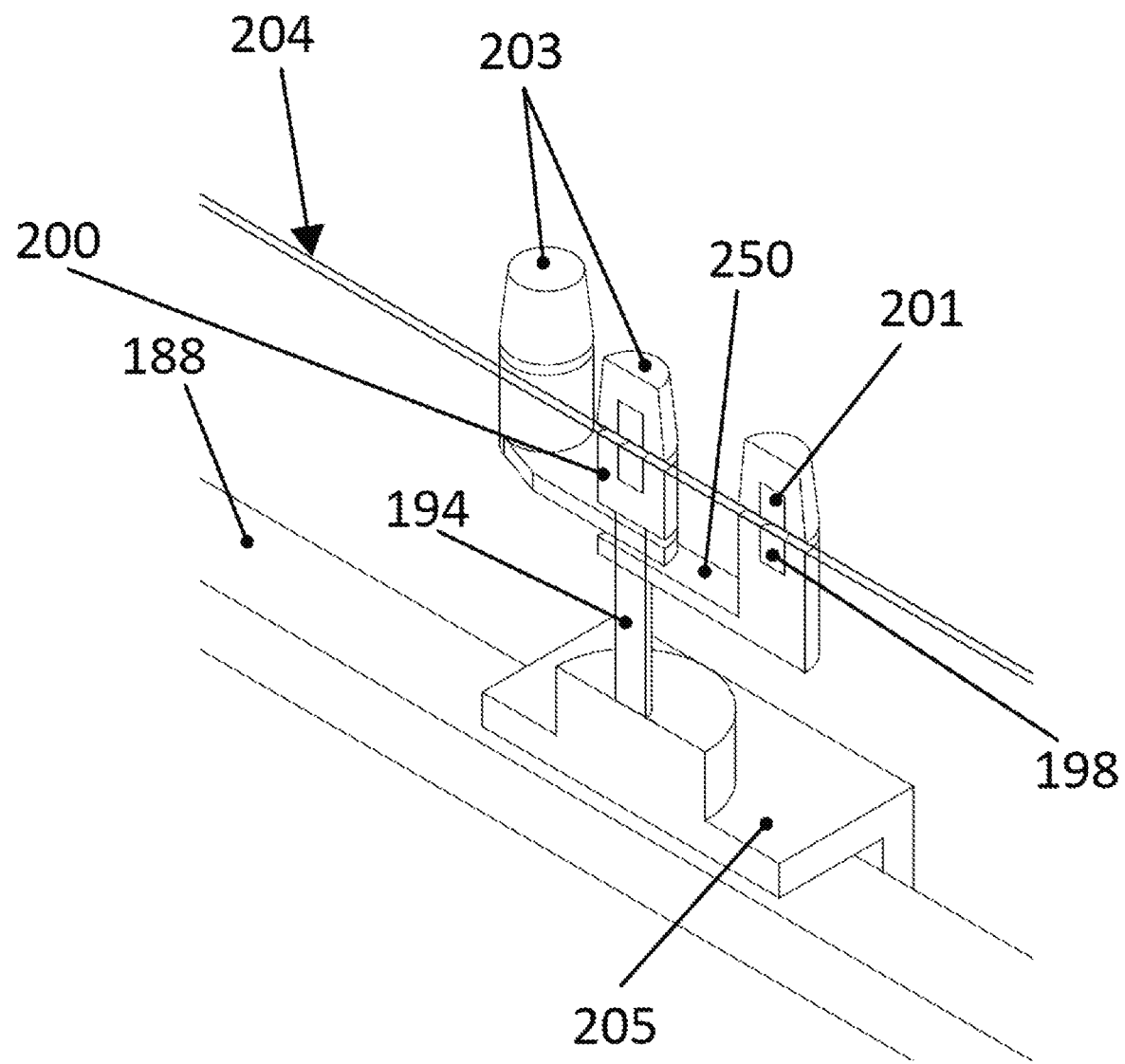
FIG. 11 is a cross-sectional perspective view of an end-effector coupling and end effector of a robot consistent with some embodiments of the present techniques.

FIG. 10 is an elevation cross-section view and FIG. 11 is a perspective cross-section view of a system of three-secondary member 201 paired with primary members 198. A barrier 204 may separate the three-secondary member 201 paired with primary members 198. In some embodiments, the barrier 204 is a thin, rigid, non-ferrous, non-magnetic surface such as glass, wood, or plastic.

In some embodiments, a system of three-paired primary members 198, positioned on bottom side of the barrier 204, are arranged with a middle primary member on the center axis 194 and two primary members attached to the center axis through shaft 194 with a respective rotation arm 250. In some embodiments, a rotation arm 250 can rotate around the center axis through shaft 194, e.g., with a range of motion of 360 degrees. In some other embodiments, a rotation arm 250 can rotate around the center axis through shaft with a smaller range of motion, like less than or equal to 180 degrees. Each three of the primary members can be engaged to a secondary member 201, positioned on the top side of the barrier 204. In some embodiments, a housing 200 is configured surrounding the primary member 198 and a housing 203 is configured surrounding the secondary member 201. The primary member 198 and secondary member 201 each may have at least one permanent magnet, and the at least one permanent magnet of the primary member may magnetically attract at least one mating permanent magnet in the corresponding secondary member.

Thus, in the illustrated example, the two, outer primary/secondary member pairs are coupled to the middle primary/secondary member pair via different respective arms. In some cases, the arms are coupled to, and driven by, different respective actuators, such that they three pairs collectively have two degrees of freedom. Or in some cases, the two arms may be coupled by a planetary gear that rotates about a first axis normal to a second axis extending through the middle primary/secondary member pair, e.g., also orbiting the second axis, in some cases, meshing with opposing face gears on opposing faces of the two arms. Thus, rotation of one arm about the second axis may cause an identical, opposing rotation of the second arm, and the two arms may both be driven by a single actuator with a single degree of freedom. Or in some cases, one of the arms may be fixes to the shaft along the second axis, e.g., rotating with the shaft, while the other arm may have an independent actuator that controls its rotation about the second axis.

Figure 12:
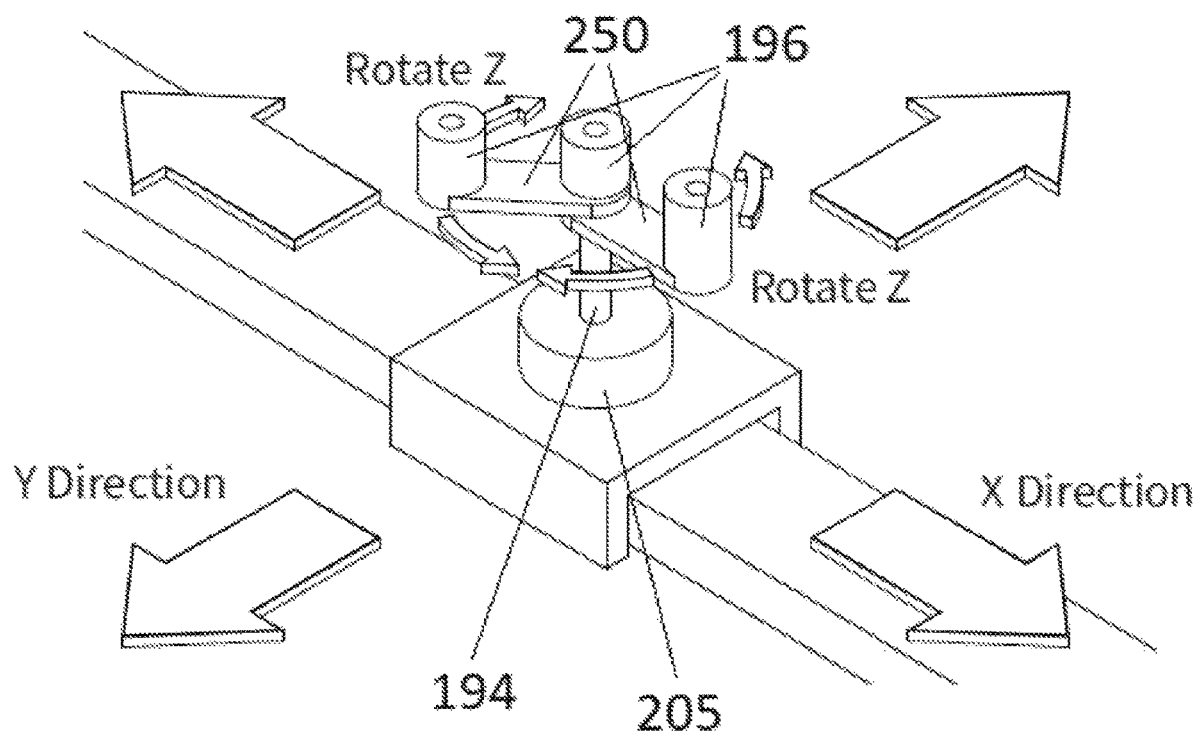
FIG. 12 is a perspective view illustrating various degrees of freedom of a robot consistent with some embodiments of the present techniques.

FIG. 12 is a perspective view of the system of FIGS. 10 and 11 and shows the components that are positioned underneath the barrier. In addition to the carrier being able to move in the x and y directions, two of the primary members may be able to be independently actuated rotational around the center axis via rotation arms 250. Or in some cases, the arms may be mechanically coupled and may rotate in opposing directions by equal amounts.

In some embodiments, a plurality of arms may be placed on the central axis. In some embodiments, the length of each of the plurality of the arms may be different from each other. In some embodiments, the length of each of the plurality of the arms may be equal. In some embodiments, the arms can move inward and outward radially from the center axis to adjust the distance between the secondary members in order to manipulate and maneuver different size of vessels. In some embodiments, additional arms with additional pairs of primary and secondary members may extend from each of the illustrated arms, and those additional arms may have additional degrees of freedom drive by additional actuators, e.g., to form a chain of end effectors.

In some embodiments, an x-y motion system 180 can be employed to maneuver a plurality of open-top vessel on a planar surface across workstations. FIGS. 13A-G illustrate an example of how an x-y motion system 180, with a system of three-paired primary members 198, may be actuated to engage, move, and release multiple vessels (in this example 2 vessels) on the top of a planar surface of a barrier (not shown).

Figure 13A:
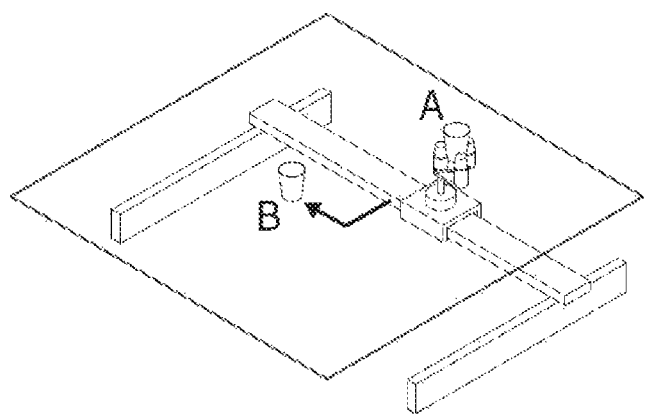
FIGS. 13A through 13G illustrate various ways in which a robot manipulates one or more workpieces consistent with some embodiments of the present techniques.
Figure 13B:
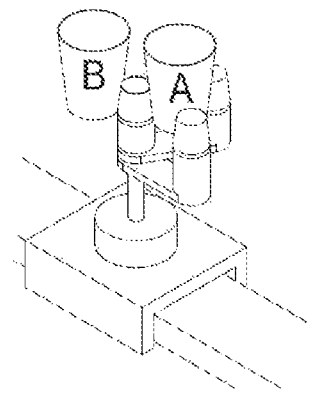

As shown in FIG. 13A, vessel A, surrounded and being moved by three secondary members, each engaged with one of the primary members of a system of three-paired primary members 198, is moved towards vessel B using a x-y motion system. As shown in FIG. 13B, vessel A, surrounded and moved by three secondary members, stops next to vessel B. As shown in FIG. 13C, one of the rotational primary members, and consequently the paired secondary member, is rotated counterclockwise about the center axis, releasing vessel A and engaging with vessel B. As shown in FIG. 13D, both of the rotational primary members are rotated counterclockwise, pushing both vessel A and vessel B in a counterclockwise motion about the center axis. It should be noted, in this configuration, the distance between each of the secondary members paired with the rotational primary members may be less than the diameter of the vessels. In some embodiments, the distance between each of the secondary members paired with the rotational primary members is less than 90%, 70%, or 60% of the diameter of the bottom of the vessels.

Figure 13C:
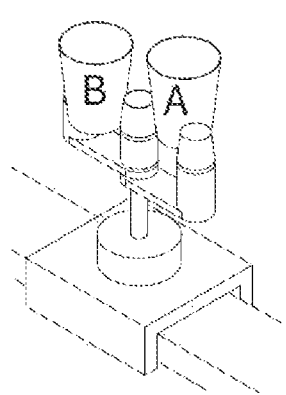
Figure 13D:
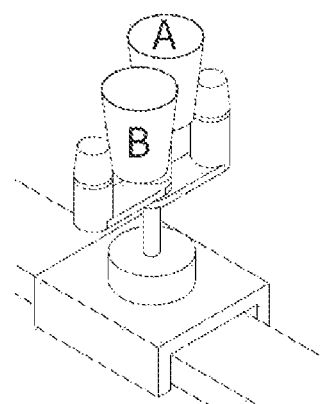
Figure 13E:
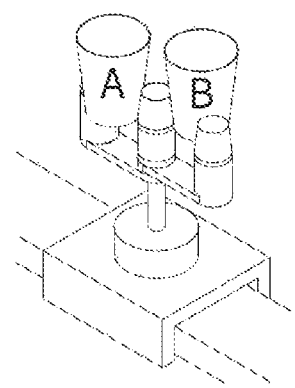
Figure 13F:
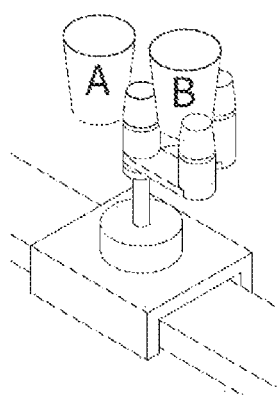
Figure 13G:
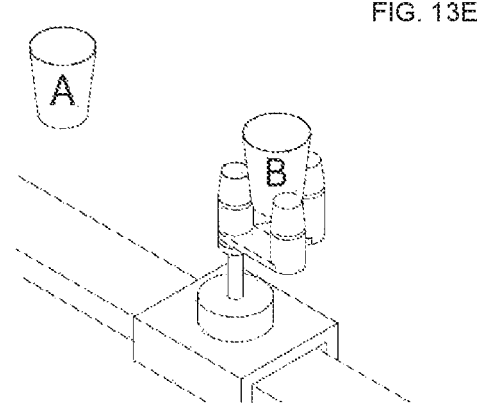

As shown in FIG. 13E, both of the rotational primary members may continue to rotate counterclockwise, pushing both vessel A and vessel B in a counterclockwise motion about the center axis to the point where positions of vessel A and vessel B have been swapped from where they were in positioned in FIG. 13C. In this move, each of the rotational primary members has rotated 180 degrees around the center axis. As shown in FIG. 13F, one of the rotational primary members rotates clockwise about the center axis, disengaging from vessel A and engaging with vessel B. As shown in FIG. 13G, vessel B, surrounded and is actuated by the secondary members, is moved away from vessel A via the x-y motion system.

In some embodiments, an x-y motion system 180, with radially-adjustable end-effectors, can be employed to maneuver a plurality of open-top vessel, with different sizes, on a planar surface across workstations. FIGS. 14A-H illustrate an example of how an x-y motion system 180, with radially-adjustable end-effectors, may be actuated to engage, move, and release multiple vessels (in this example 2 vessels) with different sizes on the top of a planar surface of a barrier (not shown).

Figure 14A:
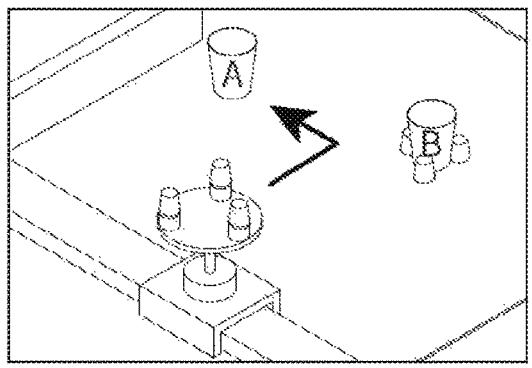
FIGS. 14A through 14H illustrate various ways in which a robot manipulates one or more workpieces consistent with some embodiments of the present techniques.
Figure 14B:
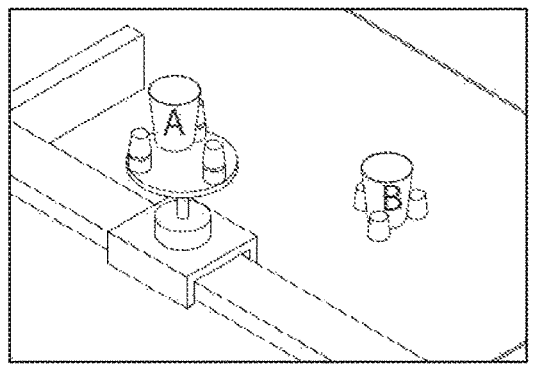
Figure 14C:
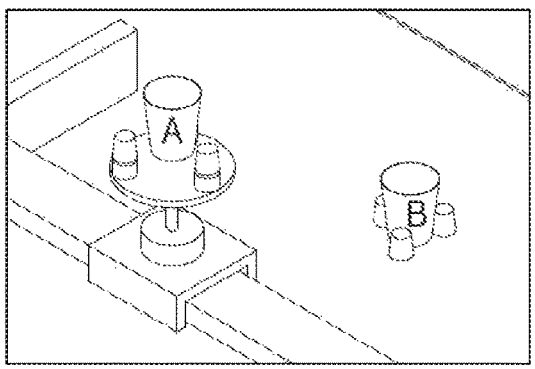

As shown in FIG. 14A, vessel B is on top of the planar surface, surrounded by three secondary members. Vessel A is placed without any secondary members nearby, also on top of the planar surface. A carrier of an x-y motion system with three radially-adjustable primary members, engaged with three secondary members, is actuated and moves towards vessel A. As shown in FIG. 14B, the carrier moves to a position nearly underneath vessel A. Note that the three primary members are in a radially extended position. This allows vessel A to pass between the three engaged secondary members. As shown in FIG. 14C, the three primary members are then moved radially inward, allowing the engaged secondary members to come in contact with vessel A. In some embodiments, vessel A and vessel B may have the same diameter. In some embodiments, vessel A and vessel B may have different diameters.

Figure 14D:
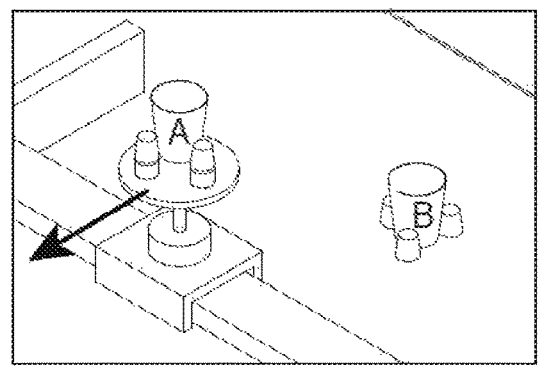
Figure 14E:
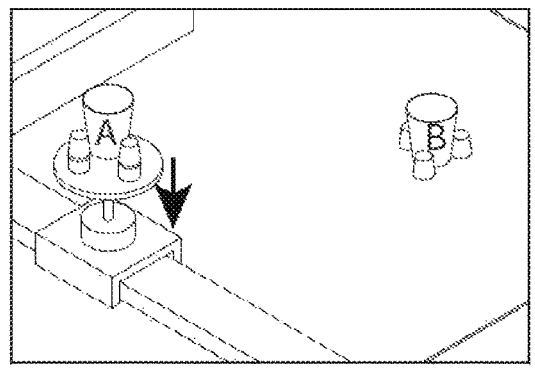
Figure 14F:
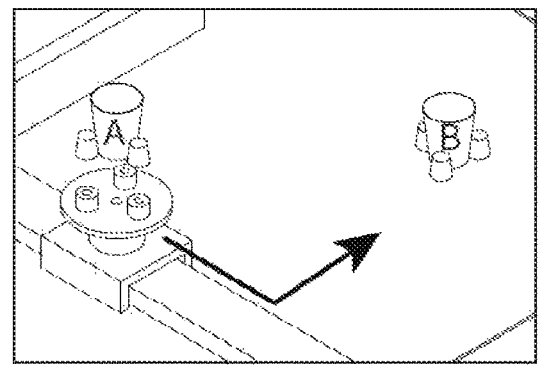
Figure 14G:
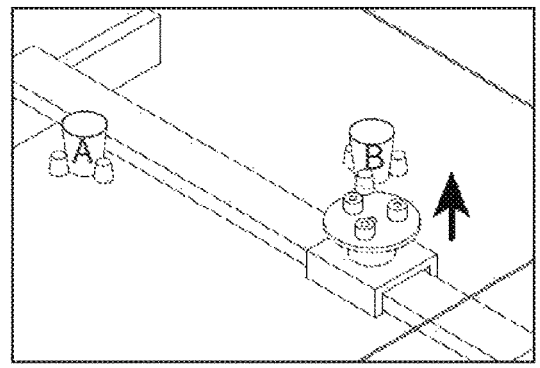
Figure 14H:
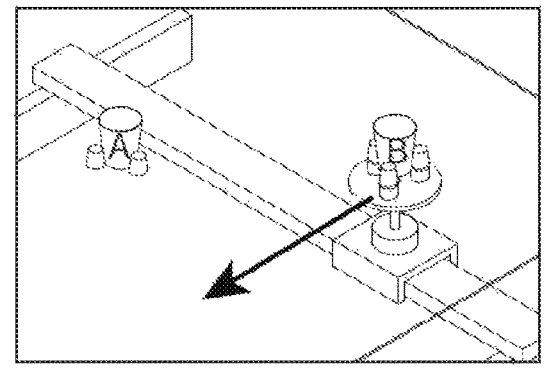

As shown in FIG. 14D, the carrier may be actuated in the direction of the arrow and the engaged secondary members direct vessel A across the planar surface with the carrier. As shown in FIG. 14E, the carrier stops and the primary members are moved downward via the center axis. This disengages the primary members from the secondary members. The secondary members surrounding vessel A are left in place above the planar surface. As shown in FIG. 14F, the disengaged carrier is actuated and moves towards vessel B. As shown in FIG. 14G, the disengaged carrier stops directly below vessel B. The primary members are moved upward towards the bottom of the planar surface via the center axis and engages with the secondary members that are surrounding vessel B. It should be noted that the primary members can be moved radially to be exactly below the secondary members surrounding vessel B. As shown in FIG. 14H, the carrier is engaged directly below vessel B and as the carrier is actuated in the direction of the arrow, vessel B is pushed across the planar surface in the same direction.

Some embodiments keep the magnets adjacent the barrier 166 (e.g., within less than 5, 3, 2, 1, or 0.5 millimeters) while accommodating deviations in planarity and uniform thickness of the barrier. If such deviations are large enough to cause misalignment, the components underneath the planar surface may either collide with the planar surface, or a gap may form between the primary members and the secondary members. If this gap becomes too large, the force between the primary members and the secondary members will be too weak to move the vessel around the planar surface (which is not to suggest that the following techniques or any other feature is required in all embodiments).

Figure 15:
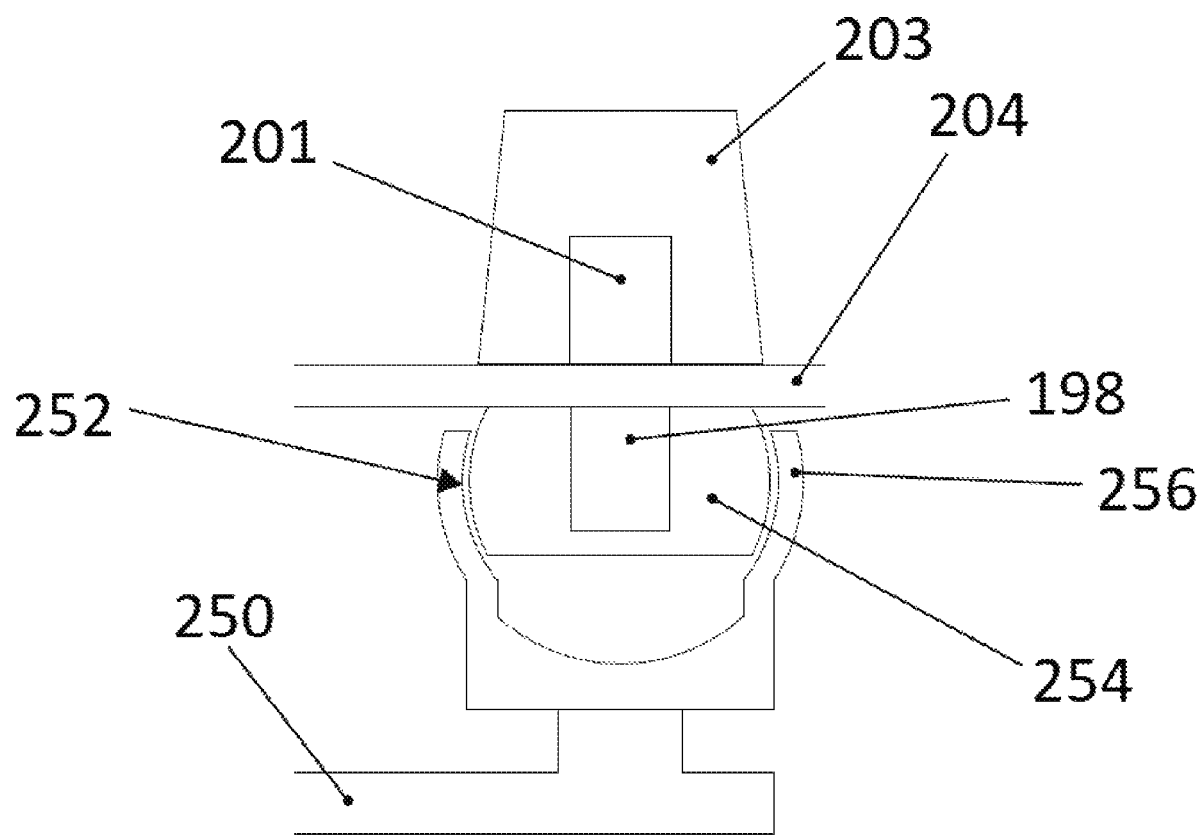
FIG. 15 is a cross-sectional elevation view of an end-effector coupling and end effector of a robot consistent with some embodiments of the present techniques.

As shown in FIG. 15, in some embodiments, a core-shell housing is configured to hold the primary members. The core 254 of the core-shell housing may have a spherical surface that is able to rotate freely (similar to a ball joint) inside of the shell 256 of the housing (e.g., within some threshold range of motion, like more than 5 degrees about any axis through a horizontal plane). A gap 252 may be provided between the core and the shell. In some embodiments, the gap 252 may permit the core to translate up or down. In some embodiments, the gap between the shell and the core may be lubricated to facilitate rotation of the core inside the shell.

Figure 16:
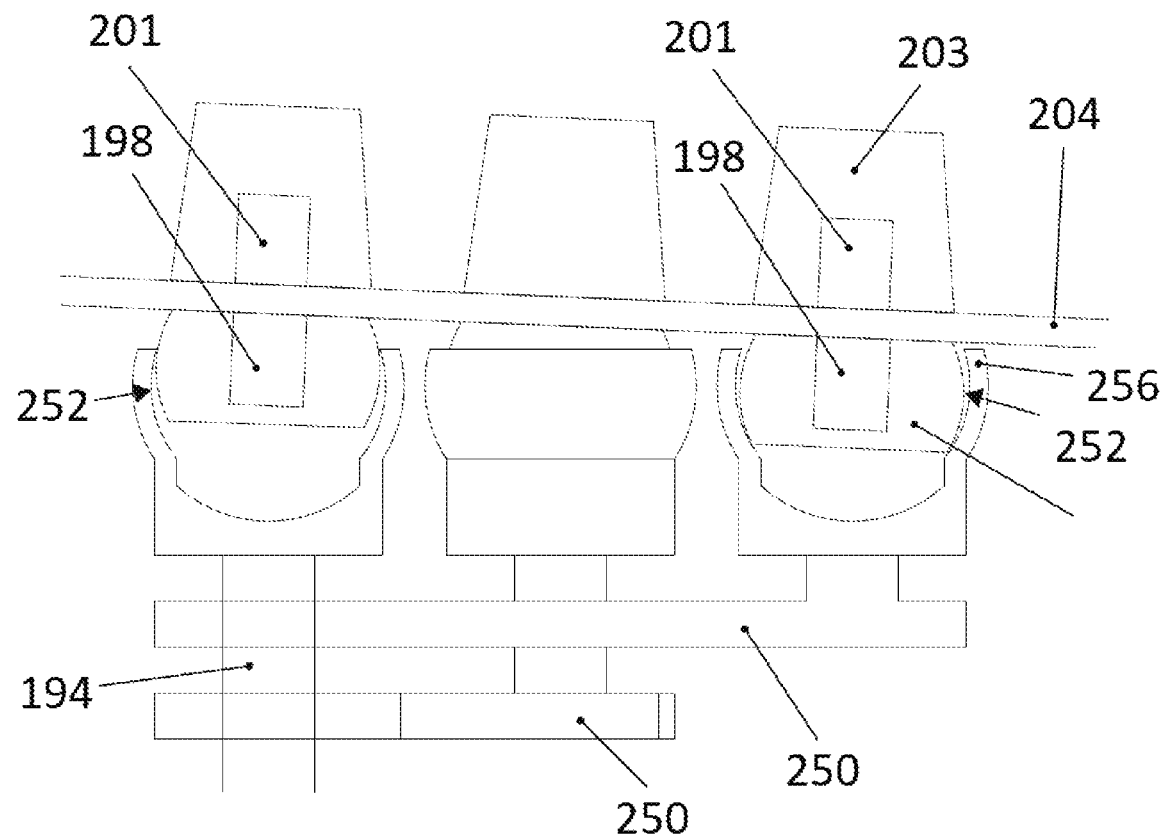
FIG. 16 is a cross-sectional elevation view of an end-effector coupling and end effector of a robot consistent with some embodiments of the present techniques.

In FIG. 16, a cross-section elevation view of the core-shell housing is illustrated. A planar surface (e.g., the barrier 166) and the rotation arms may not be parallel in some regions of a working area, for instance, due to a misalignment or tolerance issues between the planar surface and the carrier. On the left-hand side, the secondary member attracts the primary member and the core is pulled upwards into the shell structure. On the right-hand side, the core is able to move downward inside of the shell. In both cases, a connection is maintained between the primary member and the secondary member. In some cases, the core shell may resiliently flex to allow vertical translation of the core. This may allow the carrier movement to be translated up through the shell into the core, and across the planar surface to the secondary members. The rotation arms may not need to deflect in order to keep both of the primary members in contact with both of the secondary members. In some embodiments, the gap between the core and the shell can be adjusted to enable actuation of the secondary members across non-flat surfaces.

Figure 17A:
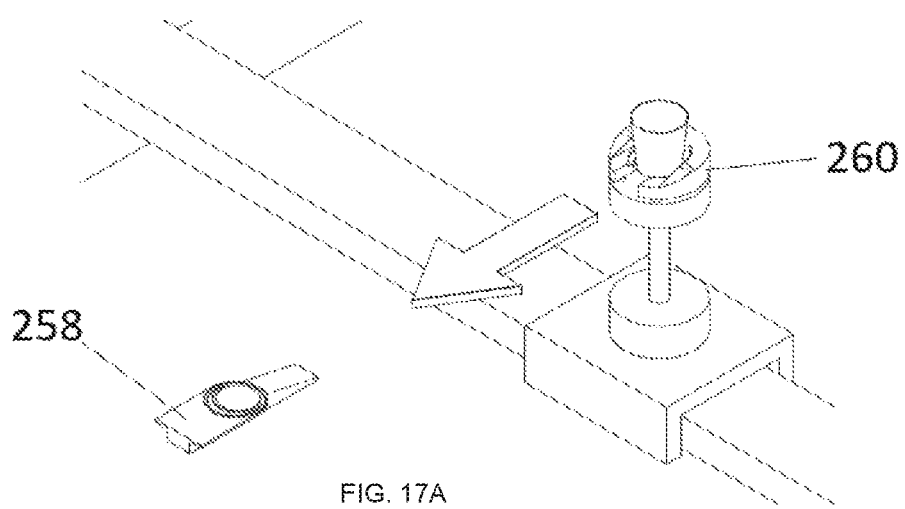
FIGS. 17A through 17G illustrate various ways in which a robot manipulates one or more workpieces consistent with some embodiments of the present techniques.
Figure 17B:
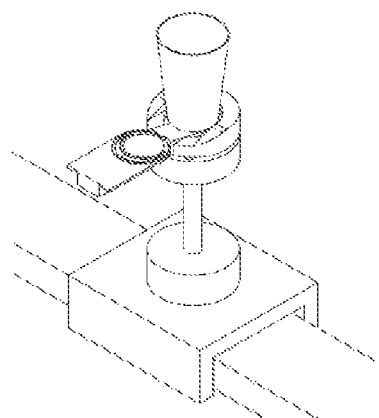
Figure 17C:
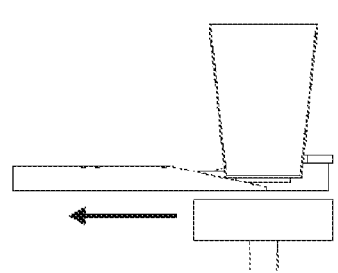

FIGS. 17A-G illustrate an example of how an x-y motion system 180 may deliver a vessel using a delivery ramp 258 with a one-piece end-effector 260. A delivery ramp may be a wedge as shown in FIG. 17A. The vessel may sit on top of the end-effector 260 and may be moved towards a delivery ramp. The central axis may rotate in order to get the delivery ramp to line up with a cutout in the end-effector 260. As shown in FIG. 17B-C, as the vessel is moved towards the delivery ramp, the front edge of the delivery ramp may slide through the opening in the end-effector 260, underneath where the vessel sits. The diagonal surface of the delivery platform ramp may make contact with the bottom edge of the vessel and may apply an upward force that causes the vessel to translate upward as it translates horizontally along the ramp.

Figure 17D:
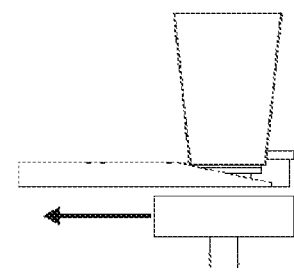
Figure 17E:
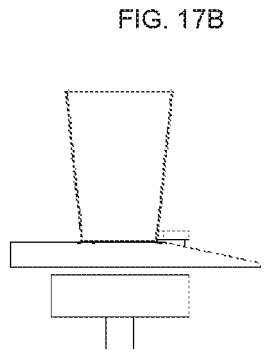
Figure 17F:
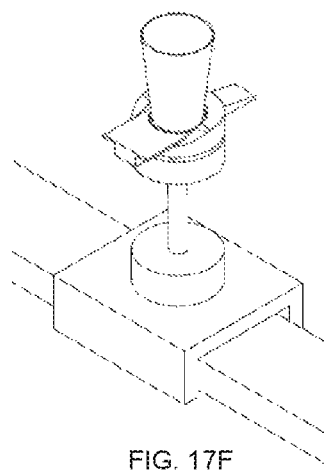
Figure 17G:
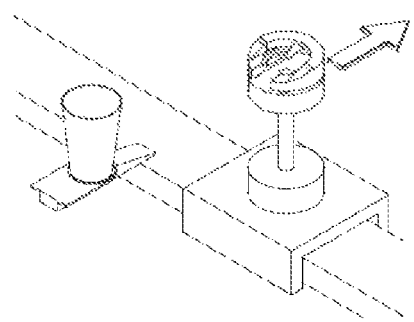

As shown in FIG. 17D, the back edge of the end-effector may continue to push vessel towards the delivery ramp. As this happens, the delivery ramp begins to lift the vessel off the end-effector. As shown in FIGS. 17E-F, the back of the end-effector may push the vessel to its final delivery position on top of the delivery ramp. The delivery ramp surface that is used to lift the vessel upwards may be transitioned into a flat, static platform for the vessel. As shown in FIG. 17G, actuated by the x-y motion system, the now-empty end-effector may back away from the vessel and delivery ramp, free to transport other vessels. The original vessel now sits on top of the delivery ramp, waiting for the next step in the assembly, transport, or delivery process.

In some embodiments, the beverage preparation system 156 shown in FIG. 1 may comprise a bin of coffee beans with a feeder that delivers beans to a grinder (e.g., a burr-mill grinder) before the ground beans are delivered to a brewing chamber that mixes the beans with water at between 190- and 210-degrees Fahrenheit. The system 156 may comprise steam boiler, brew boiler, dairy addition, mixer, sweetener dispenser, and other workstations. In some embodiments, a workstation may comprise a latte art printer, like those provided by Ripples Ltd. Liquid deliver workstations may comprise a reservoir of the liquid, a depth sensor operative to indicate how much liquid remains or whether less than a threshold amount remains, and a dispensing actuator, like a stepper-motor driven peristaltic pump or other food-safe pump. Loose-dry goods dispensers may comprise a reservoir of the dry goods, a vibratory actuator, and a set of bins feed by the reservoir that rotate to dispense fixed amounts of the dry goods. In some cases, the reservoirs may comprise volume sensors, like ultrasonic transducers that measure a distance to a top of the body of material in the reservoir, and the controller may automatically remove recipes from a menu of a user interface in response to determining that the amount of material remaining is insufficient to process the recipe. Some embodiments may further send a message over a network to a remote server that dispatches a technician to refile the reservoir, in some cases, as a preventative measure before the supply is exhausted, responsive to such a signal. Or some embodiments may exercise feed-forward control, and cease presenting menu options and request refills, when a specified count of increments of the material have been dispensed in recipes. Some embodiments may increment a counter each time a recipe is invoked to track how much of each ingredient has been used since a last refill, and the count may be resent upon a refill.

In some embodiments, the operations supports system 158 may comprise a plurality of dispensers, addition stations (e.g. syrup addition, sugar addition, etc.), dropping stations (e.g. tea bag, straw, etc.), a cleaning station, and a disposal station. The robotic system 154 may have access to (and reach) dispensing locations of all these workstations in the working area of the robot.

In some embodiments, the dispensers are configured to dispense cups and attach lids when instructed by the coffee preparation system controller 152. In some embodiments, a cup is released from a cup dispenser based on the instruction received from the coffee preparation system controller 152 to be moved via the robotic system 154 across the workstations. In some embodiments, a lid dispenser attaches a lid to a cup after the preparation process is done and before the order is delivered to a customer.

In some embodiments, the dispensers may be configured to dispense fresh or frozen solids, semi-solids, liquids, powders, or ice cubes. Dispensers may include containers coupled to an appropriate aperture (e.g. nozzle, moveable door, etc.) and dispensation may be assisted by gravity, or actively assisted using a piston, scoop, spoon, air pressure, etc. in various embodiments.

In some embodiments, a cleaning station may comprise a cleaning puck. The cleaning puck can be deployed by the robotic system 154, as instructed by the coffee preparation system controller 152, to clean any spill or dirt over the entire workstations, e.g., in response to detecting a spill, periodically, or after a threshold number of drinks are assembled. In some embodiments, the cleaning puck is equipped with air stream and hot water spray that may be used during the cleaning operation. In some embodiments, the cleaning puck is deployed when a spill occurs at any of the working stations. In some embodiments, the cleaning puck is deployed during the rest period of the automated beverage preparation system 150, e.g., in response to determining no order is under preparation. In some embodiments, the cleaning station is equipped with hot (e.g. 170° F. to facilitate sterilization or solubilization or carry-away of residue) or cold-water lines and detergents, surfactants, etc. In some embodiments, the cleaning puck may comprise a replaceable cleaning surface in contact with the top surface of the barrier. The cleaning surface may be tissues, woven or felted fabrics, etc.

In some embodiments, the interior of the kiosk is sterilized with UV light or a misting of a food-safe sterilizing agent. In some embodiments, the vessels moved by sterilized secondary members, e.g., with no human interaction from outside. In some embodiments, a ventilation system is configured to keep the humidity of the interior of the kiosk below a threshold (e.g. 2% saturation).

In some embodiments, the disposal station is configured to dispose components such as cups and lids that are no longer needed. The robotic system 154 may drop components that are no longer needed into the disposal station based on the instruction received from the coffee preparation system controller 152. In some embodiments, the disposal station may include a hole, in which the cups are disposed, on the surface of the barrier 204 and a can to collect the disposed cups. In some embodiments, if an order is not picked up after completion of a product therein for more than a threshold amount of time, the order may be dropped into the disposal station based on the instruction received from the coffee preparation system controller 152.

In some embodiments, the disposal station may include an elevator comprising a housing to purge a cup. In some embodiments, the cup is moved to the elevator housing by the robotic system 154 and the cup is lifted down by the elevator to be purged to a trash can. The elevator may comprise of a motor, gear reducer, pinion, and a rack. A gear reducer may be used to convert the high-speed rotation of the shaft of a motor to the slower but more powerful rotation of the output of the gear reducers. The output shaft of each of the gear reducers (not shown) may be connected to respective pinions. The pinions may engage racks, which are mounted perpendicular to the surface of the barrier 204. In some embodiments, the elevator is configured to be placed below the surface of the barrier. When the elevator is instructed to purge a cup or bowl, by instruction of the system controller 152, the elevator rises, the roof of the housing lifts up a part of the barrier 204 and the floor of the housing reaches the same height as the rest of the barrier plane 204. Then, the cup to be purged is placed on the floor of the elevator by the actuators. (The roof and floor may have a thickness similar to or equal to that of the rest of the barrier.) Thereafter, the elevator may translate down, and the roof of the elevator may recover an aperture through the barrier. In some embodiments, the actuators may move across the aperture (e.g., hole or channel) through the barrier 166 when the elevator is in its rest position below the surface of the barrier.

In some embodiments, the automated beverage preparation system 150 further comprises an ordering interface terminal. In some embodiments, the ordering interface terminal is a touchscreen located on or in proximity to the system housing 160, in order to allow a user to input a coffee order or order for other alimentary products. In some embodiments, the ordering interface terminal is accessible on a user computing device, such as a tablet computer, smart phone, smart speaker or the like, for example, via a native application or web application of the automated beverage preparation system 150 (hereinafter referred to as a "device app"). In some embodiments, a user can choose the preferred location of the automated beverage preparation system 150 amongst the list of locations near the user.

In some embodiments, the automated beverage preparation system 150 further comprises a plurality of delivery gates or other stations 164 where a user can pick up the order once it is ready. In some embodiments, the delivery gates 164 have an airlock with two doors, one connecting the gate to the inside of the kiosk, as an interior door, and one where the customer can pick up the order, as an exterior door. In some embodiments, the interior and exterior doors are across from each other and are not both open at the same time. In some embodiments, the customer never has access to the inside of the system housing 160. For example, in some embodiments, the first the interior door is opened and the order is place inside the gate via the robotic system 154 and after the interior door is closed, the exterior door is opened so the customer can pick up the order.

Many batch-based liquid transportation systems are not capable of detecting the actual location of liquid-bearing vessels and this is believed to cause inefficiencies in various processes; for examples, an addition unit might release the ingredients (or other components) on the floor instead of a vessel because of delay in the transportation system.

Some embodiments may locate the position (and in some cases orientation) of each vessel having WIP by proximity sensors placed at various locations in a liquid-processing facility, e.g., at each addition unit or pick-up location to prevent any spill or collision between vessels. In some cases, the sensors are non-contact sensors. In some cases, the sensors are configured to sense proximity of liquids or containers, thereby offering relatively large tolerances on liquid placement. In some cases, the proximity sensors might be inductive, capacitive, photoelectric, or ultrasonic sensors.

In various embodiments, sensors may be configured to monitor one or more of temperature, heat content, moisture, weight, pressure, viscosity, particle size, particle uniformity, electrical properties (particularly for solutions, e.g. conductivity, capacitance, inductance, etc.), chemical properties (e.g. salinity, pH, etc.), resistance (e.g., pressure resistance for a resistive feedback or input component), capacitance (e.g., for capacitance-based input components), light, sound, static and kinetic forces etc.

In some embodiments, a strain or pressure sensor may be placed on the secondary members to measure friction forces, which may be used to infer what percentage of the open-top vessel is filled with the liquid. In some embodiments, this information is sent to the controller to be used for calculating the speed and acceleration profile of the open-top vessel.

Figure 18:
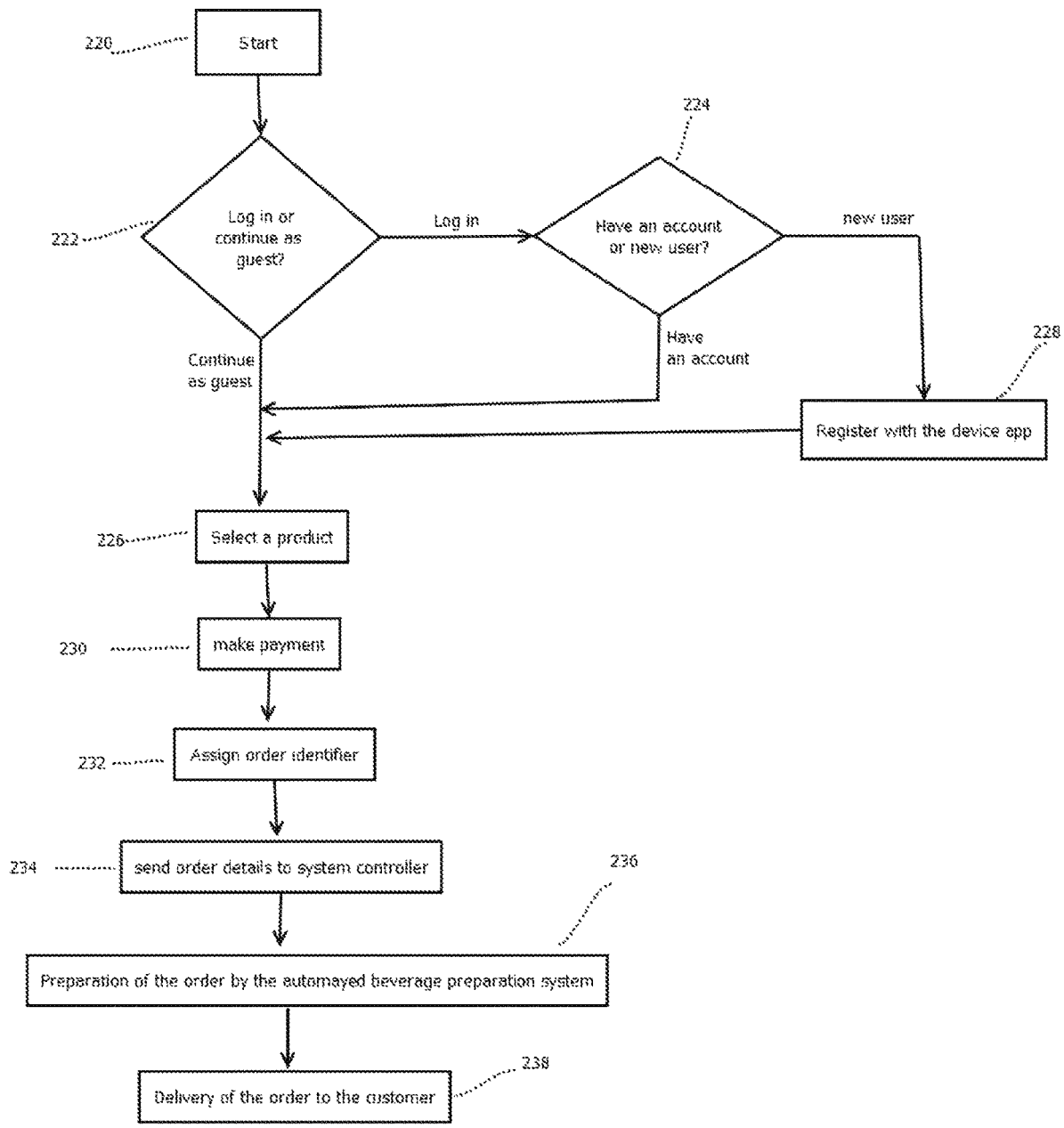
FIG. 18 is a flowchart of a process by which a food or beverage product is ordered by interacting with a robot consistent with some embodiments of the present techniques.

FIG. 18 is a flow chart that illustrates a workflow for placing an order by the user, e.g., via a touchscreen on the kiosk or native app on the user's mobile computing device. As shown, at block 220, the order placement process is initiated. At block 222, a user is asked whether the user want to login to the device app or continue as guest. At block 224, the device app may ask whether the user has an account registered with the device app. If the user has an account, the user can start to select a product at block 226. If the user does not have an account, at block 228, the user may be asked to register with the device app via a social networking account of the user, a phone number, email address, etc. In some embodiments, the user may be asked to enter a confirmation code that is sent to the user. The validity of the confirmation code entered by the user may be checked by the device app in order to complete the user registration process. In some embodiments, a history of orders is available in the user account. Next, at block 226, the user may be asked to select a menu item from a plurality of menu items organized categorically.

In some embodiments, the menu is adjusted based on the history of orders by the user after the user logs in and based on which ingredients are in stock. Information about the user may be stored in a profile, e.g. custom recipes, order history, primary or secondary pickup locations, allergies, dietary restrictions, nutritional goals etc., which may be used in subsequent order processing or dynamic menu configuration. For instance, predictive algorithms may be used to offer food and beverage products that are consistent with a user's dietary restrictions and allergies, nutritional goals, similar to items ordered by the customer historically, etc. Similarly, in the event of a failure in preparation or equipment, lack of availability of a particular product or ingredient, etc., a different (e.g. redundant) component of the system may be used, another portion of ingredients may be obtained, or a user may be directed to a secondary pickup location to avoid service interruption, in various approaches.

Some embodiments may be operative to receiving a voice instruction, e.g., via a microphone of the user's device to "order me a coffee from Truebird™," and some embodiments may convert the audio to text, determine that coffee is to be ordered, access a device geolocation to identify a closest kiosk, access an user profile to identify a default (or most recent, or most frequent) menu selection corresponding to coffee, send the order, and effectuate payment, automatically without subsequent user intervention. In some cases, orders may be held in reserve in the workspace for a threshold duration of time, until the user authenticates themselves at the kiosk, e.g., by entering an order code, or placing their mobile device near a near-field communication interface by which an identifier is exchanged, at which point, in response, the robot may deliver the drink held in inventory to the pickup station.

In some embodiments, the recipe publication may be restricted, e.g. such that customers may view the list of ingredients but not the relative proportions or the preparation procedure, in order to provide a layer of protection for "secret" recipes which may be proprietary. In some embodiments, the list of ingredients may also be restricted, and in such approaches, a customer may "validate" a custom recipe against dietary restrictions, allergies, nutritional goals etc. based on a transparent comparison between the ingredients included in the recipe and restrictions/allergies/nutritional goals defined in the user's account.

In some embodiments, availability status for the said items may be displayed to the user in real time (e.g., computed at the time of ordering). In some embodiments, the earliest delivery time for the menu items may be displayed to the user in real time (e.g., computed at the time of ordering). In some embodiments, the device app may check availability of customized options for the preparation of the menu item selected by the user. If the customized options are available, the user is prompted to select one of the customized options of his/her interest in order to customize the order being placed by the user. In some embodiments, the user may be presented with an earliest pickup time and additional pickup time intervals suggested by the server, for an instance, 5 to 15 minutes later after the earliest pickup time and the like to be selected by the user.

In some embodiments, a customer may select a type of vessel to be used. In some embodiments, a customer can choose the type of vessel to be disposable (e.g., paper, Styrofoam, or cardboard) or non-disposable (e.g., glass or plastic) cups, bowls, plates, cones, or the like. In some embodiments, a customer can choose his/her own cup or vessel to be used for the order. In some embodiments, only a certain type and sizes of vessels may be accepted if a customer wants to use his/her own vessel to be used. For example, the customer is asked to enter the size of his/her vessel (e.g. 8, 16, or 24 oz). In some embodiments, the customer is asked to verify the type vessel is amongst acceptable vessel types to be used. For example, a plastic cup with melting temperature of 80° C. is not suitable for some items such as an expresso coffee. In some embodiments, a delivery gate is assigned to a customer to put his vessel. In some embodiments, an input gate is configured to be used for receiving vessels from customers. In some embodiments, the customer never has access to the inside of the system housing 160. For example, in some embodiments, an input gate has at least two doors; the first door, connecting the gate to the outside of the kiosk, is opened and the vessel is place inside the gate by the customer and after the first door is closed, the second door, connecting the gate to the interior of the system housing 160 is opened for the robotic system to pick up the vessel. In some embodiments, an instruction is given to the customer to follow before putting his/her vessel into the gate to make sure the vessel is in good condition for sample preparation to be performed by the automated beverage preparation system 150. Examples of such instructions can be opening the lid of the vessel, appropriately placing the vessel in the gate (e.g. in standing position), or making sure the vessel is empty.

As shown in FIG. 18, at block 230, the user may be prompted by the device app to make payment corresponding to the order placed. Embodiments may support various types of payment methods, such as credit card payment, debit card payment, internet banking, electronic wallet, PayPal, stored value cards, cryptocurrency, and the like. Some embodiments may administer a loyalty rewards program by which discounts or free items are provided in response to determining more than a threshold amount of use is documented in the user's profile. In one example, in order to add credit card payment information, the user must enter a credit card number, credit card expiration date and a credit card security code. After successful payment, at block 232, a unique order identifier (order ID) in form may be assigned corresponding to the order placed by the user. In some embodiments, the user can find the order using this order ID at the pickup station. In some embodiments, the user may be asked to enter the order ID and then upon verification of the order ID, the order may be given to the user. At block 234, the order and the order details associated therewith are transferred to the system controller 152 for further processing of the order. At block 236, the order may be fulfilled and prepared by the automated beverage preparation system 150. At block 238, once the order is ready, the item (e.g., menu item) may be delivered to the user at the delivery gates 164. In some embodiments, the exterior door of the delivery gate 164 is opened after entering an access code sent to the user to verify the user. In some embodiments, the order ID is displayed at the delivery gate 164 (e.g., in a gate-specific screen) to notify the user that the order is ready. In some embodiments, the customer name is displayed at the delivery gate 164 to notify the user that the order is ready. In some embodiments, a message is sent to the user along with the access code once the order is ready at the delivery gate 164.

At various times between the time of placing an order and order delivery, a user may request to cancel the order. In some embodiments, after receiving the cancelation request, the server may check the status of order. If the status of the order is "not-started," the user may receive a full or partial refund, and the order may be removed from the queue. If the status of the order is "ready" or "in-progress," the order may be moved to the disposal station.

Some embodiments may slide open-top liquid vessels over a planar surface to workstations in a nonlinear (e.g., in the geometric sense) manner. Some embodiments transport the vessels with a plurality of actuated magnets underneath the planar surface to translate or rotate the vessel (e.g., imparting two or three degrees of freedom of movement to the vessel relative to an assembly system) to workstations above the planar surface. The planar surface is configured to be non-magnetic material.

Some embodiments separate the vessels from robotic actuators with a barrier, like a planar surface upon which the vessel slides. In some cases, the actuators mechanically communicate across the barrier magnetically, e.g., by moving magnets below the surface to cause magnets above the surface to apply forces to the vessel, with no direct contact (or in some cases, shared airflow) between robot's actuator and the open-top vessel. In some embodiments, the transportation system employs a set of three magnet pairs on a planar surface, surrounding a liquid vessel to move the vessel on the surface via magnetic actuators underneath the surface.

In some embodiments, the translocation of the workpiece (e.g. open-top vessel) is accomplished by actuation of the controlled element without the controlled element directly contacting the workpiece.

Some embodiments of coffee or other beverage preparation systems described herein are generally autonomous in the sense they are controlled without human input after initial placement of the beverage order and during the preparation process.

In some embodiments, the stage may be untethered, e.g., battery powered. Some embodiments may have multiple instances of actuators below the surface over which vessels are transported.

Some embodiments may mechanically move a vessel to various food preparation and ingredient adding stations (or other workstations) in a food vending setting, for example, a vending machine, a food truck, or a commercial kitchen.

Some embodiments use a system of actuated magnets underneath a planar surface to move a vessel to various locations above the planar surface.

Some embodiments hide the actuating mechanism from customer view, while making the end effectors and workpiece visible to the consumer throughout the assembly process. Some embodiments allow food construction and ingredient preparation to be visible.

Some embodiments can reduce customer wait times and allow for ingredient customization by dynamically scheduling use of workstations for multiple concurrently processed orders.

Figure 19:
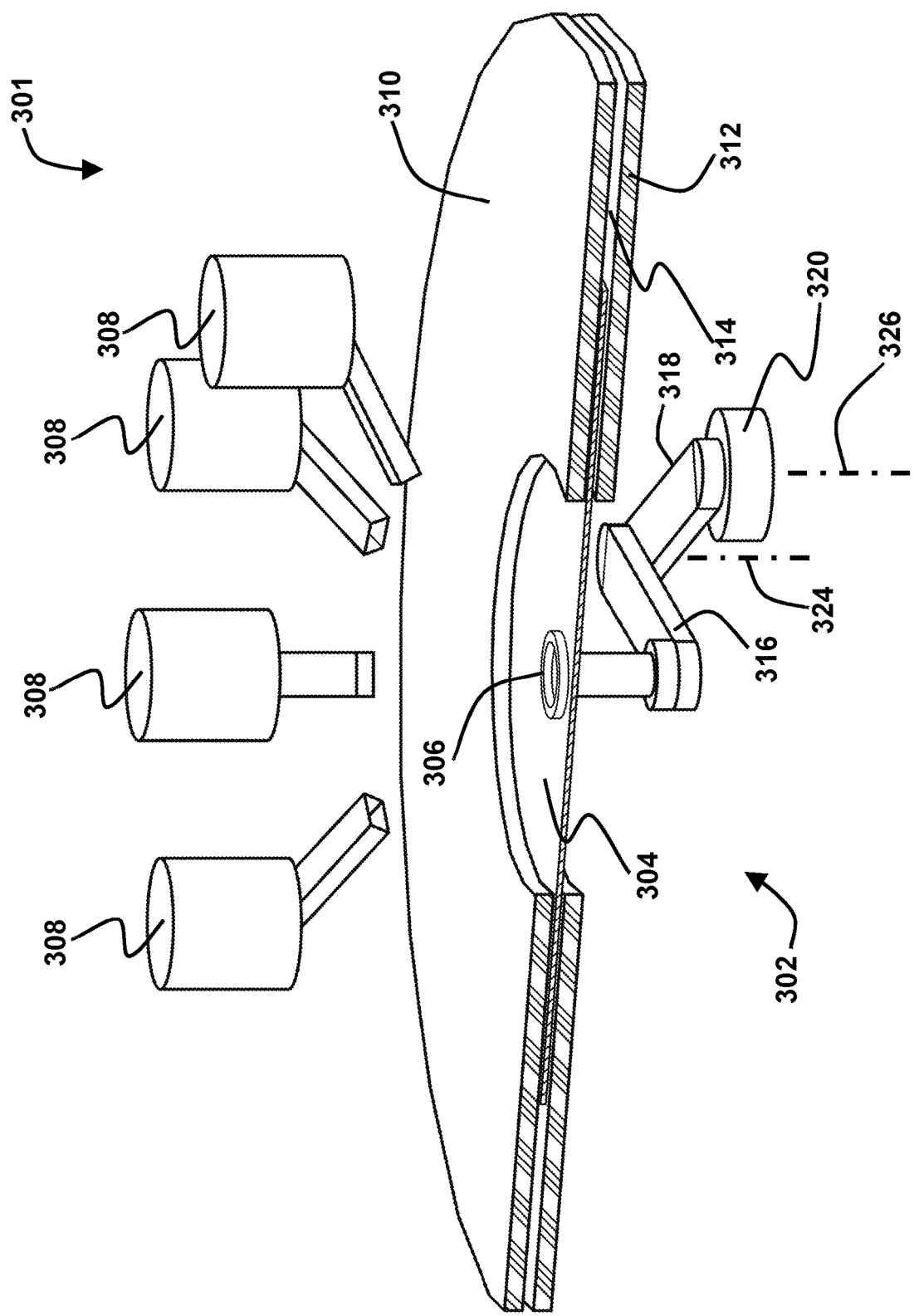
FIG. 19 is a cross-sectional perspective view that illustrates an example of a robot consistent with some embodiments of the present techniques.

FIG. 19 is a perspective cross-sectional view of another example of an alimentary-product dispensing robot 301. The illustrated robot 301 may include a lower portion 302 that is separated by movable barrier 304 from an end effector 306, which may hold a workpiece, like a cup or bowl into which various elementary substances are dispensed by dispensers 308, depending upon the position of the end effector and workpiece 306 being underneath and output of the various dispensers 308. In some embodiments, the barrier 304 may be mechanically coupled to the distal portion of the lower portion 302 that drives the end effector 306 and to the end effector 306. For example, the end effector 306 may be coupled to the lower portion 302 by the movable barrier 304 or by a member that penetrates the movable barrier 304. In operation, the movable barrier 304 may move along with the end effector 306, with zero degrees of freedom therebetween in some cases, sliding between plates 310 that define a gap 314 into which the movable barrier 304 slides as the end effector 306 moves a workpiece to receive various substances from the different dispensers 308 or other workstations.

In some embodiments, the end effector 306 and barrier 304 are moved by a robot with two arms 316 and 318 coupled to a static base 320, which may be fixed relative to an environment of the robot 300, like a floor of a brick-and-mortar store. In operation, the location of the end effector 306 may be determined based upon rotation of the arms 316 and 318 about axes 324 and 326. Thus, the lower portion 302 may have two degrees of freedom, i.e. the angular position of arm 316 about axes 324 relative to arm 318, and the angular position of arm 318 relative to the base 320 about axis 326. Various types of actuators like those described above, such as stepper motors, may drive such rotation, in some cases, via a harmonic drive. In some embodiments, an additional station that is not shown may dispense cups or bowls, and another station may expose a completed food or beverage product in the works piece to a consumer, for instance, through a window through which the consumer reaches. In some embodiments, the barrier 304 may impede airflow between the lower portion 302 and the side with the end effector 306 to reduce particulates shared by the lower portion 302 ending up in the food or beverage being assembled. Further, the two degrees of freedom, and in some cases only two degrees of freedom or only three degrees of freedom of the robot 300 with which the workpiece is moved may help reduce costs relative to more complex, six access robots, for instance.

Figure 20:
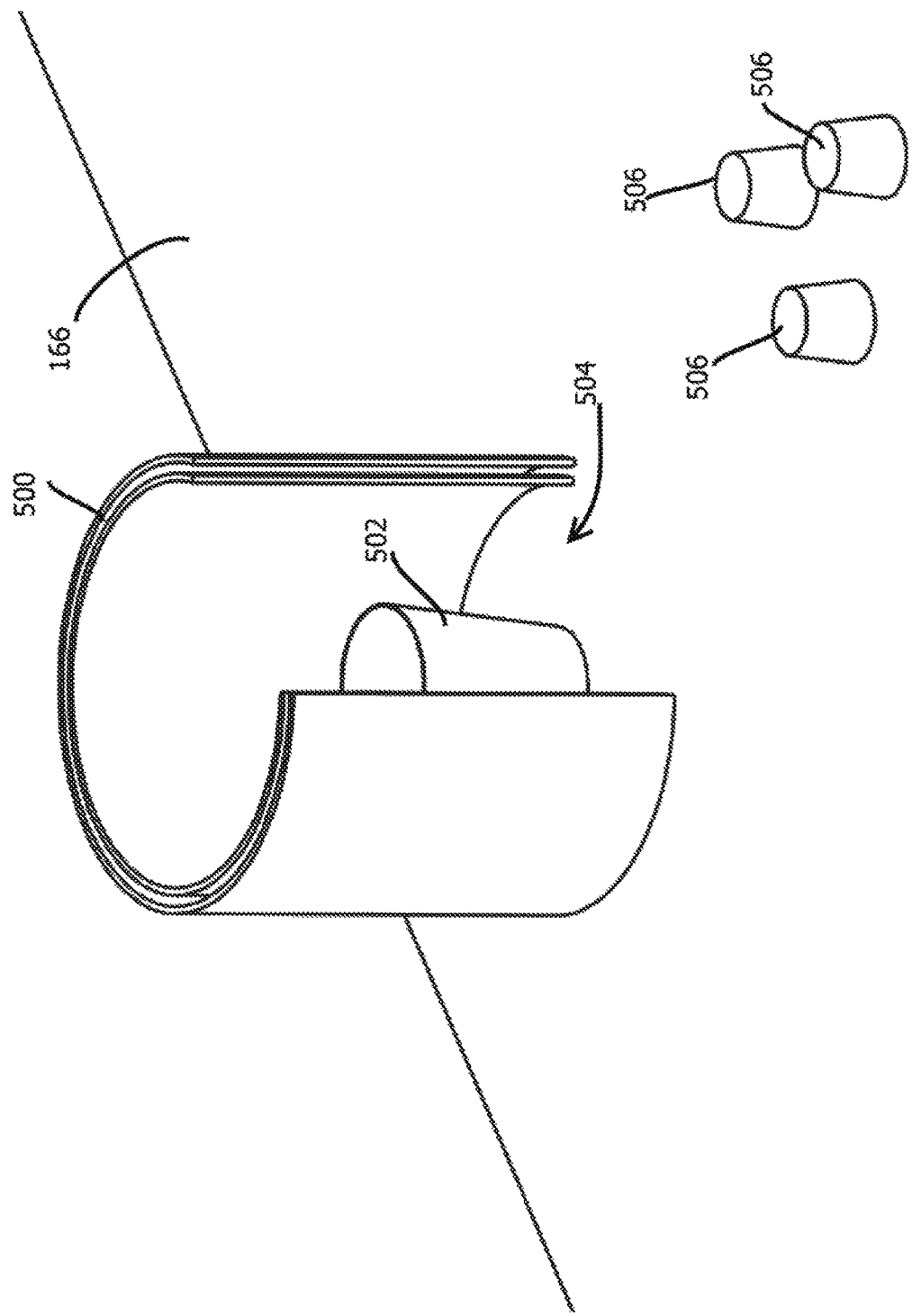
FIG. 20 is a perspective view of a working area of a robot with an enclosure consistent with some embodiments of the present techniques.

FIG. 20 is a perspective view of a working area over the barrier 166 with a partial enclosure 500 (e.g., a pickup station in which a vessel was not removed by a user within a threshold duration of time, indicating potentially that there is a need to dispose of the vessel) from which a workpiece 502 may be removed by end effectors 506 executing a sequence of moves discussed below with reference to FIGS. 21A through 21F. In some embodiments, the enclosure 500 is a partial enclosure with an aperture 504 that is relatively narrow, for instance, narrower than a distance between outer diameters of adjacent end effectors 506 in the illustrated configuration.

Figure 21A:
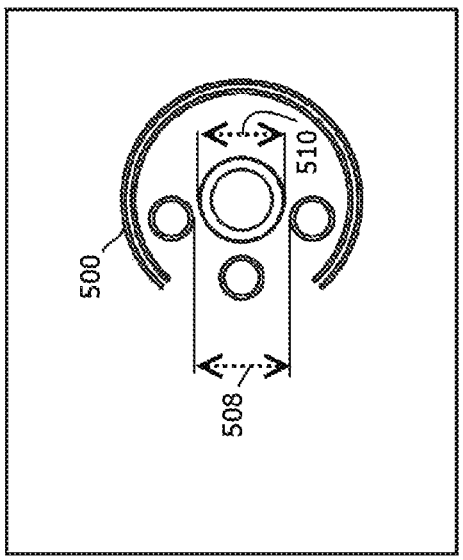
FIGS. 21A through 21F are plan views of the arrangement of FIG. 20, illustrating sequential stages in a maneuver by which a workpiece is removed from the enclosure of FIG. 20 consistent with some embodiments of the present techniques.
Figure 21C:
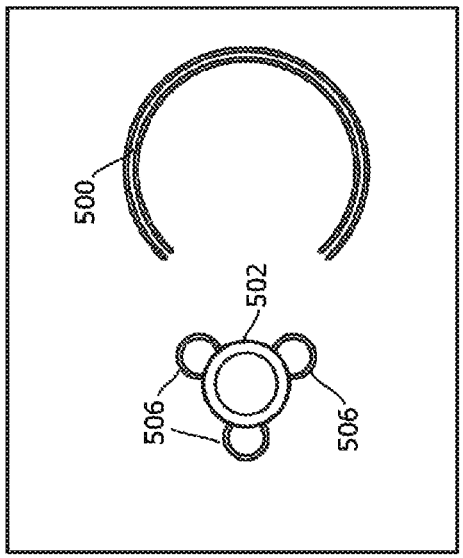
Figure 21B:
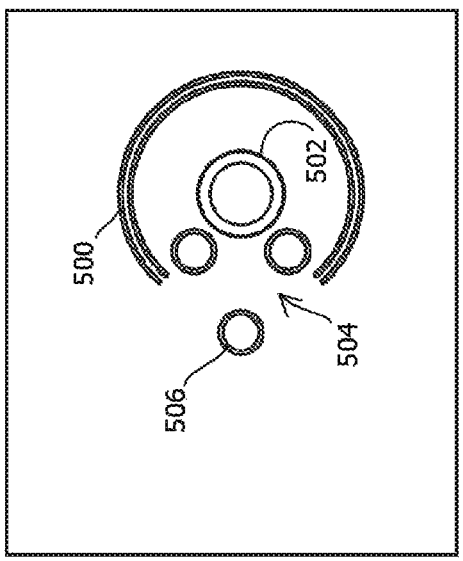
Figure 21E:
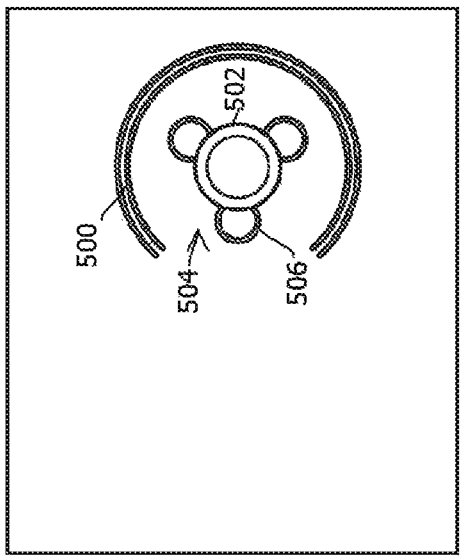
Figure 21D:
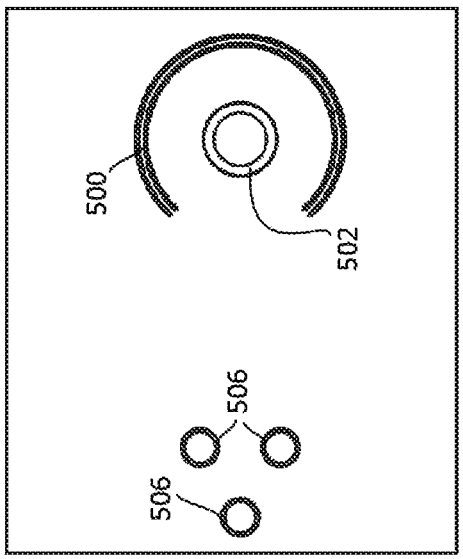
Figure 21F:
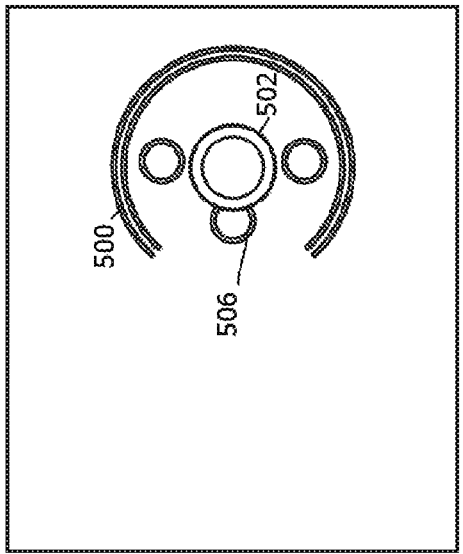

FIGS. 21A through 21 illustrate sequential stages in a maneuver by which end effectors 506 retrieve the work piece 502 from the partial enclosure 500 of FIG. 20. As shown in FIG. 21A, the end effectors 506 may initially approach the enclosure 500. As shown in FIG. 21B, a leading set of two end effectors 506 may enter the aperture 504. As shown in FIG. 21C, the leading to end effectors 506 may move further apart from one another, such that a distance 508 between the adjacent edges of the end effectors 506 is wider than a distance 510 of an outer diameter of a base of the work piece 502. As shown in FIG. 21D, end effectors 506 may then continue to advance until the trailing end effector 506 makes contact with the work piece 502. As shown in FIG. 21E, the leading end effectors 506 may then rotate about a central axis to come into contact with the work piece 502, moving towards one another as they rotate. As shown in FIG. 21F. The end effectors 506 may then remain in fixed positions relative to the work piece 502, while the collection of components 506 and 502 may, as a group, move together out of the enclosure 500.

Figure 22:
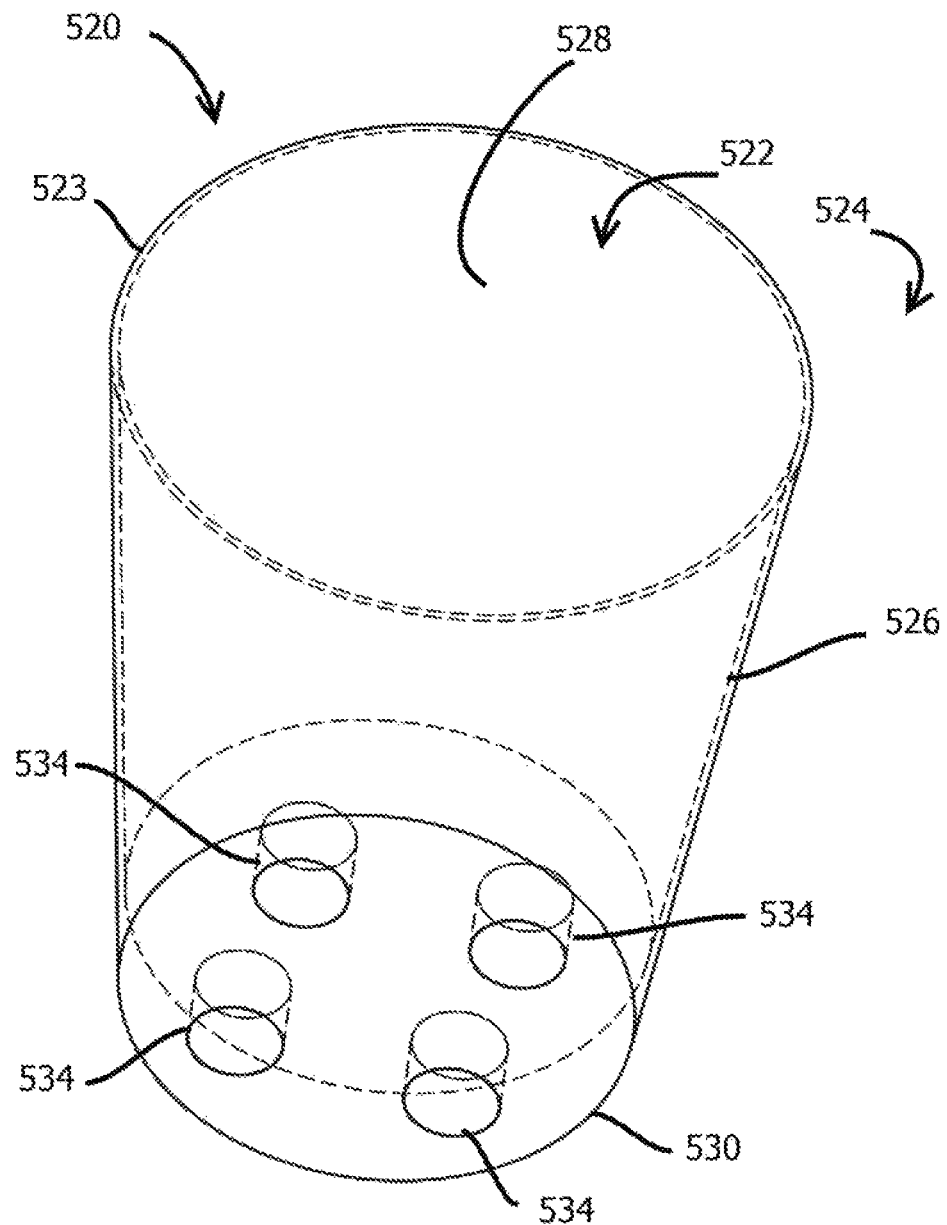
FIG. 22 is a wireframe perspective view of a workpiece that functions as an end effector consistent with some embodiments of the present techniques.

FIG. 22 is a perspective view of an example of an end effector 520 that is also a workpiece. In this example, the work piece 520 is a cup, but these techniques are also consistent with other types of open top vessels like bowls or other workpieces. In this example, the work piece 520 includes an interior 522 that receives alimentary products like those described above and an exterior 524. The work piece 520 further includes a top rim 523 and an interior wall 528 and an exterior side wall 526. The work piece 520 further includes a base 530 upon which the work piece 520 slides on the barrier 166. In this example, the work piece 520 has secured thereto a set of magnetically responsive materials or permanent magnets 534. In some embodiments, the components 534 are magnets with polls oriented along an axis normal to the barrier 166, for example, with alternating North and South poles orienting opposing directions around the work piece 520.

Figure 23:
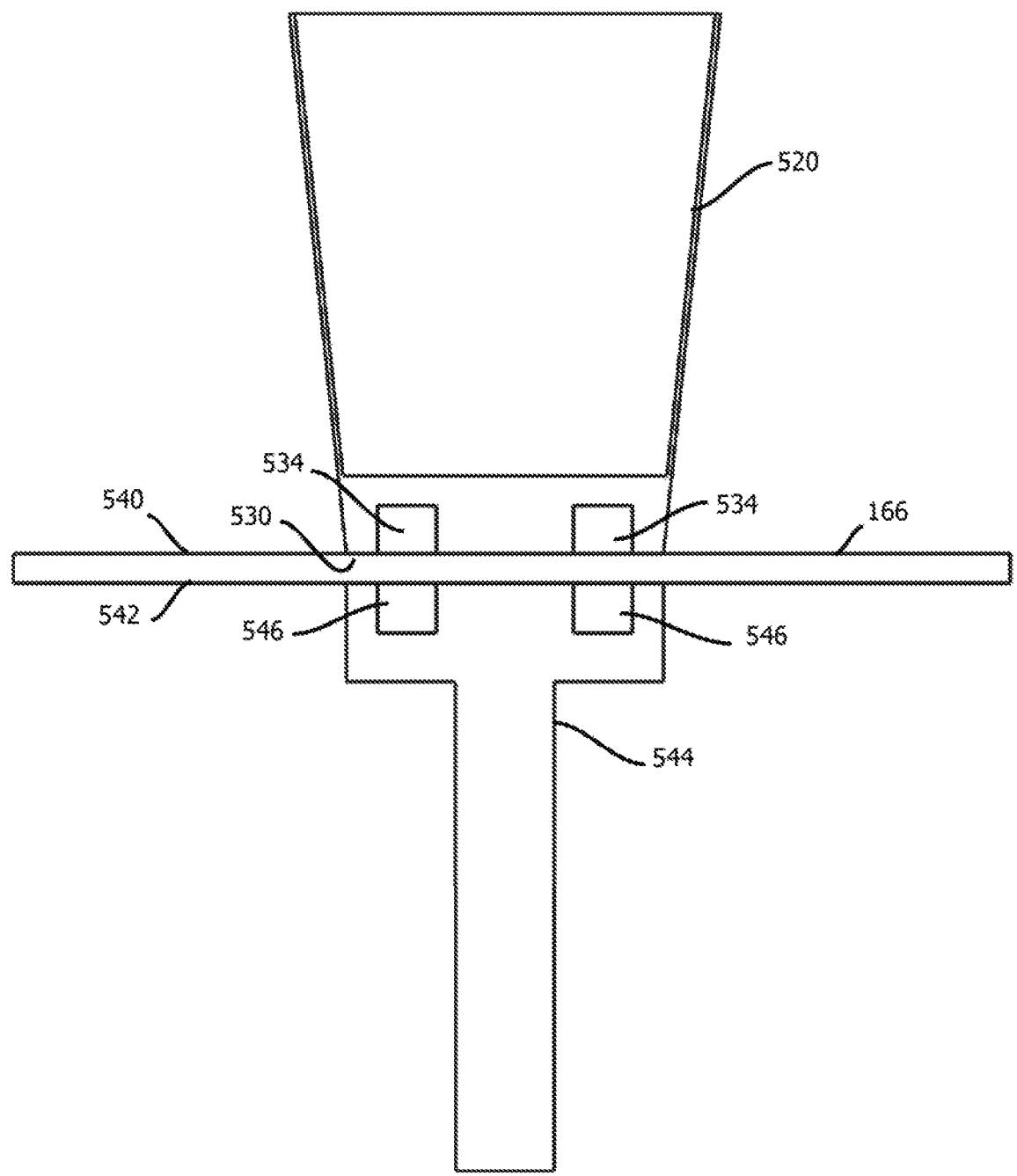
FIG. 23 is a cross-sectional elevation view of an end-effector mount and the end effector of FIG. 22 consistent with some embodiments of the present techniques.

FIG. 23 is an elevation view cross-section of the work piece 520 coupled to an end-effector mount 544. As illustrated, the bottom of the work piece 520 may slide on a top surface 540 of barrier 166, while the end-effector mount 544 may contact a bottom surface 542 of the barrier 166. In this example, the end effector mount 544 may include a set of magnets 546 that form a magnetic coupling with components 534 across the barrier 166. Magnets 546 may have a complementary arrangement of alternating North and South poles orienting opposing directions, e.g., where it is desirable to engage with a workpiece along a preferential axis, as might be the case for a rectangular workpiece. As discussed above, in some embodiments, the work piece 520 may itself be a magnetically responsive material, like a cup or bowl made from a ferrous metal.

Figure 24:
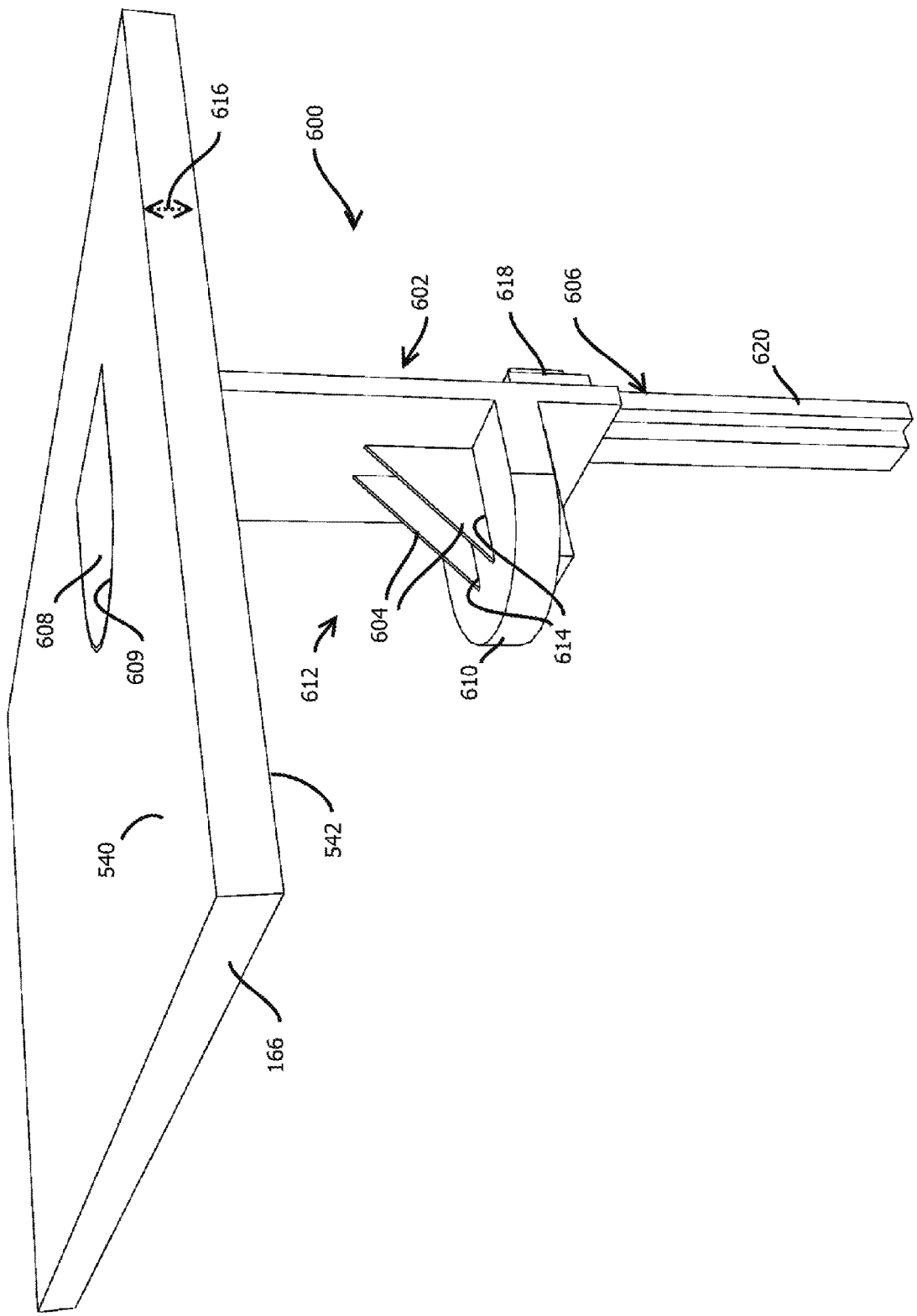
FIG. 24 is a perspective view of an example of a workpiece ejector in the retracted position consistent with some embodiments of the present techniques.

FIG. 24 is a perspective cutaway view of a portion of the kiosk above illustrating a ejector 600 operative to remove workpieces from the top surface 540 of the barrier 166 and dispose of them below a bottom surface 542. In some embodiments, the ejector 600 includes a carrier 602, ejection member 604, and an actuator 606. In some embodiments, the actuator 606 is mechanically linked to the carrier 602, for example, with zero degrees of relative freedom, such that the actuator 606 is operative to cause the carrier 602 to translate up and down, vertically, while the ejection member 604 may be held in fixed relation relative to the rest of the kiosk, for example, remaining static while the carrier 602 translates.

In some embodiments, the carrier 602 includes a base 610 and a ceiling 608. The ceiling 608 and the base 610 may have thicknesses that are similar or identical to a thickness 616 of the barrier 166, for example, within a tolerance in which the end effector mounts described above remain magnetically coupled to the end effectors described above when sliding therebetween. In some embodiments a bottom surface of the base 610 has a ramp like that described above, except inverted, or a top surface of the base 610 may include a ramp, for example, between apertures 614 through which the ejection member 604 are inserted when the carrier 602 is in the retracted position, as it is depicted in FIG. 24. In some embodiments, the space between the base 610 and the ceiling 608 may define a volume 612 in which a workpiece is carried down with the carrier 602 during and ejection operation. In some embodiments, actuator 606 includes a linear drive with the motor 618 and a rail 620 that translates through, and is driven by, the motor 618.

Figure 25:
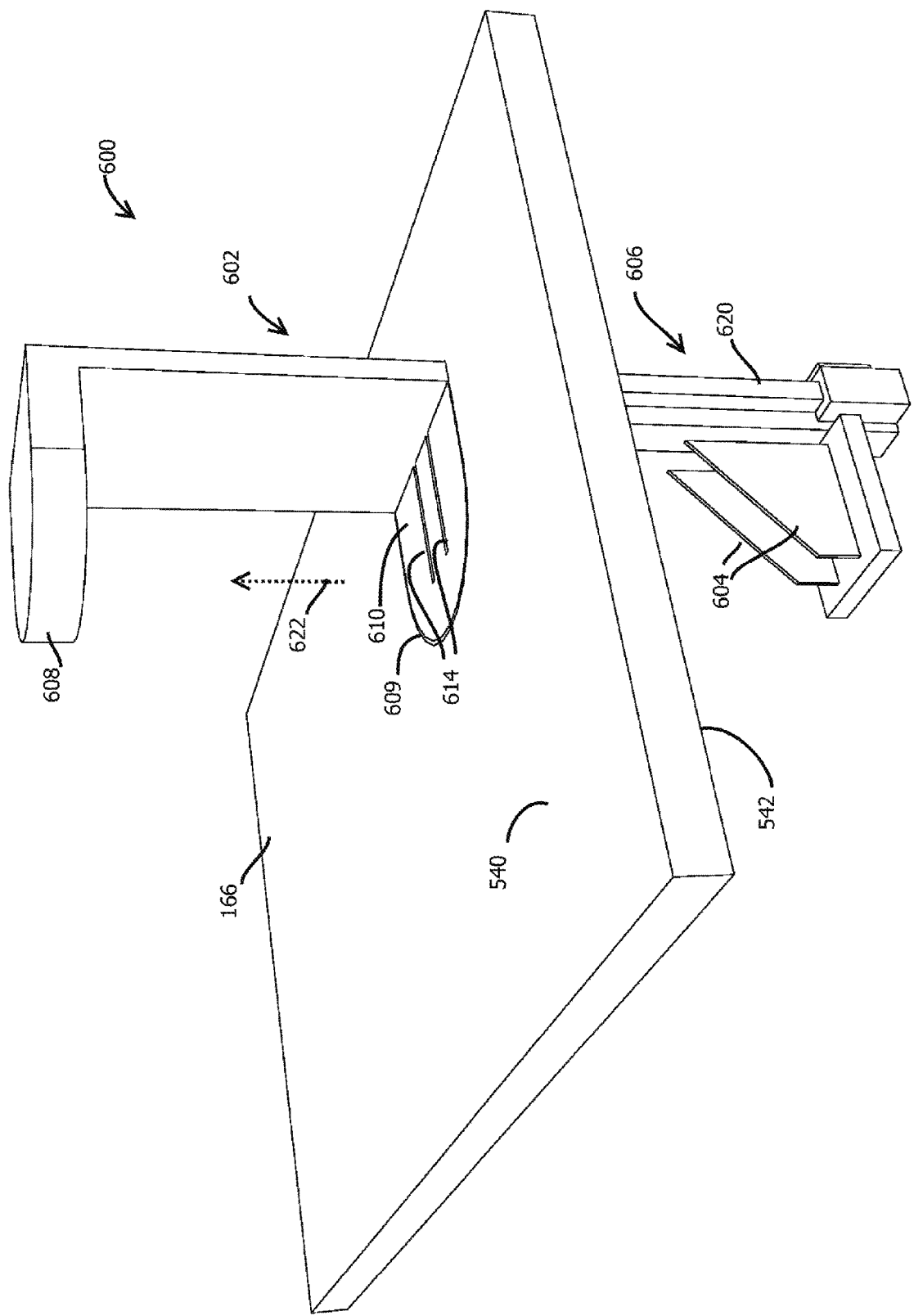
FIG. 25 is a perspective view of the workpiece ejector of FIG. 24 in the extended position consistent with some embodiments of the present techniques.

FIG. 25 is a perspective cutaway view that illustrates the ejector of FIG. 24 in the extended position. As illustrated, the carrier 602 has translated upward, in direction 622 to bring the base 610 in alignment with the barrier 166, with the carrier 602 translating through an aperture 609 in the barrier 166. Aperture 609 may be a hole or a slot having a shape that corresponds to that of the ceiling 608 and base 610, which may have shapes that correspond to (e.g., are the same as) one another, leaving (in both the retracted and extended positions) a relatively small gap between the aperture 609 and the base 610 or ceiling 608 across which a workpiece may be conveyed by end effectors without decoupling a magnetic coupling to an end-effector mount.

In some embodiments, to dispose of a workpiece, the carrier may rise into the position of FIG. 25 from the position of FIG. 24. Then an end-effector mount and end effectors may carry the work piece onto the base 610, across the gap with the aperture 609. In some embodiments, the work piece may then be decoupled, for example, by moving end effectors back around the work piece to cease making contact with the work piece or by driving the work piece onto a ramp like that described above or an end effector mount onto an inverted ramp like that described above underneath the base 610 or on top of the base 610.

Once the work piece is at rest on top of the base 610, and the end-effector mount and end effectors are withdrawn away from the work piece, outside the region of the barrier defined by aperture 609, the operation by which the carrier 602 is extended may be reversed, and the carrier 602 may retract, in a direction opposite that of 622, as driven by the actuator 606. As the carrier 602 retracts, the ejection members 604 may be inserted through slot 614, and the ejection members sloped upper surface may cause the work piece to translate horizontally, off the base 610, and then into a refuse bin, for example, disposed adjacent and below the members 604.

The operation may continue until the ceiling 608 is aligned with the barrier 166, for instance, and tell a top and bottom surface of the ceiling 608 are aligned with the top surface 540 in the bottom surface 542 of the barrier 166 to facilitate relatively free movement of end effectors and end-effector mounts in regions otherwise occupied by the ejector 600.

This patent is one of a set of four U.S. Patent Applications filed on the same day by the same application bearing the following titles, each of which is incorporated by reference in its entirety by the others: ISOLATING ROBOTIC ACTUATORS FROM FOOD AND BEVERAGE PREPARATION; REDUCING COST AND SIZE OF FOOD AND BEVERAGE PREPARATION ROBOTS; INCREASING THROUGHPUT OF FOOD AND BEVERAGE PREPARATION ROBOTS WITH CONCURRENT TRANSPORT OF WORKPIECES ALONG MULTIPLE AXES; and BREAK-AWAY END-EFFECTORS FOR FOOD AND BEVERAGE PREPARATION ROBOTS.

Figure 26:
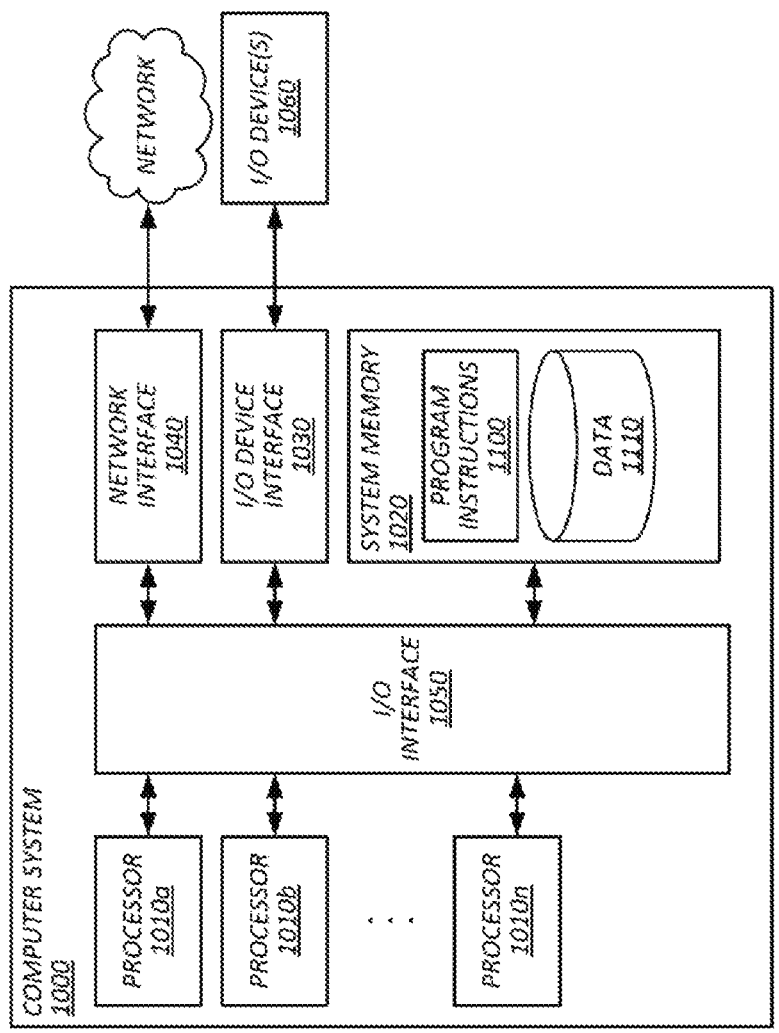
FIG. 26 is a block diagram of a computing device by which robotic controllers may be implemented consistent with some embodiments of the present techniques.

FIG. 26 is a diagram that illustrates an exemplary computing system 1000 that may execute code of the various controllers described above. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A device, comprising: a controller; a first actuator configured to be controlled by the controller; a first primary member, located on the first actuator; a first secondary member; and a sheet having a first side and a second side, wherein: the first primary member is located on the first side of sheet and the first secondary member is located on the second side of sheet, the first primary member is coupled to the first secondary member across the sheet via a coupling force, and the first secondary member is configured to slide on the second side of the sheet, following the first primary member, actuated by the first actuator based on instructions from the controller.
2. The device of embodiment 1, wherein: the sheet is magnetically transparent; the coupling force is a magnetic force exerted by the first primary member on the first secondary member; and the device comprises: a coffee dispenser on the second side of the sheet; a dispenser of grains on the second side of the sheet; or a salad dispenser on the second side of the sheet.
3. The device of embodiment 2, wherein the first primary member comprises a permanent magnet.
4. The device of embodiment 2, wherein: the first primary member comprises at least one rare earth magnet; the first secondary member comprising at least one magnetically attractable material; and the at least one rare earth magnet of the first primary member is configured to magnetically attract the at least one magnetically attractable material in the first secondary member.
5. The device of embodiment 4, wherein: the at least one rare earth magnet of the first primary member has a magnetic pole oriented perpendicular to the sheet.
6. The device of embodiment 2, the device further comprising: a second primary member located on the first actuator; a third primary member located on the first actuator; a second secondary member located on the second side of the sheet; and a third secondary member located on the second side of the sheet, wherein, the second primary member is magnetically coupled to the second secondary member and the third primary member is magnetically coupled to the third secondary member.
7. The device of embodiment 6, wherein the first, the second, and the third primary members are situated in an equilateral triangle configuration on the first actuator.
8. The device of embodiment 7, wherein: the first actuator is configured to move the first, the second, and the third primary members inward and outward radially.
9. The device of embodiment 8, wherein: the first, the second, and the third secondary members are configured to surround and grab an open-top vessel upon being moved inward radially.
10. The device of embodiment 9, wherein the first secondary member comprises a housing that envelopes a magnet prevent direct contact of the open-top vessel with the magnet.
11. The device of embodiment 7, wherein: the first actuator is configured to rotate an assembly of the first primary member, the second primary member, and the third primary member around an axis perpendicular to a plane defined by the equilateral triangle configuration, the axis intersecting the plane at or near a center of the equilateral triangle configuration.
12. The device of any one of embodiments 1-11, the device further comprising: a first plurality of bearings disposed between the first primary member and the first side of the sheet; and a second plurality of bearings disposed between the first secondary member and the second side of the sheet.
13. The device of any one of embodiments 1-12, wherein: the sheet is an air-permeable barrier; the device comprises an air pump or fan configured to maintain higher air pressure on the second side of the sheet than the first side of the sheet; and the first primary member is coupled to the secondary member via a suction force induced by a vacuum pump connected to the first primary member.
14. The device of any one of embodiments 1-12, wherein the sheet is a rigid, non-ferrous, non-magnetic barrier of substantially uniform thickness over a work area of the actuator.
15. The device of any one of embodiments 1-14, wherein: the first actuator is coupled, with zero degrees of freedom, to a robotic motion system having two degrees of freedom, the robotic motion system comprising: a first rail, having a first end and a second end; a second rail, spaced from the first rail, the second rail having a first end and a second end, wherein the first rail and the second rail are parallel to one another; a gantry, positioned perpendicular to the first rail and the second rail, the gantry having a first end movable along the first rail and a second end movable along the second rail; a second actuator coupled to the first rail to move the gantry along the first rail, between the first end and the second end of the first rail, wherein the first actuator is under control of the controller; a shaft configured to connect the first actuator to the gantry; a third actuator coupled to the gantry to displace the first actuator along the gantry, between the first end and the second end of the gantry, wherein the third actuator is under control of the controller; a first position sensor, coupled to the controller, disposed to measure a position of the gantry with respect to the first rail; and a second position sensor, coupled to the controller, disposed to measure a position of the carrier with respect to the gantry, wherein the controller is configured to cause the second actuator and the third actuator to move the shaft and to calculate a position of the actuator based on signals from the first position sensor and the second position sensor.
16. The device of embodiment 15, wherein: the first actuator is configured to adjust the distance between the first primary member and the first side of the sheet, and the first primary member is configured to decouple from the first secondary member as the first primary member moves away from the first side of sheet.
17. The device of embodiment 16, the device further comprising: a fourth secondary member located on the second side of the sheet; wherein the first primary member is configured to decouple from the first secondary member and to couple with the fourth secondary member using the first actuator, the second actuator, and the third actuator.

18. The device of embodiment 15, wherein: the sheet has a first region with a first thickness and a second region with a second thickness, wherein: the first thickness is less than the second thickness; and the sheet is magnetically transparent; the coupling force is a magnetic force exerted by the first primary member to the first secondary member; and the first primary member is configured to be decoupled from the first secondary member by moving the first primary member from the first region of the sheet to the second region of the sheet.

19. The device of any one of embodiments 1-18, the device further comprising: a fifth secondary member, wherein the first primary member is simultaneously coupled to the first secondary member and the fifth secondary member.

20. A method of maneuvering of object, the method comprising: receiving, via a controller, an instruction to move an object; and connecting the object to a secondary member of a device, the device comprising: a actuator configured to be controlled by the controller; a primary member, located on the actuator; and a sheet having a first side and a second side, wherein: the primary member is located on the first side of sheet and the secondary member is located on the second side of sheet, the primary member is coupled to the secondary member across the sheet via a coupling force, and the secondary member is configured to slide on the second side of the sheet, following the primary member, actuated by the actuator based on instructions from the controller.

21. A device, comprising: a barrier configured to impeded or prevent particles shed by a robot in a first volume of space from entering a second volume of space in which the robot manipulates a workpiece; and a robot having three or more degrees of freedom, the robot comprising: a first portion disposed on a first side of the barrier in the first volume, the first portion comprising an actuator of the robot, the actuator being configured to drive movement of the robot to manipulate the workpiece; and a second portion disposed on a second side of the barrier in the second volume, the second portion comprising an end-effector of the robot by which the robot makes contact with the workpiece.

22. The device of embodiment 21, wherein: the second volume comprises a plurality of alimentary-product dispensers disposed at different static locations to which the robot is configured move workpiece; and the workpiece is an open-top vessel.

23. The device of embodiment 22, wherein: the open-top vessel is a coffee cup; and the plurality of alimentary-product dispensers comprise: a coffee dispenser; a dairy dispenser; and a sweetener dispenser.

24. The device of embodiment 22, wherein: the plurality of alimentary-product dispensers comprise a printer configured to print a pattern on latte foam in the coffee cup.

25. The device of any one of embodiments 21-24, wherein: the second volume comprises a plurality of alimentary-product which the robot is configured move over the workpiece while the workpiece remains static; and the workpiece is an open-top vessel.

26. The device of any one of embodiments 21-25, wherein: the barrier is a magnetically transparent sheet; and the end effector is coupled to the first portion via a magnetic force.

27. The device of embodiment 26, wherein: the end effector comprises a permanent magnet; and the first portion comprises an electromagnet configured to selectively magnetically engage the permanent magnet responsive to commands from a controller.

28. The device of embodiment 26, wherein: the first portion is coupled to the second portion via the barrier or a member extending through the barrier; the barrier is coupled to the first portion with zero degrees of freedom relative to where the barrier is coupled to the first portion.

29. The device of any one of embodiments 21-28, wherein: the first portion has two and only two degrees of freedom relative to an environment of the robot; and the end effector has one and only one degree of freedom relative to the first portion.

30. The device of any one of embodiments 21-29, wherein: the two and only two degrees of freedom are orthogonal to one another; and the adjustment along the one and only one degree of freedom is configured to cause a plurality of end effectors, including the end effector, to move radially outward from one another.

What is claimed is:

1. A device, comprising:
a controller;
a first actuator configured to be controlled by the controller;
a first primary member, located on the first actuator;
a first secondary member; and
a sheet having a first side and a second side, wherein:
the first primary member is located on the first side of sheet and the first secondary member is located on the second side of sheet,
the first primary member is coupled to the first secondary member across the sheet via a coupling force, and
the first secondary member is configured to slide on the second side of the sheet, following the first primary member, actuated by the first actuator based on instructions from the controller.

2. The device of claim 1, wherein:
the sheet is magnetically transparent;
the coupling force is a magnetic force exerted by the first primary member on the first secondary member; and
the device comprises:
a coffee dispenser on the second side of the sheet;
a dispenser of grains on the second side of the sheet; or
a salad dispenser on the second side of the sheet.

3. The device of claim 2, wherein the first primary member comprises a permanent magnet.

4. The device of claim 2, wherein:
the first primary member comprises at least one rare earth magnet;
the first secondary member comprising at least one magnetically attractable material; and
the at least one rare earth magnet of the first primary member is configured to magnetically attract the at least one magnetically attractable material in the first secondary member.

5. The device of claim 4, wherein:
the at least one rare earth magnet of the first primary member has a magnetic pole oriented perpendicular to the sheet.

6. The device of claim 2, the device further comprising:
a second primary member located on the first actuator;
a third primary member located on the first actuator;
a second secondary member located on the second side of the sheet; and
a third secondary member located on the second side of the sheet, wherein, the second primary member is magnetically coupled to the second secondary member and the third primary member is magnetically coupled to the third secondary member.

7. The device of claim 6, wherein the first, the second, and the third primary members are situated in an equilateral triangle configuration on the first actuator.

8. The device of claim 7, wherein:
the first actuator is configured to move the first, the second, and the third primary members inward and outward radially.

9. The device of claim 8, wherein:
the first, the second, and the third secondary members are configured to surround and grab an open-top vessel upon being moved inward radially.

10. The device of claim 9, wherein the first secondary member comprises a housing that envelopes a magnet prevent direct contact of the open-top vessel with the magnet.

11. The device of claim 7, wherein:
the first actuator is configured to rotate an assembly of the first primary member, the second primary member, and the third primary member around an axis perpendicular to a plane defined by the equilateral triangle configuration, the axis intersecting the plane at or near a center of the equilateral triangle configuration.

12. The device of claim 1, the device further comprising:
a first plurality of bearings disposed between the first primary member and the first side of the sheet; and
a second plurality of bearings disposed between the first secondary member and the second side of the sheet.

13. The device of claim 1, wherein:
the sheet is an air-permeable barrier;
the device comprises an air pump or fan configured to maintain higher air pressure on the second side of the sheet than the first side of the sheet; and
the first primary member is coupled to the secondary member via a suction force induced by a vacuum pump connected to the first primary member.

14. The device of claim 1, wherein the sheet is a rigid, non-ferrous, non-magnetic barrier of substantially uniform thickness over a work area of the actuator.

15. The device of claim 1, wherein:
the first actuator is coupled, with zero degrees of freedom, to a robotic motion system having two degrees of freedom, the robotic motion system comprising:
a first rail, having a first end and a second end;
a second rail, spaced from the first rail, the second rail having a first end and a second end, wherein the first rail and the second rail are parallel to one another;
a gantry, positioned perpendicular to the first rail and the second rail, the gantry having a first end movable along the first rail and a second end movable along the second rail;
a second actuator coupled to the first rail to move the gantry along the first rail, between the first end and the second end of the first rail, wherein the first actuator is under control of the controller;
a shaft configured to connect the first actuator to the gantry;
a third actuator coupled to the gantry to displace the first actuator along the gantry, between the first end and the second end of the gantry, wherein the third actuator is under control of the controller;
a first position sensor, coupled to the controller, disposed to measure a position of the gantry with respect to the first rail; and
a second position sensor, coupled to the controller, disposed to measure a position of the carrier with respect to the gantry,
wherein the controller is configured to cause the second actuator and the third actuator to move the shaft and to calculate a position of the actuator based on signals from the first position sensor and the second position sensor.

16. The device of claim 15, wherein:
the first actuator is configured to adjust the distance between the first primary member and the first side of the sheet, and
the first primary member is configured to decouple from the first secondary member as the first primary member moves away from the first side of sheet.

17. The device of claim 16, the device further comprising:
a fourth secondary member located on the second side of the sheet;
wherein the first primary member is configured to decouple from the first secondary member and to couple with the fourth secondary member using the first actuator, the second actuator, and the third actuator.

18. The device of claim 15, wherein:
the sheet has a first region with a first thickness and a second region with a second thickness, wherein:
the first thickness is less than the second thickness; and
the sheet is magnetically transparent;
the coupling force is a magnetic force exerted by the first primary member to the first secondary member; and
the first primary member is configured to be decoupled from the first secondary member by moving the first primary member from the first region of the sheet to the second region of the sheet.

19. The device of claim 1, the device further comprising:
a fifth secondary member, wherein the first primary member is simultaneously coupled to the first secondary member and the fifth secondary member.

* * * * *